(12) United States Patent
Choung et al.

(10) Patent No.: US 12,485,124 B2
(45) Date of Patent: *Dec. 2, 2025

(54) METHODS FOR TREATING ALZHEIMER DISEASE AND FOR REDUCING AMYLOID BETA FORMATION

(71) Applicants: ARIBIO CO., LTD., Seongnam-si (KR); SK CHEMICALS CO., LTD., Seongnam-si (KR)

(72) Inventors: Jai Jun Choung, Seongnam-si (KR); Yoon Pyo Choi, Seongnam-si (KR); Byungwoo Kang, Seongnam-si (KR); Fred Kim, Seongnam-si (KR); Mi Sun Choung, Seongnam-si (KR)

(73) Assignees: ARIBIO CO., LTD., Gyeonggi-do (KR); SK CHEMICALS CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,967

(22) Filed: Oct. 4, 2024

(65) Prior Publication Data

US 2025/0025468 A1 Jan. 23, 2025

Related U.S. Application Data

(63) Continuation of application No. 17/593,842, filed as application No. PCT/IB2020/052771 on Mar. 24, 2020.

(60) Provisional application No. 62/822,975, filed on Mar. 24, 2019.

(51) Int. Cl.
| | |
|---|---|
| *A61K 31/519* | (2006.01) |
| *A61K 31/4985* | (2006.01) |
| *A61K 31/506* | (2006.01) |
| *A61K 31/522* | (2006.01) |
| *A61K 31/53* | (2006.01) |
| *A61P 25/28* | (2006.01) |

(52) U.S. Cl.
CPC ........ *A61K 31/519* (2013.01); *A61K 31/4985* (2013.01); *A61K 31/506* (2013.01); *A61K 31/522* (2013.01); *A61K 31/53* (2013.01); *A61P 25/28* (2018.01)

(58) Field of Classification Search
CPC ...... A61K 31/519; A61K 31/506; A61P 25/28
See application file for complete search history.

(56) References Cited

U.S. PATENT DOCUMENTS

| 10,064,865 B2 | 9/2018 | Kim et al. |
| 10,456,404 B2 | 10/2019 | Bacallao et al. |
| 2005/0009835 A1 | 1/2005 | Thomas |

FOREIGN PATENT DOCUMENTS

| CN | 107847462 A | 3/2018 | |
|---|---|---|---|
| EP | 2535049 A1 | 12/2012 | |
| KR | 1020140072819 A | 6/2024 | |
| WO | 2006/091542 A2 | 8/2006 | |
| WO | 2009/124119 A2 | 10/2009 | |
| WO | 2010/074783 A1 | 7/2010 | |
| WO | 2013/093456 A1 | 6/2013 | |
| WO | WO-2018215433 A1 * | 11/2018 | ........... A61K 31/519 |

OTHER PUBLICATIONS

Puzzo, J. Neurosci, 2009, 29(25) (Year: 2009).*
Garcia-Osta, ACS Chem. Neurosci. 2012, 3, 832-844 (Year: 2012).*
Kang, Alzheimer's Research &Therapy, 2022, 14:92 (Year: 2022).*
Mayeux. R. et al, "Genetic susceptibility and head injury as risk factors for Alzheimer's disease among community-dwelling elderly persons and their first-degree relatives" Annals of Neurology. vol. 33(5), pp. 494-501 (1993).
Lee, DW. et al, "Evidence-Based Treatment of Alzheimer's Disease" Journal of the Korean Medical Association, vol. 52(4), pp. 417-425 (2009).
Schneider, L.S. et al, "Lack of evidence for the efficacy of memantine in mild Alzheimer disease" Archives of Neurology ,vol. 68(8), pp. 991-998 (2011).
Hahn, S.J. et al, "Pharmacological Treatment of Dementia" Brain & NeuroRehabilitation, vol. 8(1), pp. 19-23 (2015).
Lee, JJ. et al "Recent Advances in Diagnosis and Treatment of Alzheimer's Disease" Korean Journal of Biological Psychiatry, vol. 23(2), pp. 48-56 (2016).
Kienlen-Campard, P. et al."Intracellular amyloid-beta 1-42, but not extracellular soluble amyloid-beta peptides, induces neuronal apoptosis"The Journal of Biological Chemistry. vol. 277 (18), pp. 15666-15670. (2002).
Bolea, I. et al "Propargylamine-derived multitarget-directed ligands: fighting Alzheimer's disease with monoamine oxidase inhibitors" Journal of Neural Transmission (Vienna). vol. 120(6), pp. 893-902 (2013).
Rosini, M. et al "Multitarget strategies in Alzheimer's disease: benefits and challenges on the road to therapeutics" Future Medicinal Chemistry. vol. 8 (6), pp. 697-711 (2016).

(Continued)

*Primary Examiner* — Jeffrey H Murray
*Assistant Examiner* — Luisalberto Gonzalez
(74) *Attorney, Agent, or Firm* — Venable LLP

(57) ABSTRACT

The present invention provides methods for reducing amyloid beta formation and for treating diseases associated with the accumulation of amyloid beta. The present invention provides (1) A β aggregation inhibition by A β Oligomer/Fibril formation inhibition, (2) BACE-1 reduction through β-Amyloidogenic Processing inhibition, (3) increased cerebral blood flow, (4) activation of Neuronal cell Death inhibition and Neurogenesis, Synaptogenesis, Angiogenesis promotion, (5) DKK-1 inhibition by Wnt Signaling and Aβ production Positive Feedback Loop for inhibition of APP to suppress Aβ accumulation, (6) Autophagy activation by cells, by providing Mirodenafil, Sildenafil, Vardenafil, Tadalafil, Udenafil, Dasantafil, and Avanafil and a Pharmaceutically Acceptable Salt, Solvate, and Hydrate in selected compounds key of ingredient containing drug compound composition, and this with the treatment method provided.

7 Claims, 29 Drawing Sheets

Specification includes a Sequence Listing.

(56) References Cited

OTHER PUBLICATIONS

Postma, M. J. et al "Accumulating evidence for the case of differential discounting" Expert Review of Clinical Pharmacology, vol. (1), pp. 1-3 (2013).
Zhang, W. et al "Polypharmacology in Drug Discovery: A Review from Systems Pharmacology Perspective" Current Pharmaceutical Design, vol. 22 (21), pp. 3171-3181 (2016).
Cline, E.N. "The Amyloid-β Oligomer Hypothesis: Beginning of the Third Decade" Journal of Alzheimers Disease, vol. 64 (s1), pp. S567-S610 (2018).
Hayden, E. et al "Amyloid β-protein oligomers and Alzheimer's disease" Alzheimers Research & Therapy, vol. 5(6), p. 60 (2013).
Sengupta, U. et al "The Role of Amyloid-β Oligomers in Toxicity, Propagation, and Immunotherapy" EBioMedicine, vol. 6, pp. 42-49 (2016).
Lublin, A.L. et al, "Amyloid-beta oligomers: possible roles as key neurotoxins in Alzheimer's Disease" The Mount Sinai Journal of Medicine, vol. 77 (1), pp. 43-49 (2010).
Zussy, C. et al "Alzheimer's Disease Related Markers, Cellular Toxicity and Behavioral Deficits Induced Six Weeks after Oligomeric Amyloid-β Peptide Injection in Rats" PLoS One vol. 8 (1), article e53117, pp. 1-20 (2012).
Butterfield, D.A. et al "Oxidative Stress, Amyloid-β Peptide, and Altered Key Molecular Pathways in the Pathogenesis and Progression of Alzheimer's Disease" Journal of Alzheimers Disease, vol. 62 (3), pp. 1345-1367 (2018).
Rosenberg, D.E. et al "Independent Associations Between Sedentary Behaviors and Mental, Cognitive, Physical, and Functional Health Among Older Adults in Retirement Communities" The journals of Gerontology, vol. 71(1), pp. 78-83 (2016).
Griebling, T. et al "Re: Sildenafil Decreases BACE1 and Cathepsin B Levels and Reduces APP Amyloidogenic Processing in the SAMP8 Mouse" The Journal of Urology. vol. 195 (4 Pt 1), article 1171 (2016).
Sweeney, M.D. et al."Blood-brain barrier breakdown in Alzheimer disease and other neurodegenerative disorders" Nature Reviews Neurology, vol. 14 (3.), pp. 133-150. (2018).
Leeuwis, A.E. et al "Lower cerebral blood flow is associated with impairment in multiple cognitive domains in Alzheimer's disease" Alzheimers & Dementia: The Journal of the Alzheimer's Association, vol. 13 (5), pp. 531-540 (2017).
Liu, X. et al "Reconfigurable ferromagnetic liquid droplets" Science, vol. 365 (6450), pp. 1-4 (2019).
Kisler, K. et al "Cerebral blood flow regulation and neurovascular dysfunction in Alzheimer disease" Nature Reviews. Neuroscience, vol. 18 (7), pp. 419-434 (2017).
Corbin, J.D. "Mechanisms of action of PDE5 inhibition in erectile dysfunction" International Journal of impotence research, vol. 16 Suppl 1, (2004).
Pauls, M.M. et al "The effect of phosphodiesterase-5 inhibitors on cerebral blood flow in humans: A systematic review" Journal of Cerebral Blood Flow and Metabolism, vol. 38 (2), pp. 189-203 (2018).
Laferla, F.M. "Intracellular amyloid-beta in Alzheimer's disease" Nature Reviews Neuroscience, vol. 8(7), pp. 499-509 (2007).
Small, S.A. "Linking Abeta and tau in late-onset Alzheimer's disease: a dual pathway hypothesis" Neuron, vol. 60(4), pp. 534-542 (2008).
Ittner, L.M. et al "Amyloid-β and tau—a toxic pas de deux in Alzheimer's disease" Nature Reviews, Neuroscience, vol. 12(2), pp. 65-72 (2011).
Staveren, W.C. et al , "mRNA expression patterns of the cGMP-hydrolyzing phosphodiesterases types 2, 5, and 9 during development of the rat brain" The Journal of Comparative Neurology, vol. 467 (4), pp. 566-580 (2003).
Ugarte, A. "Decreased levels of guanosine 3', 5'-monophosphate (cGMP) in cerebrospinal fluid (CSF) are associated with cognitive decline and amyloid pathology in Alzheimer's disease" Neuropathology and Applied Neurobiology, vol. 41(4), pp. 471-482 (2015).
Puzzo, D. "Amyloid-beta peptide inhibits activation of the nitric oxide/cGMP/cAMP-responsive element-binding protein pathway during hippocampal synaptic plasticity" The Journal of Neuroscience, vol. 25(29), pp. 6887-6897 (2005).
Domek-Łopacińska, K.U. "Cyclic GMP and nitric oxide synthase in aging and Alzheimer's disease." Molecular Neurobiology, vol. 41(2-3), pp. 129-137 (2010).
Chen, X. et al "Yonkenafil: a novel phosphodiesterase type 5 inhibitor induces neuronal network potentiation by a cGMP-dependent Nogo-R axis in acute experimental stroke" Experimental Neurology, vol. 261, pp. 267-277 (2014).
Puzzo, D. et al, "Effect of phosphodiesterase-5 inhibition on apoptosis and beta amyloid load in aged mice" Neurobiology of Aging, vol. 35 (3), pp. 520-531 (2014).
Yin, C. et al, "Icariside II, a novel phosphodiesterase-5 inhibitor, attenuates streptozotocin-induced cognitive deficits in rats" Neuroscience, vol. 328, pp. 69-79 (2016).
Yan, L. et al, "Icariside II Effectively Reduces Spatial Learning and Memory Impairments in Alzheimer's Disease Model Mice Targeting Beta-Amyloid Production" Front Pharmacology, vol. 8(8), pp. 106 (2017).
Zhang, J. et al, "Phosphodiesterase-5 inhibitor sildenafil prevents neuroinflammation, lowers beta-amyloid levels and improves cognitive performance in APP/PS1 transgenic mice" Behavioural Brain Research, vol. 250, pp. 230-237 (2013).
Duarte-Silva, E. et al, "Molecular Mechanisms of Phosphodiesterase-5 Inhibitors on Neuronal Apoptosis" DNA and Cell Biology, vol. 37 (11), 861-865 (2018).
Wan, W. et al, "The role of Wnt signaling in the development of Alzheimer's disease: a potential therapeutic target?" Biomed Research International, vol. 2014, article 301575, pp. 1-9 (2014).
Caricasole, A. et al, "Induction of Dickkopf-1, a negative modulator of the Wnt pathway, is associated with neuronal degeneration in Alzheimer's brain" The Journal of Neuroscience, vol. 24(26), pp. 6021-6027 (2004).
Dickins, E.M. et al, "Wnts in action: from synapse formation to synaptic maintenance" Frontiers in Cellular Neuroscience, vol. 7. Article 162, pp. 1-11 (2013).
Purro, S.A. et al, "The secreted Wnt antagonist Dickkopf-1 is required for amyloid β-mediated synaptic loss" The Journal of Neuroscience, vol. 32(10), pp. 3492-3498 (2012).
Purro, S.A. et al., "Dysfunction of Wnt signaling and synaptic disassembly in neurodegenerative diseases" Journal of molecular Cell Biology, vol. 6(1), pp. 75-80 (2014).
Liu, C.C. et al, "Deficiency in LRP6-mediated Wnt signaling contributes to synaptic abnormalities and amyloid pathology in Alzheimer's disease" Neuron, vol. 84(1), pp. 63-77 (2014).
Gong, Y. et al, "Inhibition of phosphodiesterase 5 reduces bone mass by suppression of canonical Wnt signaling" Cell Death & Disease, vol. 5, article e1544, pp. 1-12 (2014).
Marzo, A. et al, Reversal of Synapse Degeneration by Restoring Wnt Signaling in the Adult Hippocampus urr Biol, vol. 26(19), pp. 2551-2561 (2016).
Vallee, A. et al, "Alzheimer Disease: Crosstalk between the Canonical Wnt/ Beta-Catenin Pathway and PPARs Alpha and Gamme" Frontiers in Neuroscience, vol. 10. Article 459, pp. 1-12 (2016).
Elliott, C. et al, "A role for APP in Wnt signalling links synapse loss with β-amyloid production" Translational Psychiatry, vol. 8(1), Article 179, pp. 1-13 (2018).
Medina, M. et al, "Modulation of GSK-3 as a therapeutic strategy on tau pathologies" Frontiers in Molecular Neuroscience, vol. 4:24, pp. 1-10 (2011).
Takeda, A. et al, "Tau Propagation as a Diagnostic and Therapeutic Target for Dementia: Potentials and Unanswered Questions" Frontiers in Neuroscience, vol. 13, Article1274, pp. 1-8 (2019).
Puzzo et al., "Phosphodiesterase 5 inhibition improves synaptic function, memory, and amyloid-beta load in an Alzheimer's Disease mouse model," J. Neurosci., 2009, vol. 29(25), pp. 8075-8086.
Garcia-Osta et al., "Phosphodiesterases as therapeutic targets for Alzheimer's Disease," ACS Chem. Neurosci., 2012, vol. 3, pp. 832-844.
Office Action dated Jan. 25, 2024 for corresponding Chinese Application No. CN202080038090.7, 6 pages.

(56) References Cited

OTHER PUBLICATIONS

International Search Report dated Nov. 2, 2020 for International Application No. PCT/IB2020/052771, 11 pages.
Park et al., "Mirodenafil for the treatment of erectile dysfunction: a systematic review of the literature," World J. Men's Health, 2014 vol. 32(1), pp. 18-27.
Jia, L. et al, "Restoring Wnt/β-catenin signaling is a promising therapeutic strategy for Alzheimer's disease" Molecular Brain, vol. 12(104), pp. 1-11 (2019).
Takashima, A. et al, "Activation of tau protein kinase I/glycogen synthase kinase-3beta by amyloid beta peptide (25-35) enhances phosphorylation of tau in hippocampal neurons" Neuroscience Research, vol. 31(4), pp. 317-323 (1998).
Götz, J. et al, "Molecular Pathogenesis of the Tauopathies" Annual Review of Pathology, vol. 14. pp. 239-261 (2019).
Halliwell, B. et al, "Oxidative stress and neurodegeneration: where are we now?" Journal of Neurochemistry, vol. 97 (6), pp. 1634-1658 (2006).
Malhotra, J.D. et al, "Endoplasmic reticulum stress and oxidative stress: a vicious cycle or a double-edged sword?" Antioxidants & Redox Signaling, vol. 9(12), pp. 2277-2293 (2007).
Umeda, T. et al "Intraneuronal amyloid β oligomers cause cell death via endoplasmic reticulum stress, endosomal/lysosomal leakage, and mitochondrial dysfunction in vivo" Journal of Neuroscience Research, vol. 89(7), pp. 1031-1042 (2011).
Small, S. et al"Endosomal Traffic Jams Represent a Pathogenic Hub and Therapeutic Target in Alzheimer's Disease" Trends in Neuroscience, vol. 40(10), pp. 592-602 (2017).
Ladanza, M.G. et al, "A new era for understanding amyloid structures and disease" Nature Reviews: Molecular Cell Biology, vol. 19(12), pp. 755-773, (2018).
Nixon, R.A. et al, "The role of autophagy in neurodegenerative disease" Nature Medicine, vol. 19(8), pp. 983-997 (2013).
Nah, J. et al, "Autophagy in neurodegenerative diseases: from mechanism to therapeutic approach" Molecules and Cells, vol. 38(5), pp. 381-389 (2015).
Boland, B. et al, "Promoting the clearance of neurotoxic proteins in neurodegenerative disorders of ageing" Nature Reviews Drug Discovery, vol. 17(9), pp. 660-688 (2018).
Li, Q. et al., "The role of autophagy in Alzheimer's disease" J Syst Integr Neurosci. 2017;3(4): 1-6.
Yu, W.H. et al, "Macroautophagy—a novel Beta-amyloid peptide-generating pathway activated in Alzheimer's disease" The Journal of Cell Biology, vol. 171(1). pp. 87-98 (2005).
Uddin, M.S. et al, "Autophagy and Alzheimer's Disease: From Molecular Mechanisms to Therapeutic Implications" Frontiers in Aging Neuroscience. vol. 10. Issue 4, pp. 1-4 (2018).
Herzig, S. et al, "AMPK: guardian of metabolism and mitochondrial homeostasis" Nature Reviews: Molecular Cell Biology, vol. 19(2), pp. 121-135 (2018).
Garcia, D. et al., "AMPK: Mechanisms of Cellular Energy Sensing and Restoration of Metabolic Balance" Molecular Cell, vol. 66(6), pp. 789-800 (2017).
Kim, J. et al, "AMPK activators: mechanisms of action and physiological activities" Experimental & Molecular Medicine, vol. 48, Article e224, pp. 1-12 (2016).
Steinberg, G.R. et al, "AMP-activated protein kinase: the current landscape for drug development" Nature Reviews Drug Discovery, vol. 18(7), pp. 527-551 (2019).
Fujikake, N. et al, "Association Between Autophagy and Neurodegenerative Diseases" Frontiers in Neuroscience, vol. 12, article 255, pp. 1-11 (2018).
Wang, X. et al, "Therapeutic Potential of AMP-Activated Protein Kinase in Alzheimer's Disease" Journal of Alzheimers Disease, vol. 68(1), pp. 33-38 (2019).

\* cited by examiner

```
                          SEQUENCE LISTING

Sequence total quantity: 18
SEQ ID NO: 1            moltype = DNA  length = 20
FEATURE                 Location/Qualifiers
source                  1..20
                        mol_type = genomic DNA
                        organism = Homo sapiens
SEQUENCE: 1
ctggtataca cccatccggc                                                   20

SEQ ID NO: 2            moltype = DNA  length = 20
FEATURE                 Location/Qualifiers
source                  1..20
                        mol_type = genomic DNA
                        organism = Homo sapiens
SEQUENCE: 2
cttgggcaaa cgaaggttgg                                                   20

SEQ ID NO: 3            moltype = DNA  length = 18
FEATURE                 Location/Qualifiers
source                  1..18
                        mol_type = genomic DNA
                        organism = Homo sapiens
SEQUENCE: 3
ccaggtcatc accattgg                                                     18

SEQ ID NO: 4            moltype = DNA  length = 18
FEATURE                 Location/Qualifiers
source                  1..18
                        mol_type = genomic DNA
                        organism = Homo sapiens
SEQUENCE: 4
cagagtactt gcgctcag                                                     18

SEQ ID NO: 5            moltype = DNA  length = 21
FEATURE                 Location/Qualifiers
source                  1..21
                        mol_type = genomic DNA
                        organism = Homo sapiens
SEQUENCE: 5
attccaacgc tatcaagaac c                                                 21

SEQ ID NO: 6            moltype = DNA  length = 22
FEATURE                 Location/Qualifiers
source                  1..22
                        mol_type = genomic DNA
                        organism = Homo sapiens
SEQUENCE: 6
ccaaggtgct atgatcatta cc                                                22

SEQ ID NO: 7            moltype = DNA  length = 19
FEATURE                 Location/Qualifiers
source                  1..19
                        mol_type = genomic DNA
                        organism = Mus musculus
SEQUENCE: 7
tctgctagga gccagtgcc                                                    19
```

```
SEQ ID NO: 8              moltype = DNA    length = 21
FEATURE                   Location/Qualifiers
source                    1..21
                          mol_type = genomic DNA
                          organism = Mus musculus
SEQUENCE: 8
gatggtgatc tttctgtatc c                                                   21

SEQ ID NO: 9              moltype = DNA    length = 19
FEATURE                   Location/Qualifiers
source                    1..19
                          mol_type = genomic DNA
                          organism = Mus musculus
SEQUENCE: 9
ctgtccctgt atgcctctg                                                      19

SEQ ID NO: 10             moltype = DNA    length = 18
FEATURE                   Location/Qualifiers
source                    1..18
                          mol_type = genomic DNA
                          organism = Mus musculus
SEQUENCE: 10
atgtcacgca cgatttcc                                                       18

SEQ ID NO: 11             moltype = DNA    length = 22
FEATURE                   Location/Qualifiers
source                    1..22
                          mol_type = genomic DNA
                          organism = Mus musculus
SEQUENCE: 11
ctctttggcc gagagttcgt gg                                                  22

SEQ ID NO: 12             moltype = DNA    length = 22
FEATURE                   Location/Qualifiers
source                    1..22
                          mol_type = genomic DNA
                          organism = Mus musculus
SEQUENCE: 12
cctcggttgc cgtaaaggac gc                                                  22

SEQ ID NO: 13             moltype = DNA    length = 22
FEATURE                   Location/Qualifiers
source                    1..22
                          mol_type = genomic DNA
                          organism = Mus musculus
SEQUENCE: 13
ctcgcatggc atagatgggt gc                                                  22

SEQ ID NO: 14             moltype = DNA    length = 21
FEATURE                   Location/Qualifiers
source                    1..21
                          mol_type = genomic DNA
                          organism = Mus musculus
SEQUENCE: 14
gcaggtgtgc acgtcataga c                                                   21

SEQ ID NO: 15             moltype = DNA    length = 20
FEATURE                   Location/Qualifiers
source                    1..20
                          mol_type = genomic DNA
                          organism = Mus musculus
SEQUENCE: 15
catggagtgt ctggctcctg                                                     20

SEQ ID NO: 16             moltype = DNA    length = 22
FEATURE                   Location/Qualifiers
source                    1..22
                          mol_type = genomic DNA
                          organism = Mus musculus
SEQUENCE: 16
gtccatcccc tctgaggtct tg                                                  22

SEQ ID NO: 17             moltype = DNA    length = 20
FEATURE                   Location/Qualifiers
source                    1..20
                          mol_type = genomic DNA
                          organism = Mus musculus
SEQUENCE: 17
cgggagatca agcagaatgc                                                     20
```

```
SEQ ID NO: 18         moltype = DNA  length = 22
FEATURE               Location/Qualifiers
source                1..22
                      mol_type = genomic DNA
                      organism = Mus musculus
SEQUENCE: 18
gcctagctct cggaactgtg gc                                              22
```

METHODS FOR TREATING ALZHEIMER DISEASE AND FOR REDUCING AMYLOID BETA FORMATION

CROSS REFERENCE TO RELATED APPLICATIONS

The present application is a continuation of U.S. patent application Ser. No. 17/593,842, filed Sep. 24, 2021, published as US2022/0168308, which is a national stage entry under 35 U.S.C. § 371 of International Patent Application No. PCT/IB2020/052771 published as WO 2020/201915 A2, filed Mar. 24, 2020, which claims priority to U.S. Provisional Patent Application No. 62/822,975, filed Mar. 24, 2019, the entire disclosure of each of which is incorporated by reference herein.

REFERENCE TO AN ELECTRONIC SEQUENCE LISTING

The content of the electronic sequence listing (Sequence Listing 157710_600467.xml; Size: 16,878 bytes; and Date of Creation: Aβ r. 21, 2025) is herein incorporated by reference in its entirety.

FIELD OF THE INVENTION

The present invention is related to methods for reducing amyloid beta formation and for treating diseases associated with the accumulation of amyloid beta.

BACKGROUND OF THE INVENTION

Dementia refers to a clinical disease that suffers from multiple cognitive impairment (or MCD, Multiple Cognitive Deficits) as an acquired brain disease that shows multifaceted pathogenesis caused by a variety of genetic and environmental risk factors. A representative of diseases causing dementia is Alzheimer's disease, mainly endemic in senior people and contributed to 60-70% of the all dementia (Ann Neurol. 1993 May; 33 (5): 494-501.). Recent rapid aging of population, more progressive dementia in older people by Alzheimer's has increased and so does the need for treatment of dementia. However, the difficulties of research and development in additional low rate of success down the process of development of new therapeutics and treatment method for dementia. Based on 2014 GBI Research data, the success rate for final approval of a therapeutics for Alzheimer's disease is less than 1%, as 72% in clinical phase II, 92% of clinical phase III, and 99.6% of NDA application failed and about 80% of the currently on-going pipelines are only for "exploratory and/or pre-clinical stage."

The current conventional list of FDA approved drugs include AChE (Acetylcholinesterase) Inhibitor and NMDA (N-Methyl-D-Aspartate) Receptor Antagonist, used also in combination with antioxidant, NSAID (non-steroidal anti-inflammatory drugs), anti-inflammatory agents, statin formulations, or Hormone formulations, etc. However, these drugs are used only to relieve symptoms and delay or improvement of cognitive disorders, but there is no fundamental treatment for dementia at this moment.

Representative AChE Inhibitors includes Donepezil (Aricept™), Galantamine (Reminyl™), Rivastigmine (ENA-713, Exelon™), etc., and these drugs temporarily increase the concentration of neurotransmitters Acetylcholine to provide symptomatic treatment. In addition, these drugs are prescribed for patients with mild to moderate Alzheimer's disease, vascular dementia, dementia by Parkinson's disease, and stroke or cerebral subcortical ischemic vascular disease (J Korean Med Assoc 2009; 52 (4): 417-425.).

Typical NMDA Receptor Antagonist includes Memantine (Ebixa™), which causes excitotoxicity to inhibit glutamate transportation system which blocks synaptic plasticity to effectively reduce neuronal degeneration. Memantine was confirmed to be effective in the moderate or more dementia and Lewy body dementia with relatively low side effect, but showed only limited activity in an earlier state of disease (Arch Neurol 2011 August; 68 (8): 991-8). Thus, it was used more with ChE inhibitors and in mild and severe dementia than monotherapy. However, so far no clear evidence was found that the combination of AChE inhibitors and Menantine is more effective than AChE alone and additional study is required (Brain Neurorehabil 2015 March; 8 (1): 19-23.).

However, even though these drugs have been used for treatment of dementia and Alzheimer's disease for a long time, there is no clear standard for the usage and furthermore, even at the maximum recommended human dose (MRHD), either there was only no improvement or continued progress of the disease to lead the patients to the terminal stage in the treated patients, there has been a continuous concern with the usage of these drugs. However, until now in the absence of any therapeutics with confirmed efficacy, there is no alternatives but to continue the effort to develop new treatment for dementia (Korean J Biol Psychiatry 2016 May; 23 (2): 48-56.).

The main targets of candidates for dementia treatments that have been developed so far include: (1) inhibitors of BACE-1 (β-Secretase 1) or γ-Secretase Inhibitor to inhibit production of Aβ (Amyloid β), (2) Anti-Aβ Monoclonal Antibody to remove Aβ (Amyloid β), (3) Tau Aggregation Inhibitor and (One Amino Acid Kinase) TAOK Inhibitor to inhibit Tau Aggregation and Phosphorylation, (4) AChE Inhibitor and NMDA Receptor Antagonist to block AChE and NMDA Receptor, etc. Recently, pipelines targeting Aβ Plaque and Tau proteins have increased, among which about 70-80% of the candidates target suppression of Aβ production or removal Aβ. In addition, about 30% of the pipelines is biopharmaceuticals with dominantly high ratio of monoclonal antibody or peptide. However, due to the recent failures of clinical trials of candidates with high expectation, including Anti-Aβ Monoclonal Antibody targeting Aβ for targeted such as Aducanumab (Biogen), Solanezumab (Eli Lilly), and Gantenerumab (Roche), the assumption of Aβ as the target for treatment of dementia became uncertain. Nevertheless, it is accepted in general that the key target for development of therapeutics for dementia is suppression of Aβ formation and removal of the same.

One of the issues of Aβ targeted drug development is that it is very difficult for the monoclonal antibodies having large molecular weight to penetrate the cell membrane and thus, it can be effective only to remove extracellular amyloid plaque, and has only limited efficacy for the removal of intracellular Aβ oligomers. Furthermore, it is reported that intracellular Aβ Oligomers cause more cytotoxicity than the extracellular Aβ Oligomers and plays more important roles for neuronal cell death (J Biol Chem. 2002 May 3; 277 (18): 15666-70.). Therefore, development of small molecule drug which can penetrate the cell membrane than the macromolecules such as monoclonal antibody for removal of intracellular Aβ Oligomers.

One of the recent opinions drawing attention in the field is that the direction reason for the failure of the development of therapeutics for dementia could be the conventional approach, "One Drug, One Target" paradigm as the clinical disorder dementia is a disease of multifaceted pathogenesis. It is being accepted that this traditional approach cannot achieve a successful development of therapeutics for dementia. Currently, more and more interest for development of new therapeutics based on "One Drug, Multiple Targets/Mechanisms" paradigm to overcome the above-mentioned problems. Aβ proach such as one compound with multigarget/multimechanism activity becomes a new concept of new drug discovery and development (J Neural Transm (Vienna). 2013 June; 120 (6): 893-902., Future Med Chem. 2016 April; 8 (6): 697-711.). Therefore, to overcome the difficulties in the development of therapeutics for dementia and to increase the success rate of development, development of small molecule/polypharmacology drug based on "One Drug, Multiple Target/Mechanisms" paradigm, especially considering multifaceted pathogenensis of dementia, than the traditional "One Drug, One Target" paradigm is needed from the beginning of the discovery of the candidates and at pre-clinical stage (Expert Rev Clin Pharmacol 2013 January; 6 (1): 10.1586/ecp.12.74., Curr Pharm Des. 2016; 22 (21): 3171-81.).

SUMMARY OF THE INVENTION

One embodiment of the present invention provides a method to inhibit formation of Aβ Fibril/Plaque by removal of intracellular, toxic soluble Aβ Oligomer by administering one of the compounds selected from Mirodenafil, Sildenafil, Vardenafil, Tadalafil, Udenafil, Dasantafil, and Avanafil; and a pharmaceutically acceptable salt, solvate, or hydrate thereof.

The method of the present invention by one embodiment provides: (1) inhibition of formation of Aβ Oligomer/Fibril by suppression of Aβ aggregation, (2) inhibition of β-Amyloidogenic Processing by reduction of BACE-1, (3) reduction of formation of extracellular Aβ monomers, oligomers, Aβ Fibril/plaque by cerebral blood flow increase (vasodilation), (4) inhibition of neuronal cell death and acceleration of neurogenesis, synaptonegenesis, and/or promotion of angiogenesis by activation of NO (Nitric Oxide)/cGMP (Cyclic Guanosine Monophosphate)/PKG (Protein Kinase G), CREB (Cyclic AMP (Adenosine Monophosphate) Response Element Binding Protein) Pathway, (5) restoration of synaptic plasticity (synaptic Plasticity) by activation of Wint Signaling by inhibition of DKK-1 (Dickkopf WNT Signaling Pathway Inhibitor 1), and inhibition of production of APP (Amyloid Precursor Protein) and reduction of Aβ accumulation by suppression of positive feedback loop for Aβ production, and (6) inhibition of formation of Aβ Fibril/plaque by removal of intracellular toxic and soluble Aβ oligomers by activation of autophage.

In another embodiment, the present invention provides a pharmaceutical composition comprising one compound selected from Mirodenafil, Sildenafil, Vardenafil, Tadalafil, Udenafil, Dasantafil, and Avanafil; and a pharmaceutically acceptable salt, solvate, and hydrate thereof as an actgive ingredient, for (1) inhibition of Aβ Oligomer/Fibril formation by reduction of Aβ aggregation, (2) inhibition of β-Amyloidogenic Processing decreased BACE-1, (3) reduction of extracellular Aβ monomers, oligomers & Aβ Fibril/Plaque by increase of the cerebral blood flow, (4) suppression of neuronal cell death Inhibition and promotion of neurogenesis, synaptogenesis and/or angiogenesis by activation of NO/cGMP/PKG/CREB Pathway, (5) restoration of synaptic plasticity (synaptic Plasticity) by activation of Wint Signaling by inhibition of DKK-1, and inhibition of production of APP and reduction of Aβ accumulation by suppression of positive feedback loop for Aβ production, and (6) inhibition of formation of Aβ Fibril/plaque by removal of intracellular toxic and soluble Aβ oligomers by activation of autophage.

BRIEF DESCRIPTION OF THE DRAWINGS

Inhibition of Aβ Oligomer/Fibril Formation by Reduction of Aβ Aggregation

Suppression of β-Amyloidogenic Processing Through BACE-1 Reduction

Figure 3:
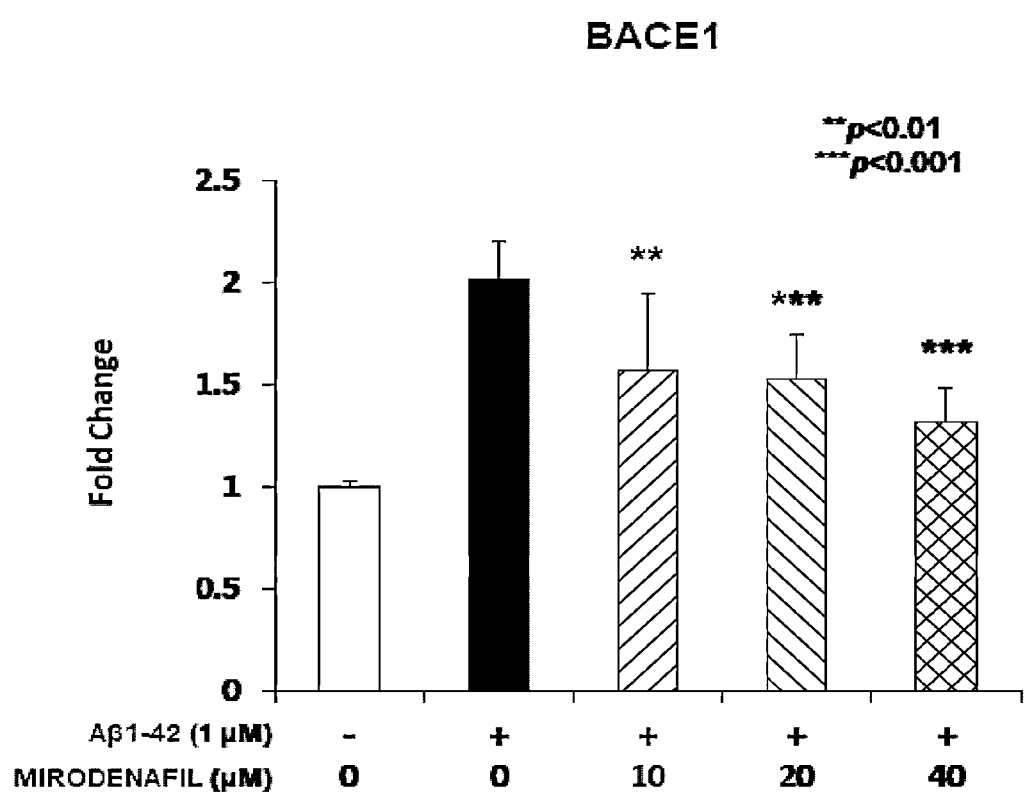

FIG. 3 present the result of qRT-PCR (Quantitative Real-Time Polymerase Chain Reaction) showing that BACE-1 mRNA level was increased in the Retinoic Acid Differentiated SH-SY5Y cell with the treatment of Aβ1-42 oligomers but indicating that the increased BACE-1 mRNA level is concentration-dependently decreased by the treatment with the composition of the present invention.

Figure 4:
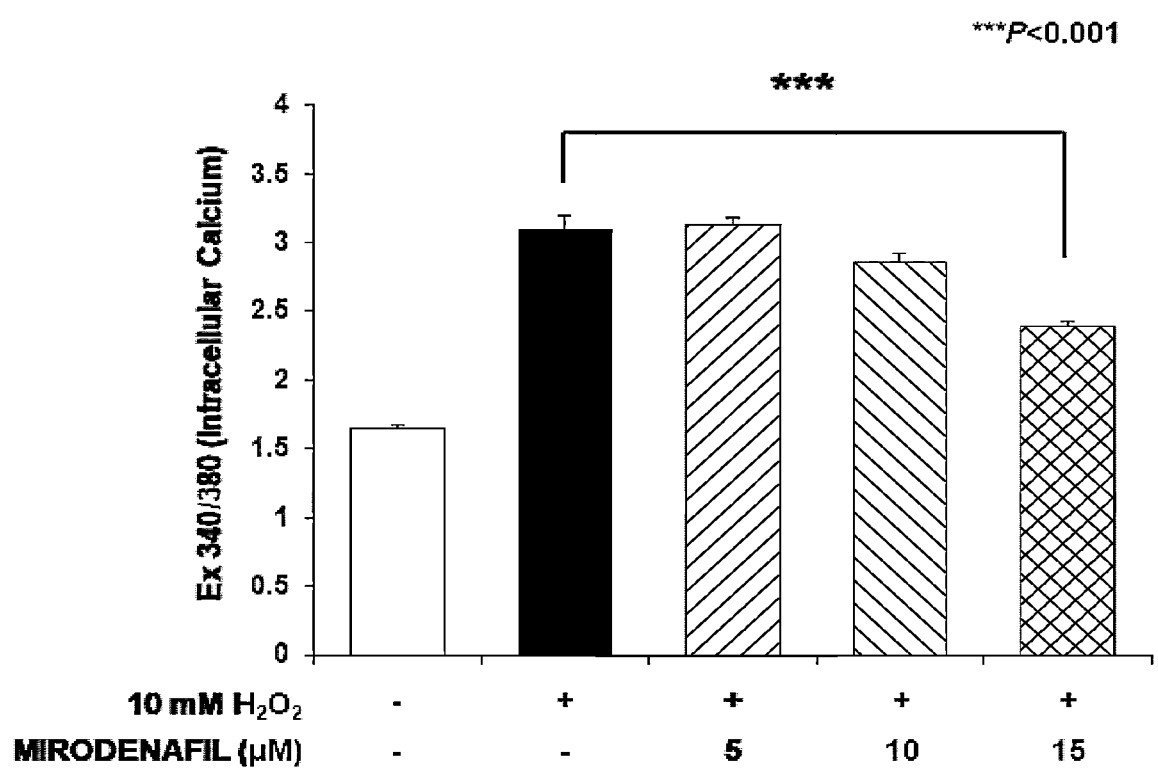

Reduction of Extracellular Aβ Monomers, Oligomers & Aβ Fibril/Plaque by the Increase of Brain Blood Flow FIG. 4 presents the result showing that intracellular calcium level, which was increased by the treatment of pericyte cells with hydrogen peroxide ($H_2O_2$), has been decreased by the treatment with the composition of the present invention.

Inhibition of Neuronal Cell Death by Activation of NO/cGMP/PKG/CREB Pathway

Figure 5:
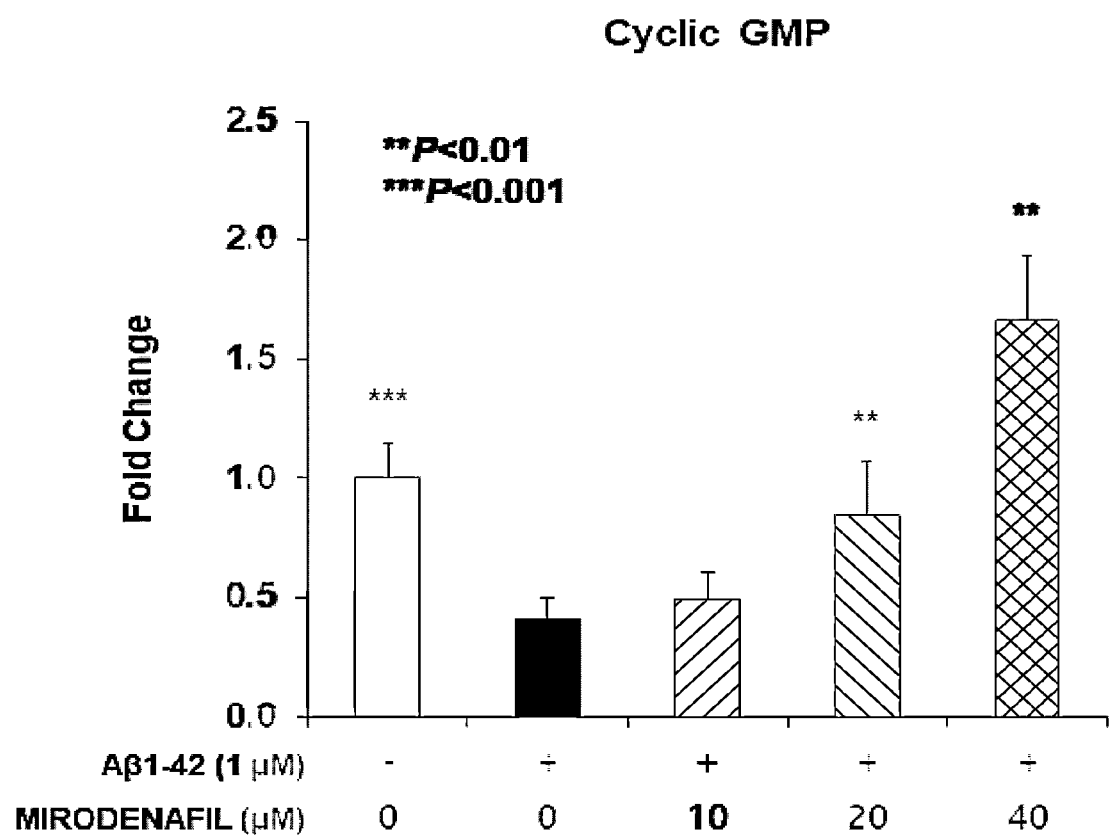

FIG. 5 presents Cyclic GMP Complete ELISA results showing that the amount of cGMP in retinoic acid differentiated SH-SY5Y Cell, which was decreased by the treatment of Aβ1-42 Oligomer, increased in a concentration-dependent matter by the treatment with the composition of the present invention.

Figure 6:
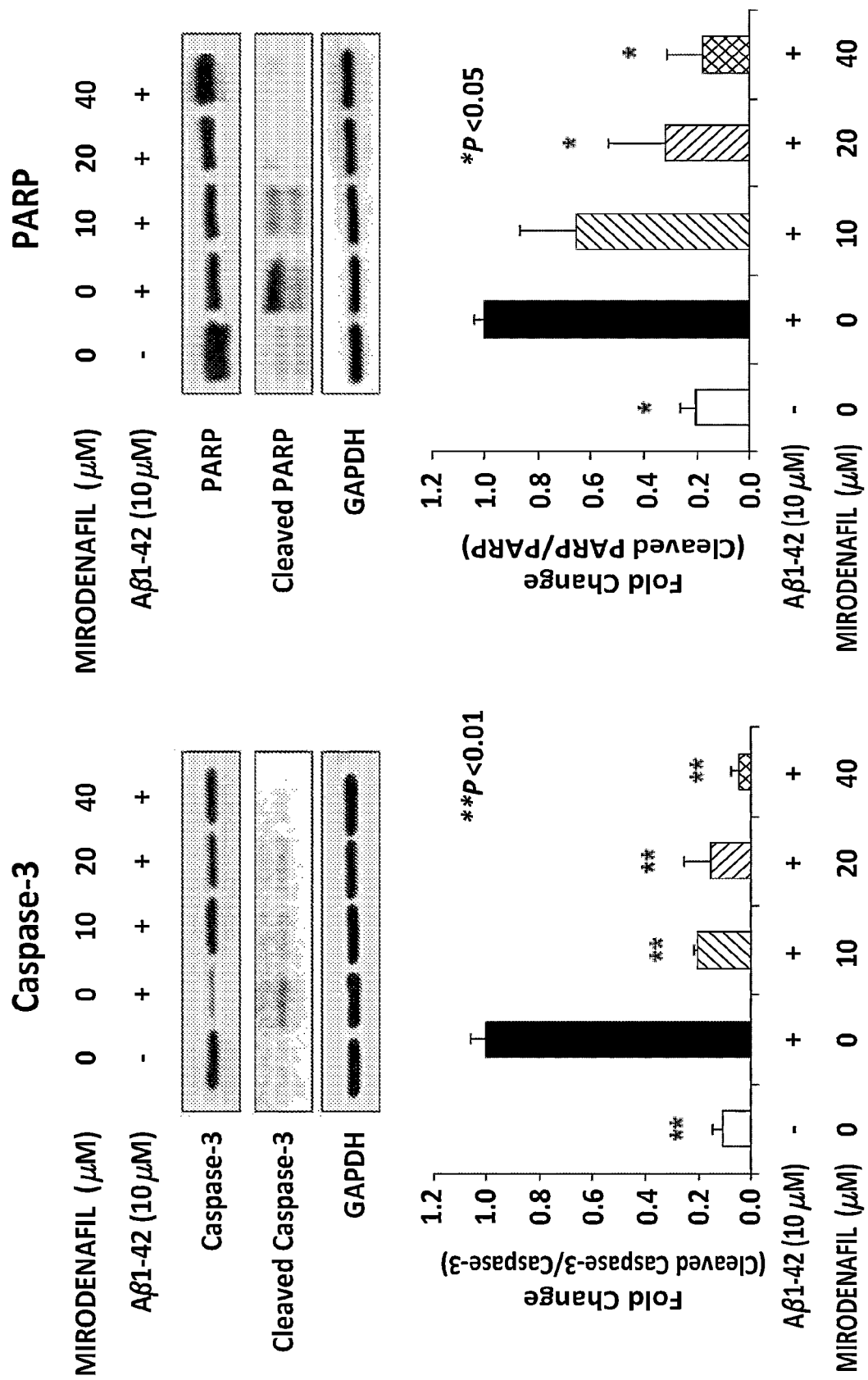

FIG. 6 presents result of Western Blot Analysis showing that reduction of the ratio of apoptosis-related proteins, Capase-3 and PARP [Poly (Adenosine Diphosphate-Ribose) Polymerase)] to Cleaved Capase-3/Caspase-3 and Cleaved PARP and Cleaved PARP/PARP, which was increased in retinoic acid differentiated SH-SY5Y Cell, has been decreased by the treatment with the composition of the present invention.

Figure 7:
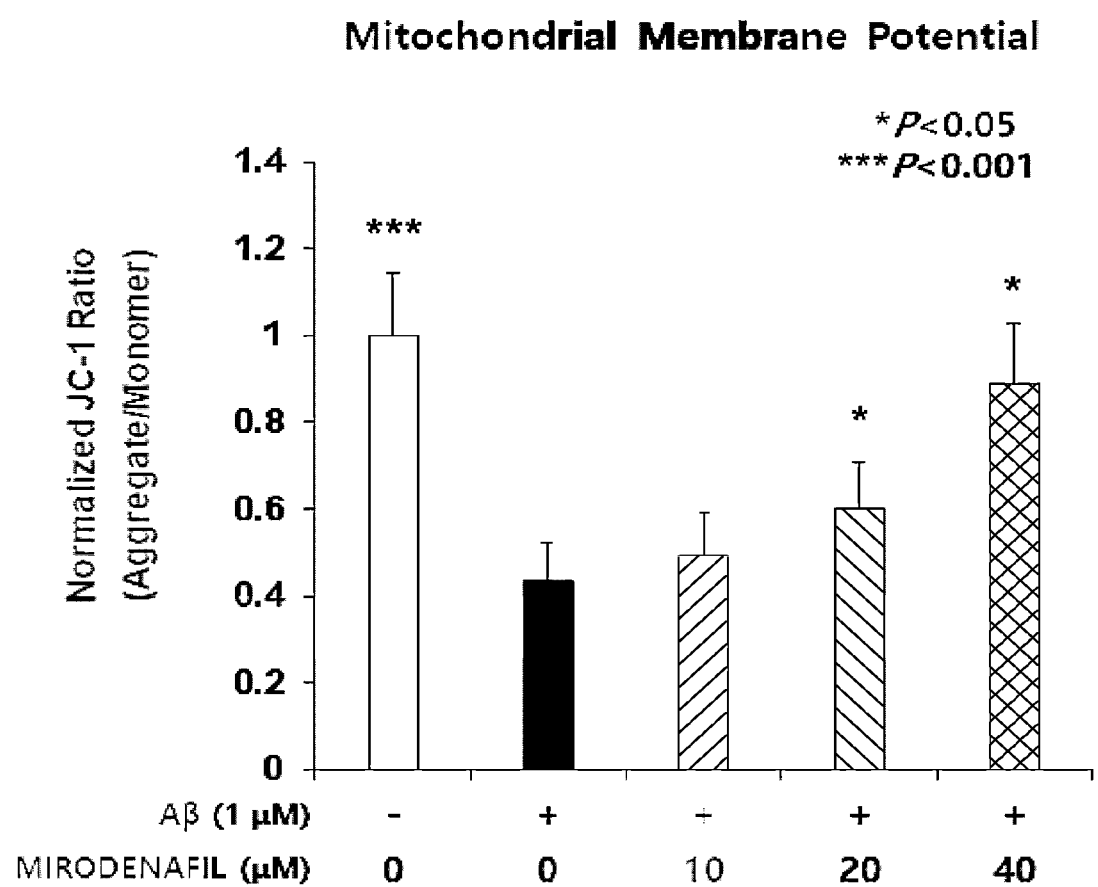

FIG. 7 presents the result of JC-1 Mitochondrial Membrane Potential Assay showing that the concentration of Mitochondrial Membrane Potential in retinoic acid differentiated SH-SY5Y Cell, which was decreased by the treatment of Aβ1-42 Oligomer, has been increased concentration-dependently by the treatment with the composition of the present invention.

Figure 8:
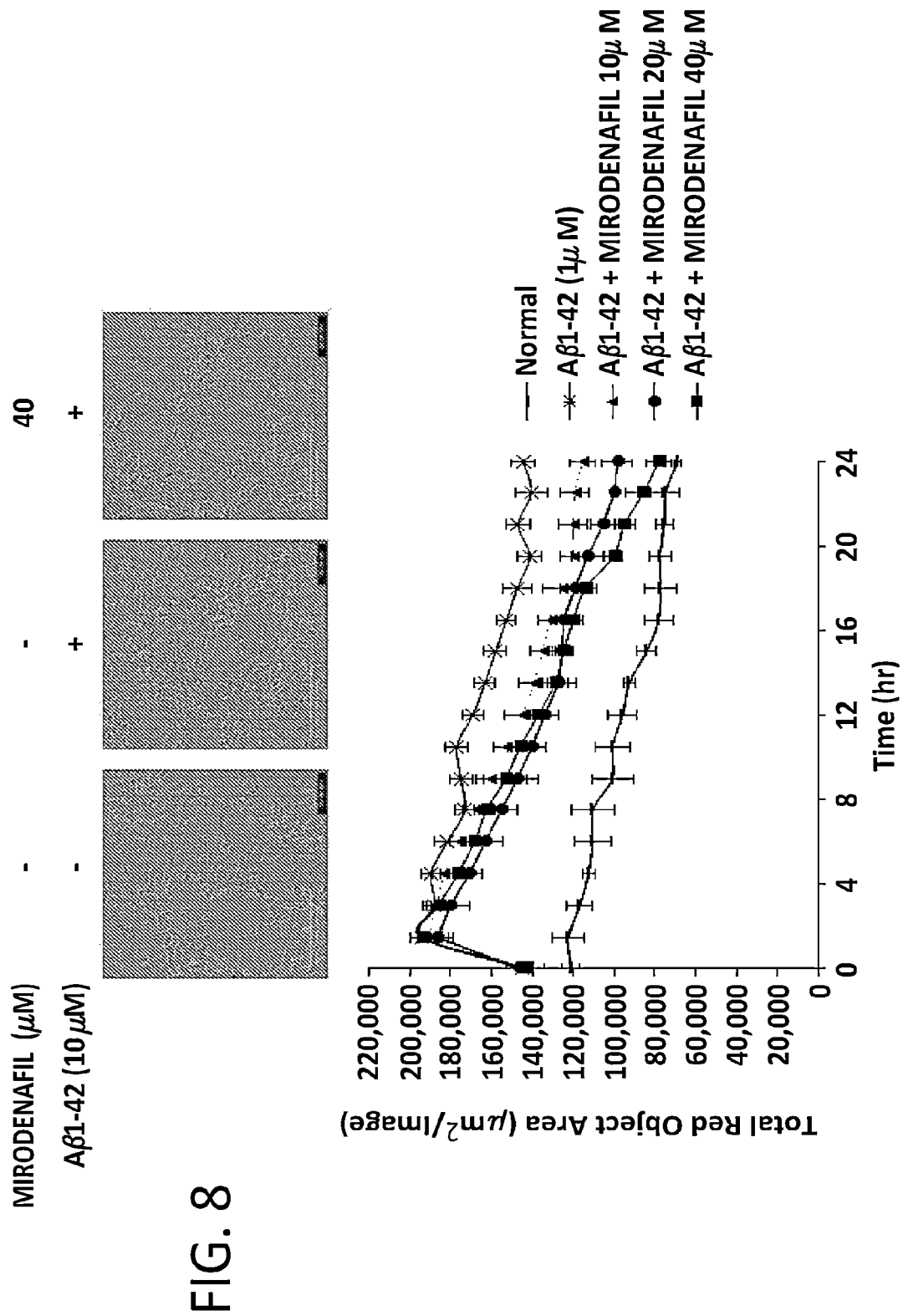

FIG. 8 presents the result of IncuCyte® S3 Live-Cell Analysis showing that number of dead cells dyed by Cytotox Red Reagent in retinoic acid differentiated SH-SY5Y Cell, which was increased by the treatment of Aβ1-42 Oligomer, has been reduced by the treatment with the composition of the present invention.

Figure 9:
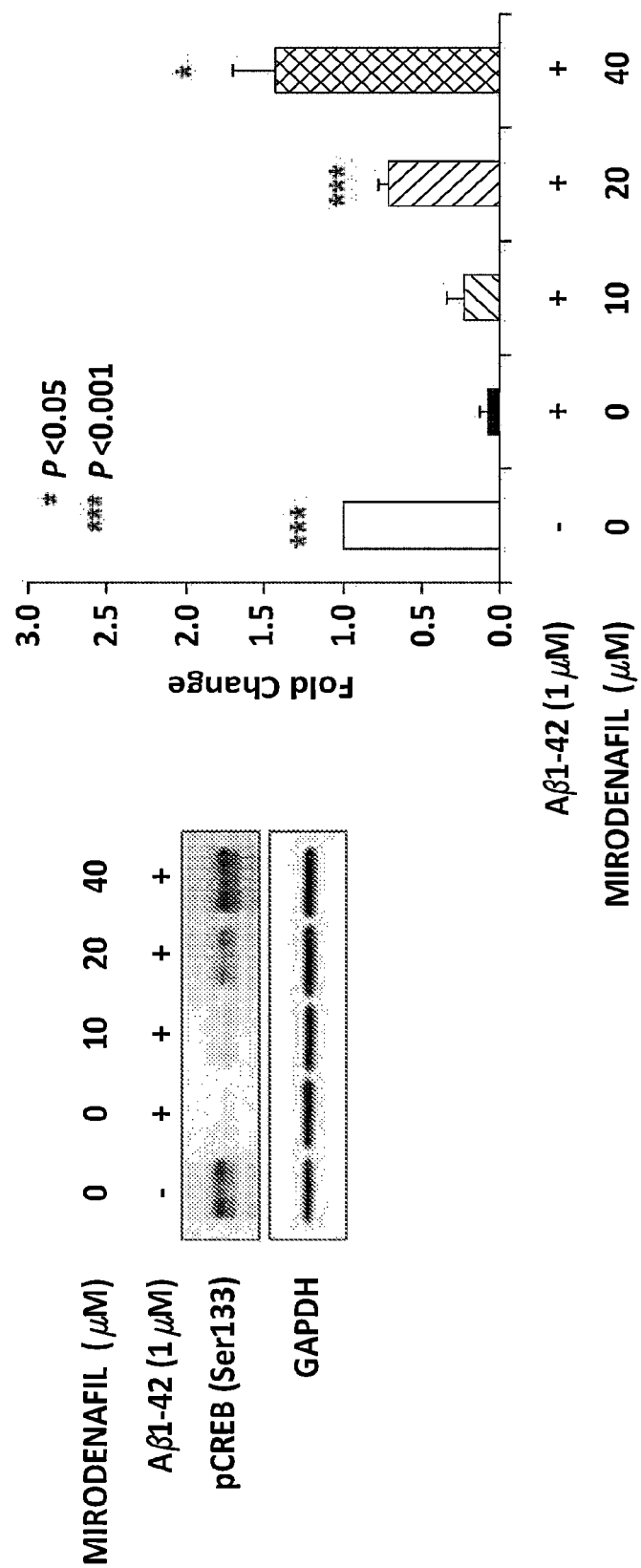

Promotion of Neurogenesis, Synaptogenesis, and Angiogenesis by Activating NO/cGMP/PKG/CREB Pathway FIG. 9 presents result of Western Blot Analysis showing that Ser133 phosphorylation of CREB protein in retinoic acid differentiated SH-SY5Y Cell, which was decreased by the treatment of Aβ1-42 Oligomer, increased concentration-dependently by the treatment with the composition of the present invention.

Figure 10:
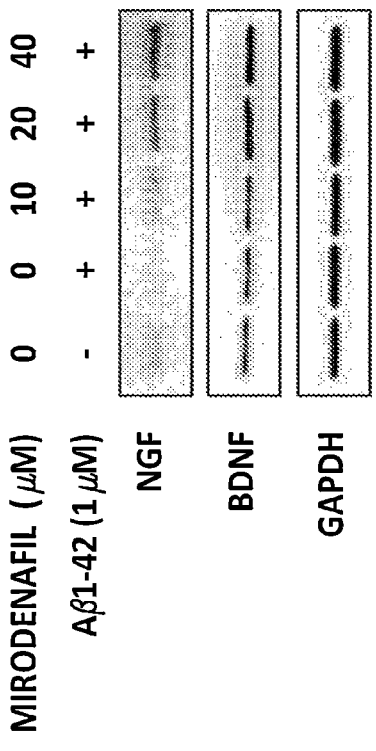
Figure 10:
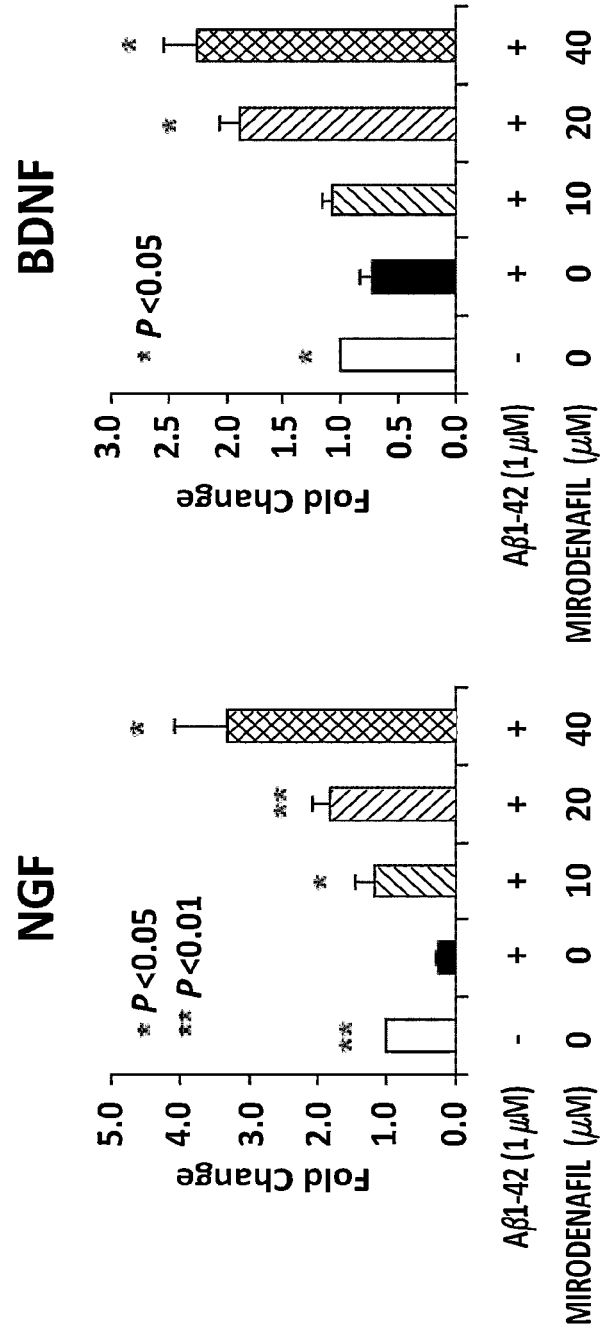

FIG. 10 presents result of Western Blot Analysis showing that Protein Level of NGF (Nerve Growth Factor) and BDNF (Brain-Derived Neurotrophic Factor) in retinoic acid differentiated SH-SY5Y Cell, which was decreased by the treatment of Aβ1-42 Oligomer, increased concentration-dependently by the treatment with the composition of the present invention.

Figure 11:
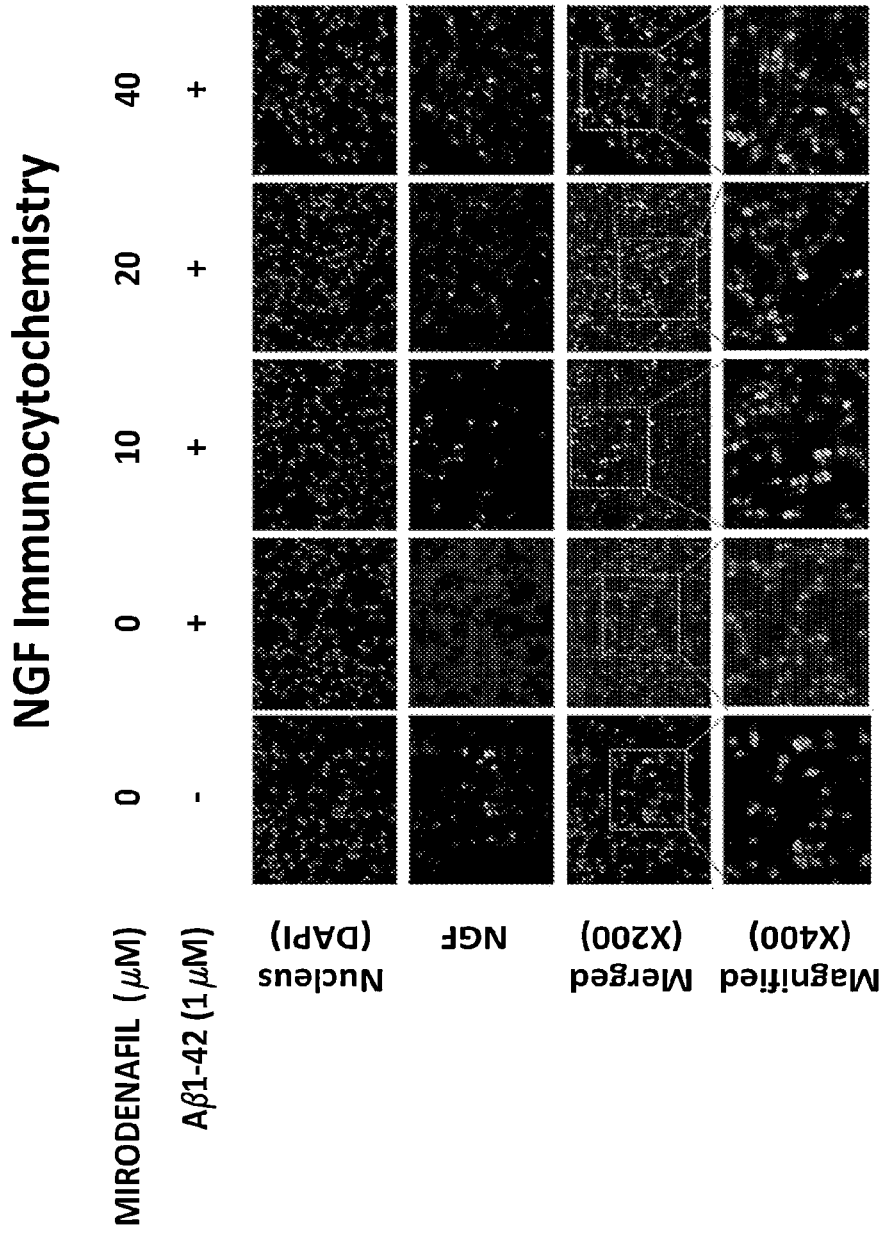

FIG. 11 presents result of NGF Immunocytochemistry showing that Protein Level of NGF (Nerve Growth Factor) in retinoic acid differentiated SH-SY5Y Cell, which was decreased by the treatment of Aβ1-42 Oligomer, increased by the treatment with the composition of the present invention.

Recovery of Synaptic Plasticity by Activation of Wnt Signaling Through DKK-1 Inhibition.

Figure 12:
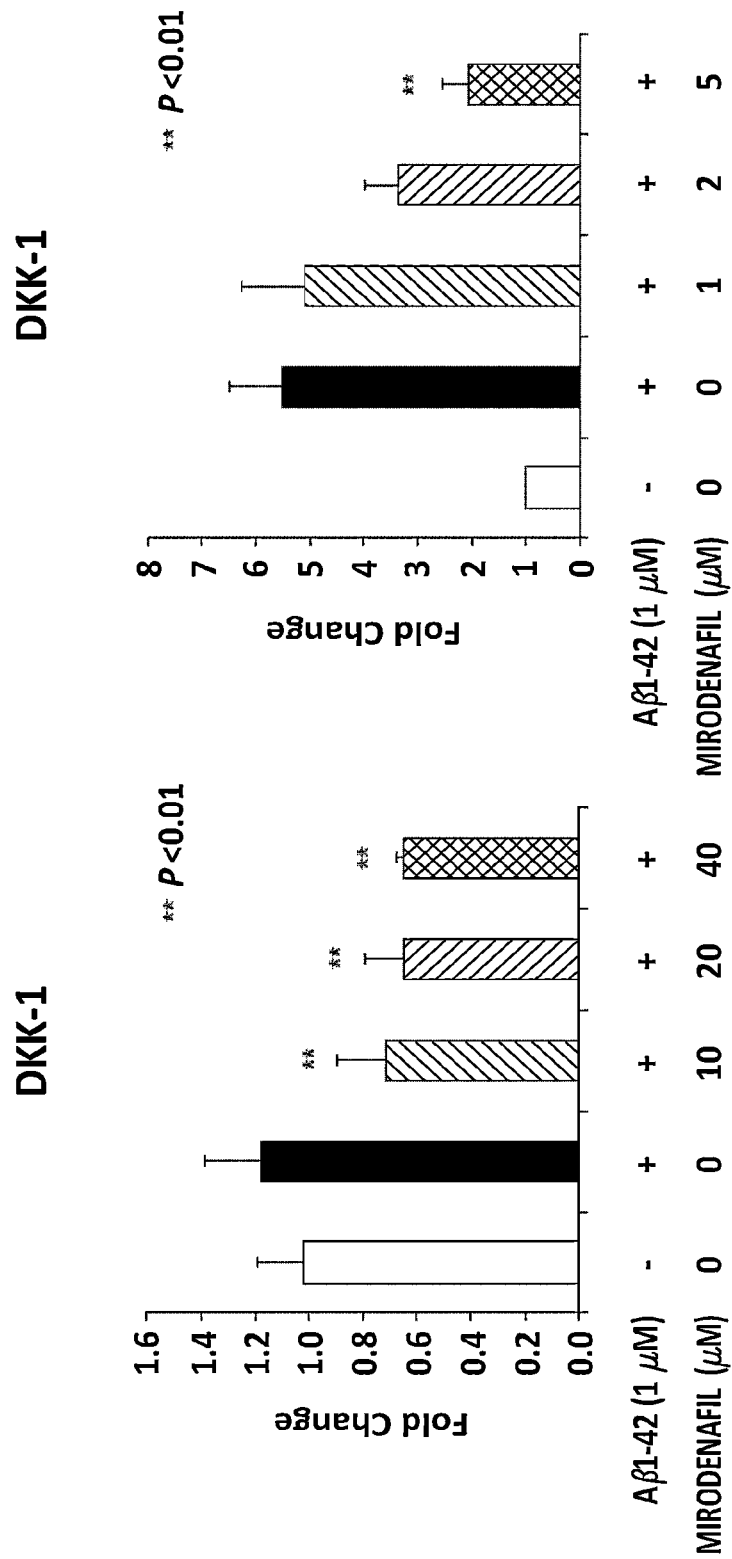

FIG. 12 presents result of qRT-PCR showing that level of DKK-1 mRNA in retinoic acid differentiated SH-SY5Y Cell and Differentiated HT-22 Mouse Hippocampal Neuronal Cell, which was increased by the treatment of Aβ1-42 Oligomer, decreased by the treatment with the composition of the present invention.

Figure 13:
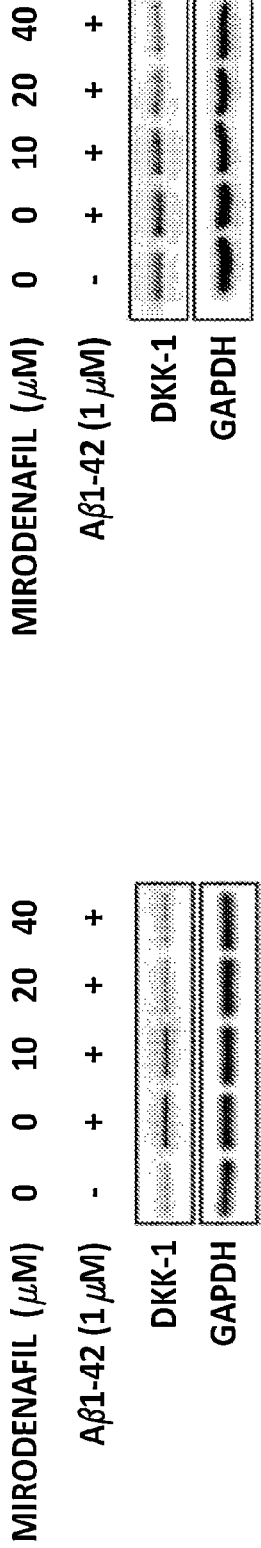
Figure 13:
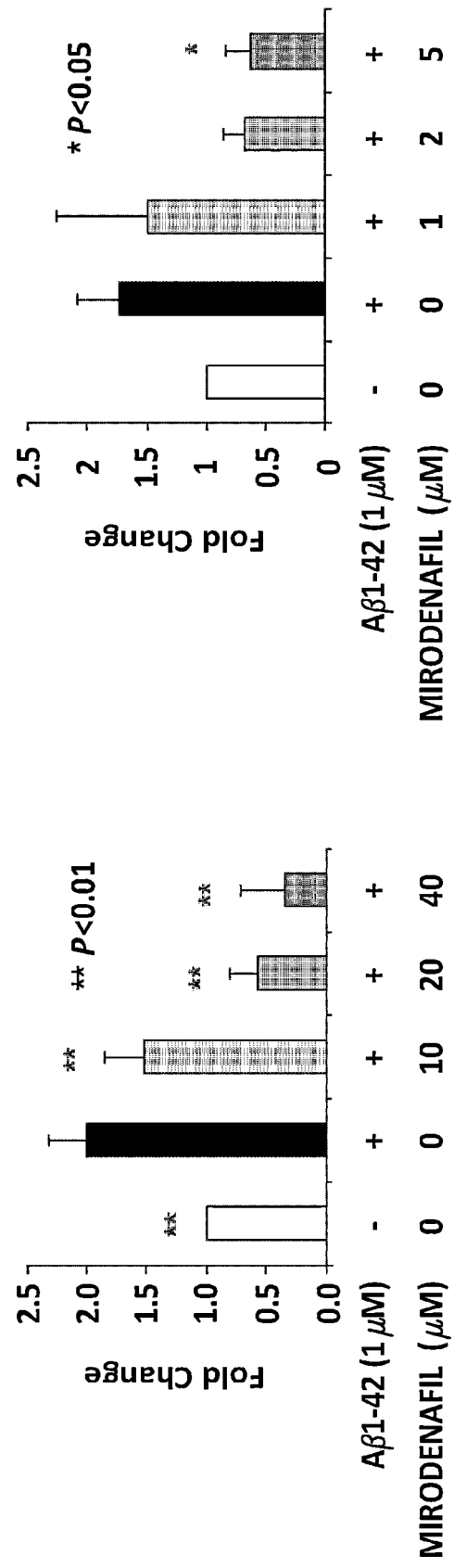

FIG. 13 presents result of qRT-PCR showing that level of DKK-1 protein in retinoic acid differentiated SH-SY5Y Cell and Differentiated HT-22 Mouse Hippocampal Neuronal Cell, which was increased by the treatment of Aβ1-42 Oligomer, decreased by the treatment with the composition of the present invention.

Figure 14:
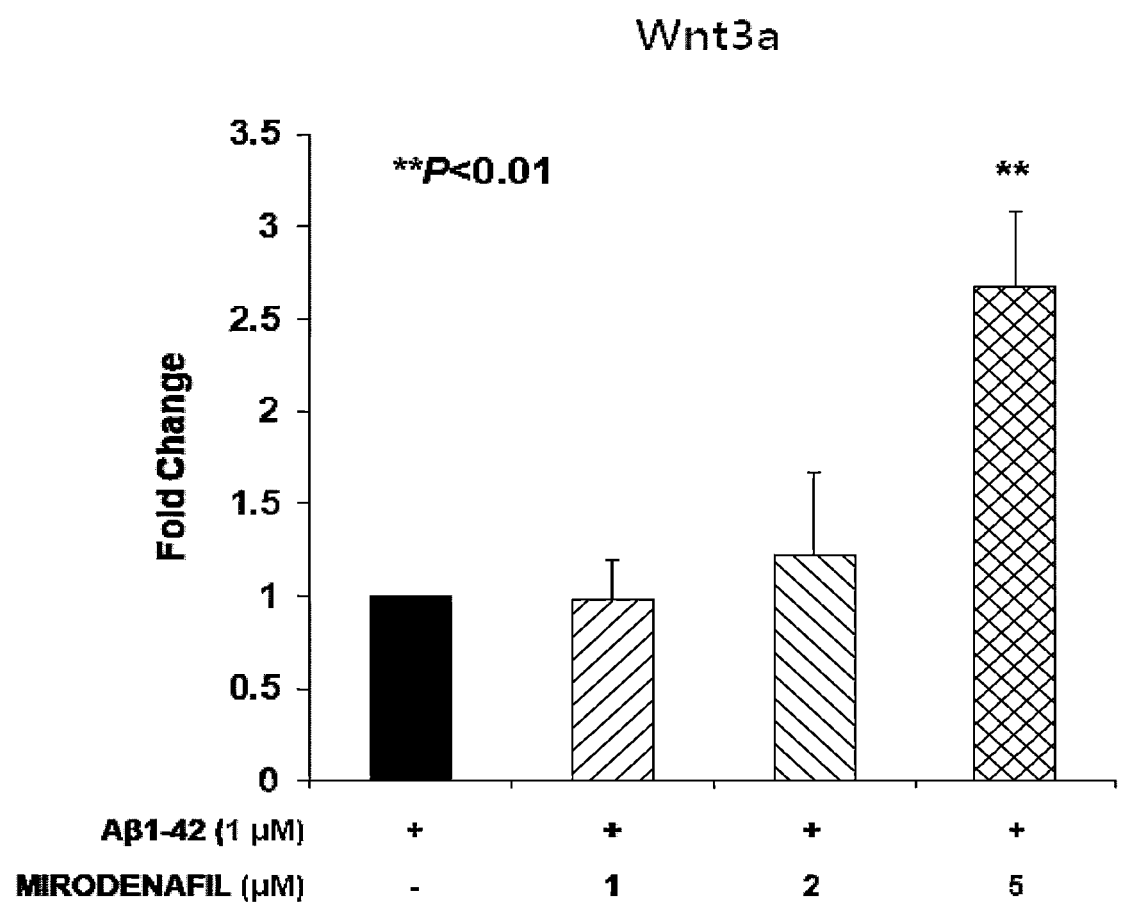

FIG. 14 presents result of qRT-PCR showing that level of Wnt3a mRNA in retinoic acid differentiated SH-SY5Y Cell and Differentiated HT-22 Mouse Hippocampal Neuronal Cell, which was first treated with Aβ1-42 Oligomer, increased by the treatment with the composition of the present invention compared to the control group.

Figure 15:
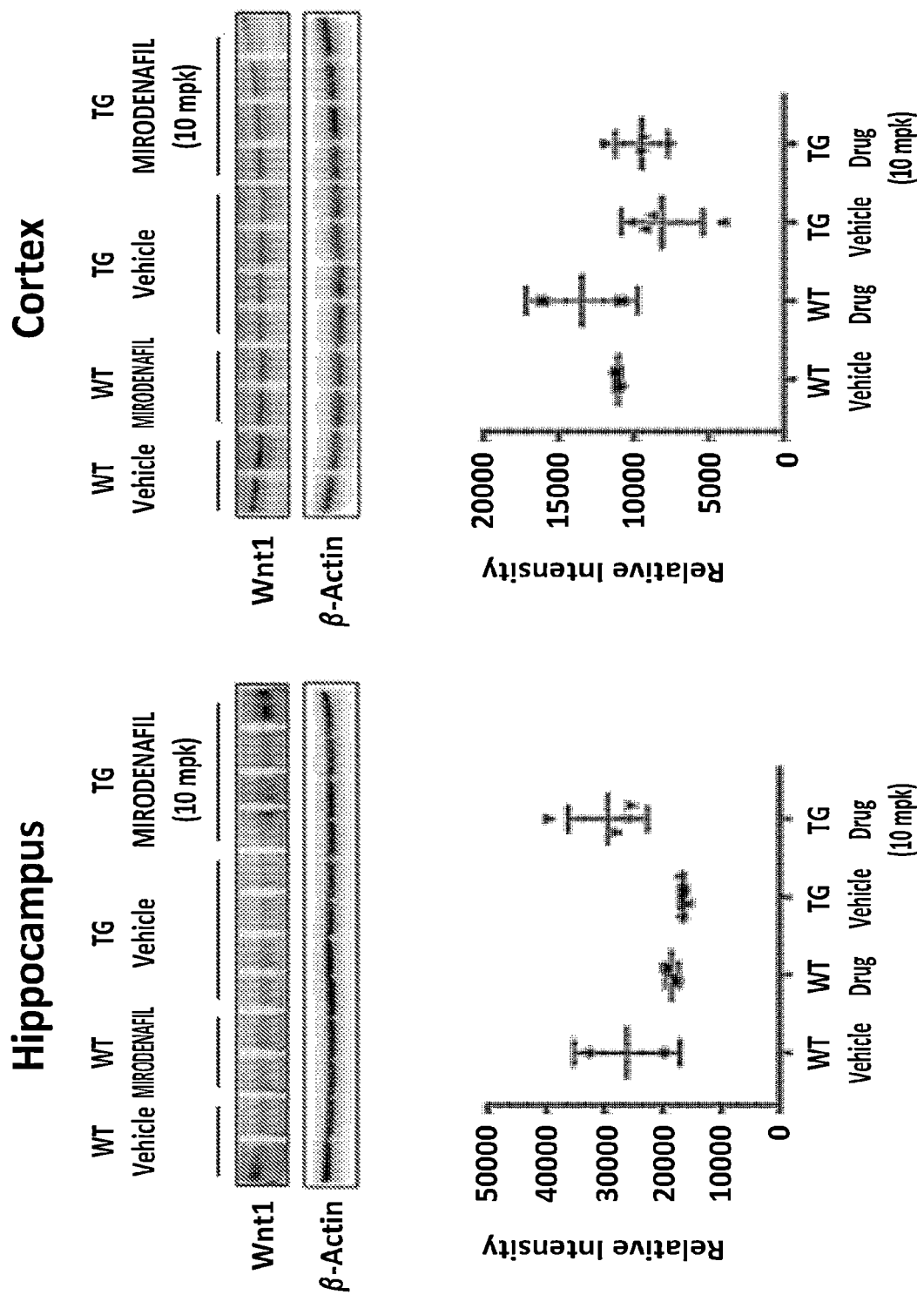

FIG. 15 presents result of Western Blot Analysis showing that reduced level of Wnt1 protein in the hippocampus of Alzheimer's disease animal model (5XFAD Transgenic Mice) has been increased by the treatment with the composition of the present invention.

Figure 16:
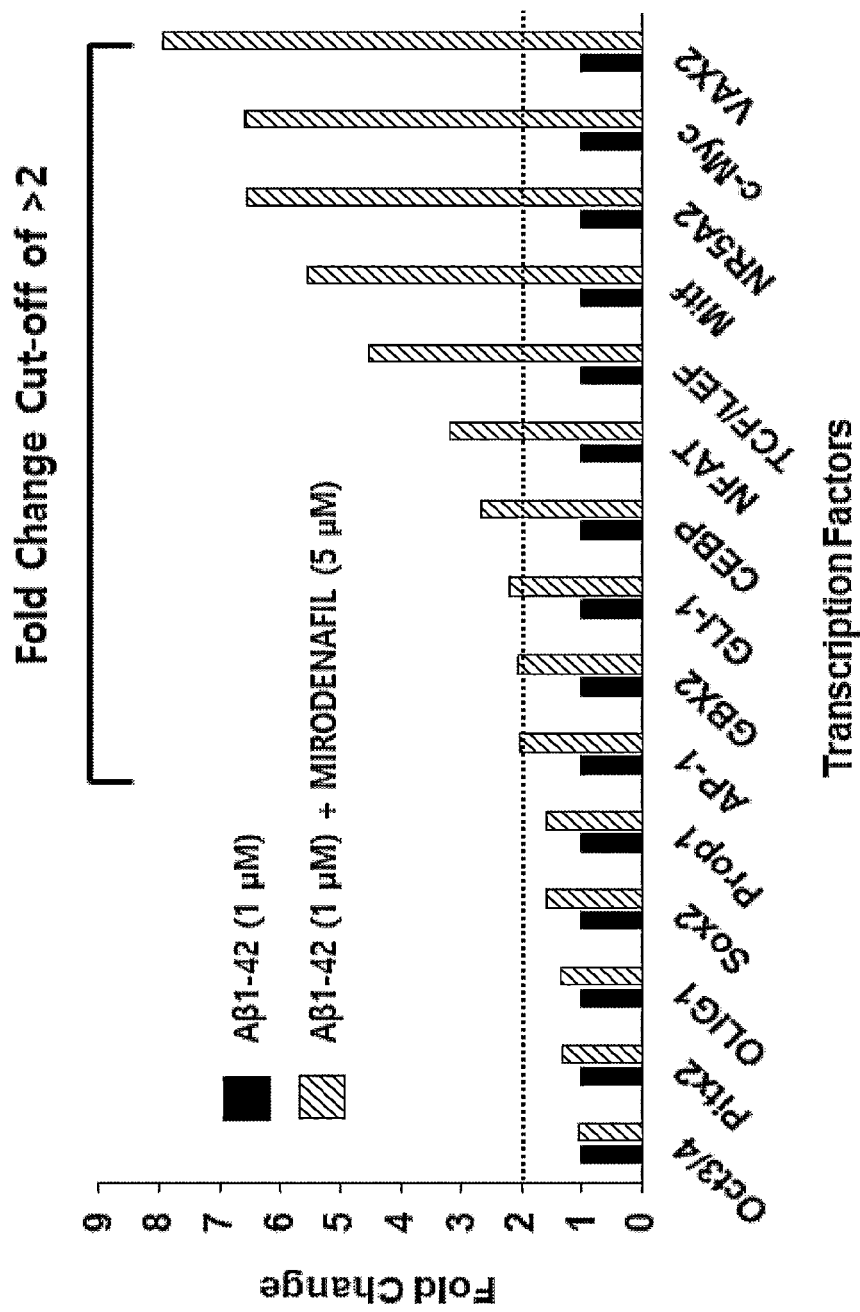

FIG. 16 presents result of Wnt/β-Catenin TF Array showing that activity of Wnt/β-Catenin related factors, VAX2, c-Myc, NR5A2, Mitf, TCF/LEF, NFAT, CEBP, GLI-1, GBX2, and AP-1 in retinoic acid differentiated SH-SY5Y Cell and Differentiated HT-22 Mouse Hippocampal Neuronal Cell, which was first treated with Aβ1-42 Oligomer, has been increased more than twice by the treatment with the composition of the present invention compared to the control group.

Figure 17:
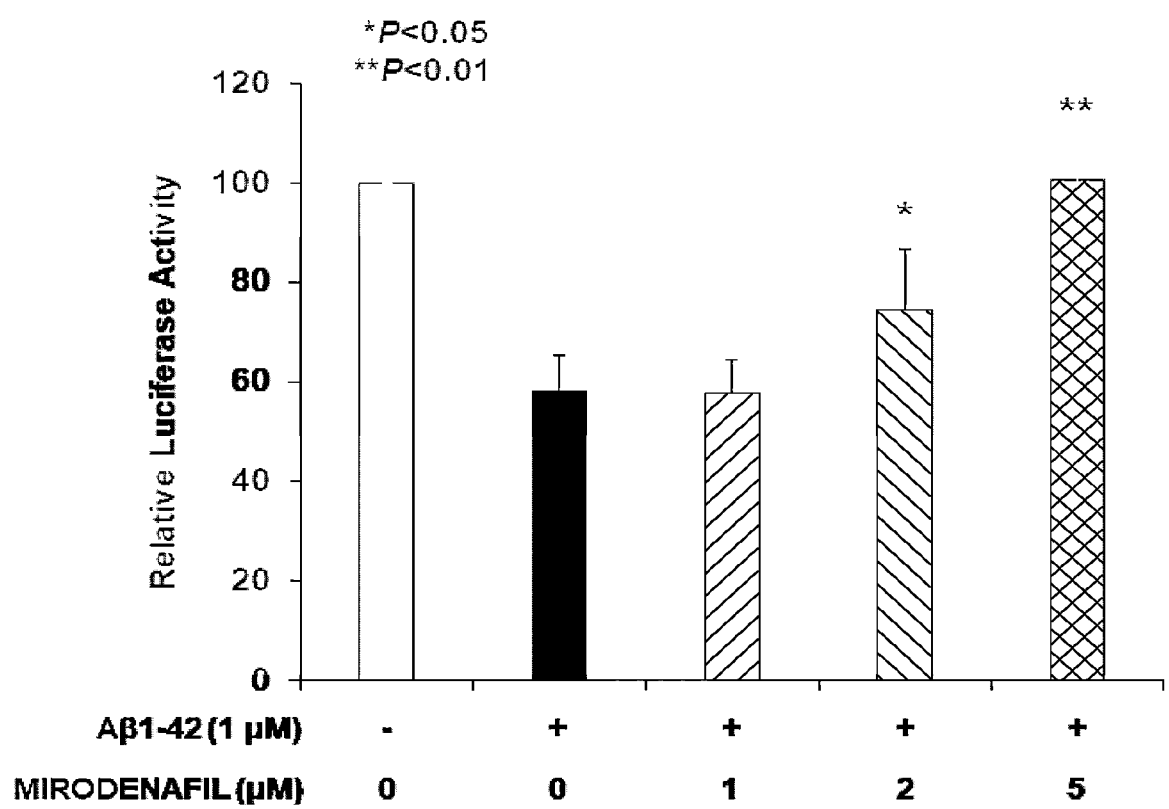

FIG. 17 presents result of TOPFLASH Reporter Gene Assay (Wnt/β-Catenin Signaling) showing that Wnt/β-Catenin Activity in retinoic acid differentiated SH-SY5Y Cell and Differentiated HT-22 Mouse Hippocampal Neuronal Cell, which was reduced by the treatment of Aβ1-42 Oligomer, increased concentration-dependently by the treatment with the composition of the present invention.

Figure 18:
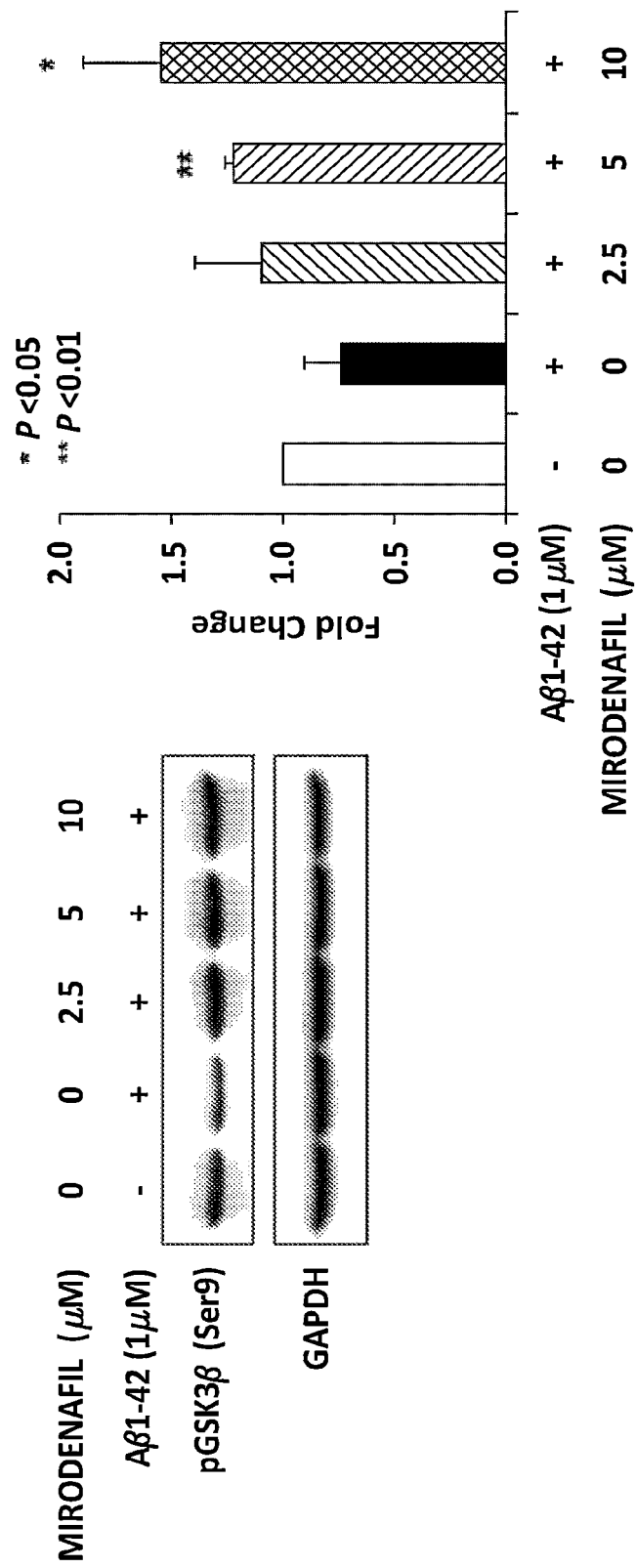

FIG. 18 presents result of Western Blot Analysis showing that level of Ser9 Phosphorylation of GSK3β Protein in retinoic acid differentiated SH-SY5Y Cell, which was reduced by the treatment of Aβ1-42 Oligomer, has been increased by the treatment with the composition of the present invention.

Figure 19:
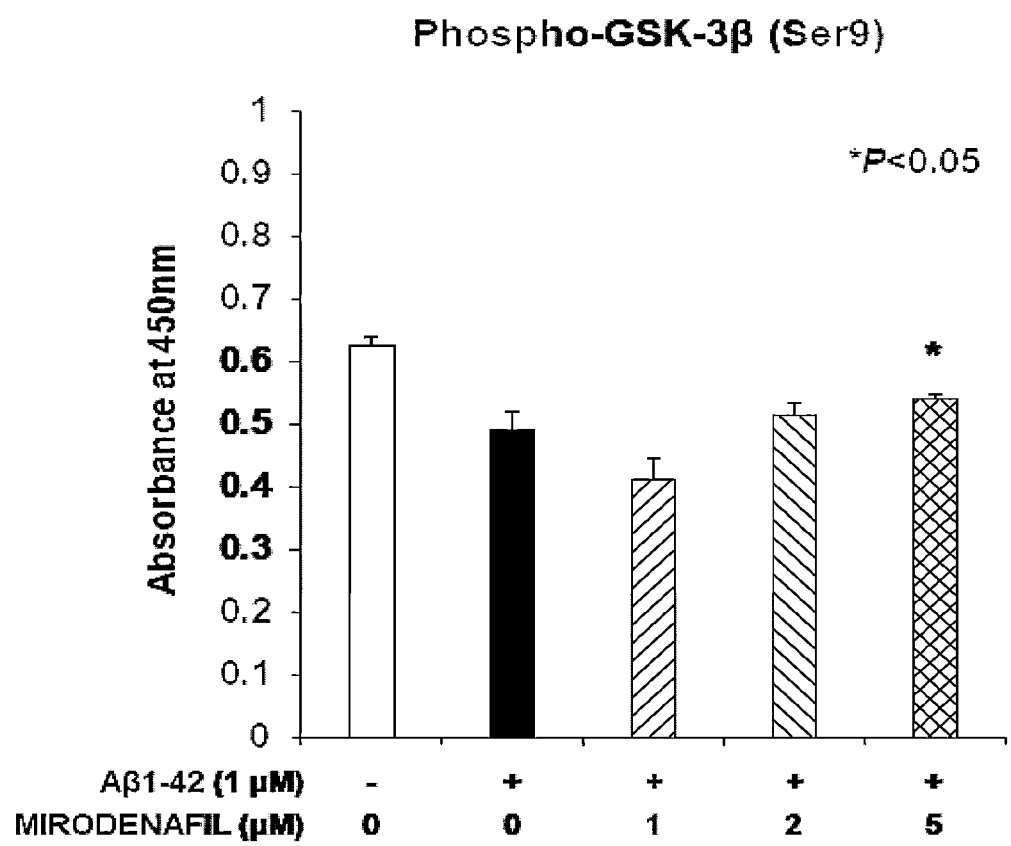

FIG. 19 presents result of Phospho-GSK-3b (Ser9) Sandwich ELISA showing that level of Ser9 Phosphorylation of GSK3β Protein in retinoic acid differentiated SH-SY5Y Cell, which was reduced by the treatment of Aβ1-42 Oligomer, has been increased by the treatment with the composition of the present invention.

Figure 20:
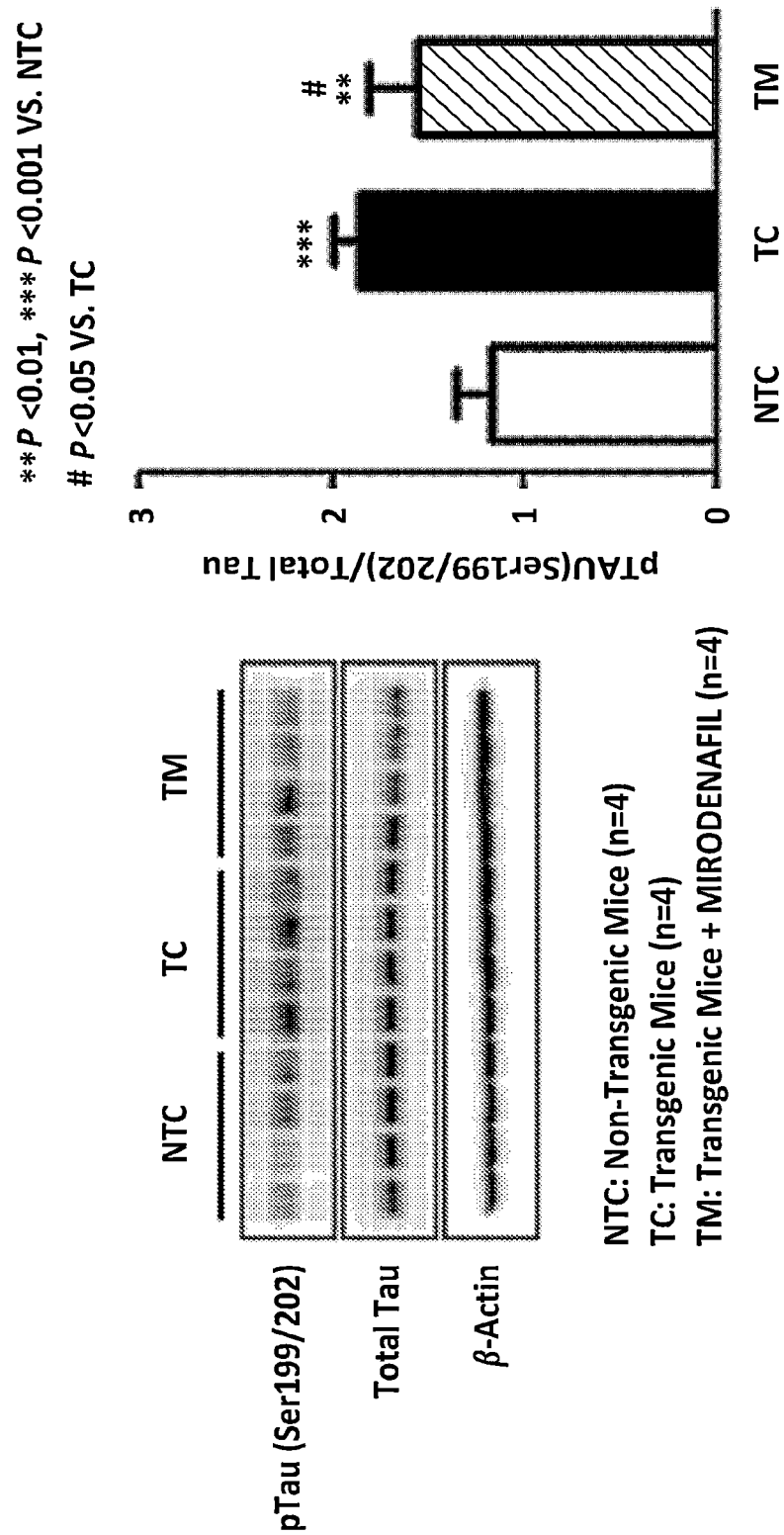

FIG. 20 presents result of Western Blot Analysis showing that level of Ser9 Phosphorylation of Tau Protein increased in the hippocampus of Alzheimer's disease animal model (NSE-hAPP-C105) has been decreased by the treatment with the composition of the present invention.

Reduction of APP Formation and Aβ Accumulation by the Suppression of Aβ Production Positive Feedback Loop Through Suppression of DKK-1

Figure 21:
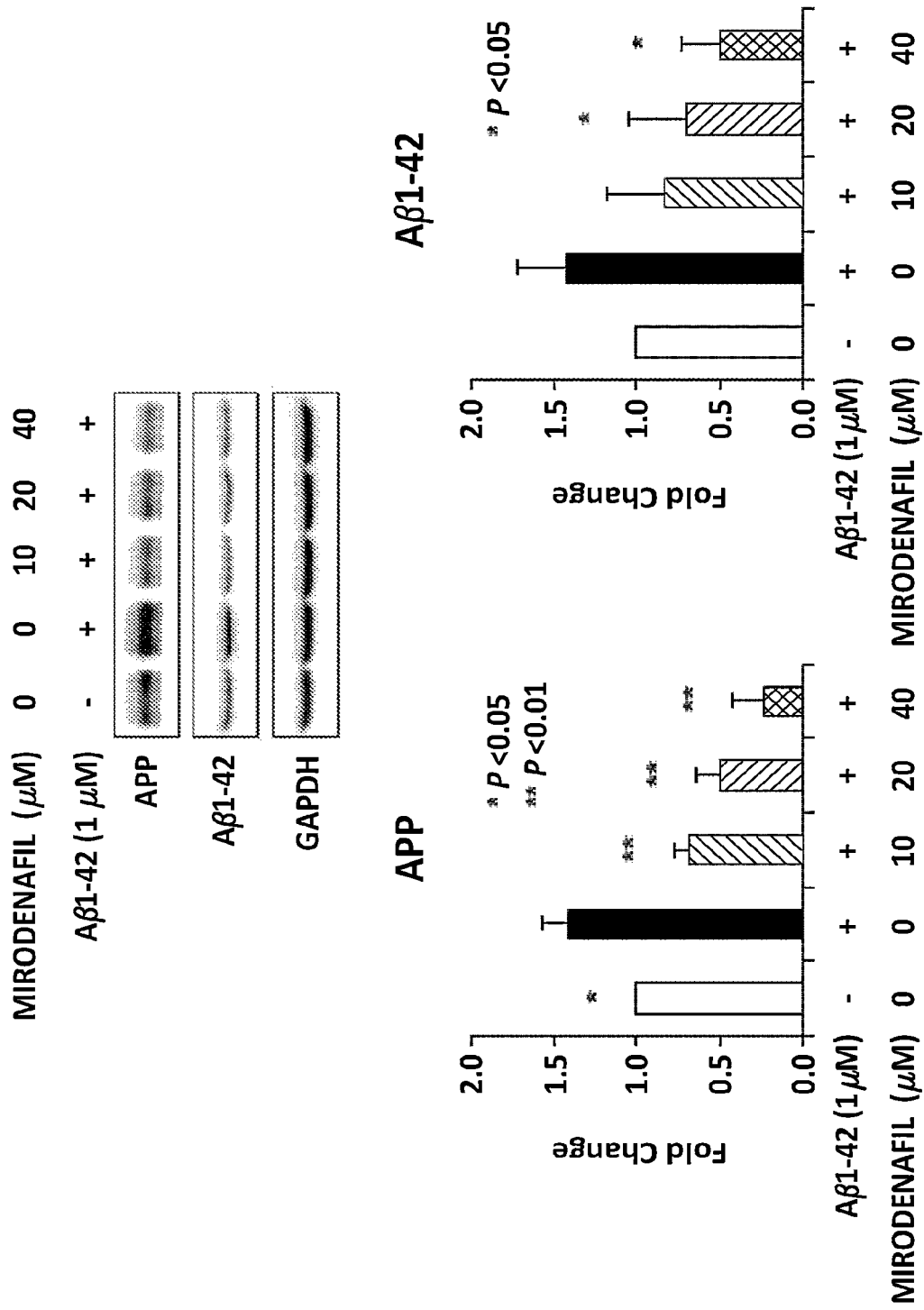

FIG. 21 presents result of Western Blot Analysis showing that level of APP and Aβ1-42 Protein in retinoic acid differentiated SH-SY5Y Cell, which was increased by the treatment of Aβ1-42 Oligomer, has been decreased by the treatment with the composition of the present invention.

Figure 22:
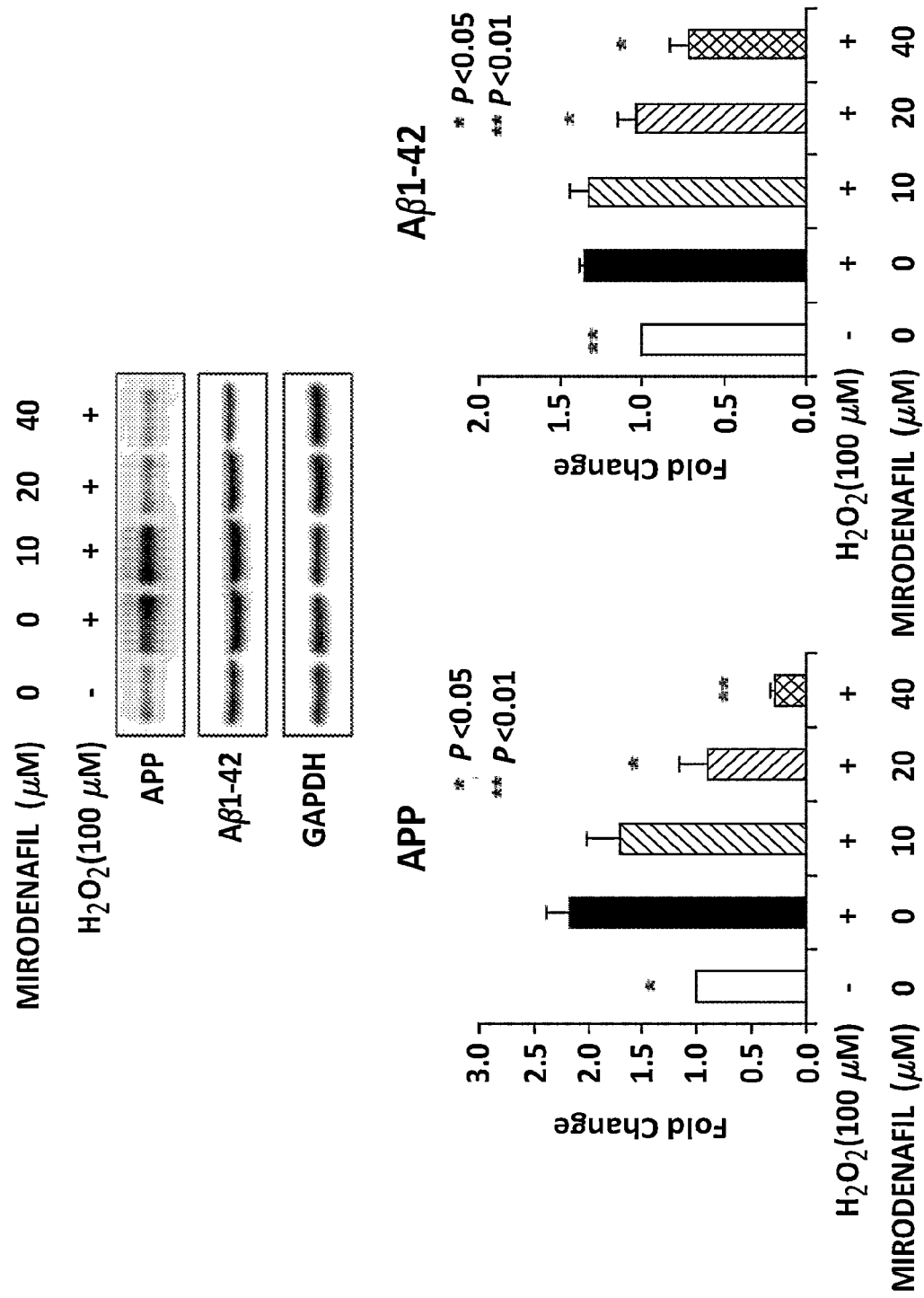

FIG. 22 presents result of Western Blot Analysis showing that level of APP and Aβ1-42 Protein in retinoic acid differentiated SH-SY5Y Cell, which was increased by the treatment of $H_2O_2$, has been decreased by the treatment with the composition of the present invention.

Figure 23:
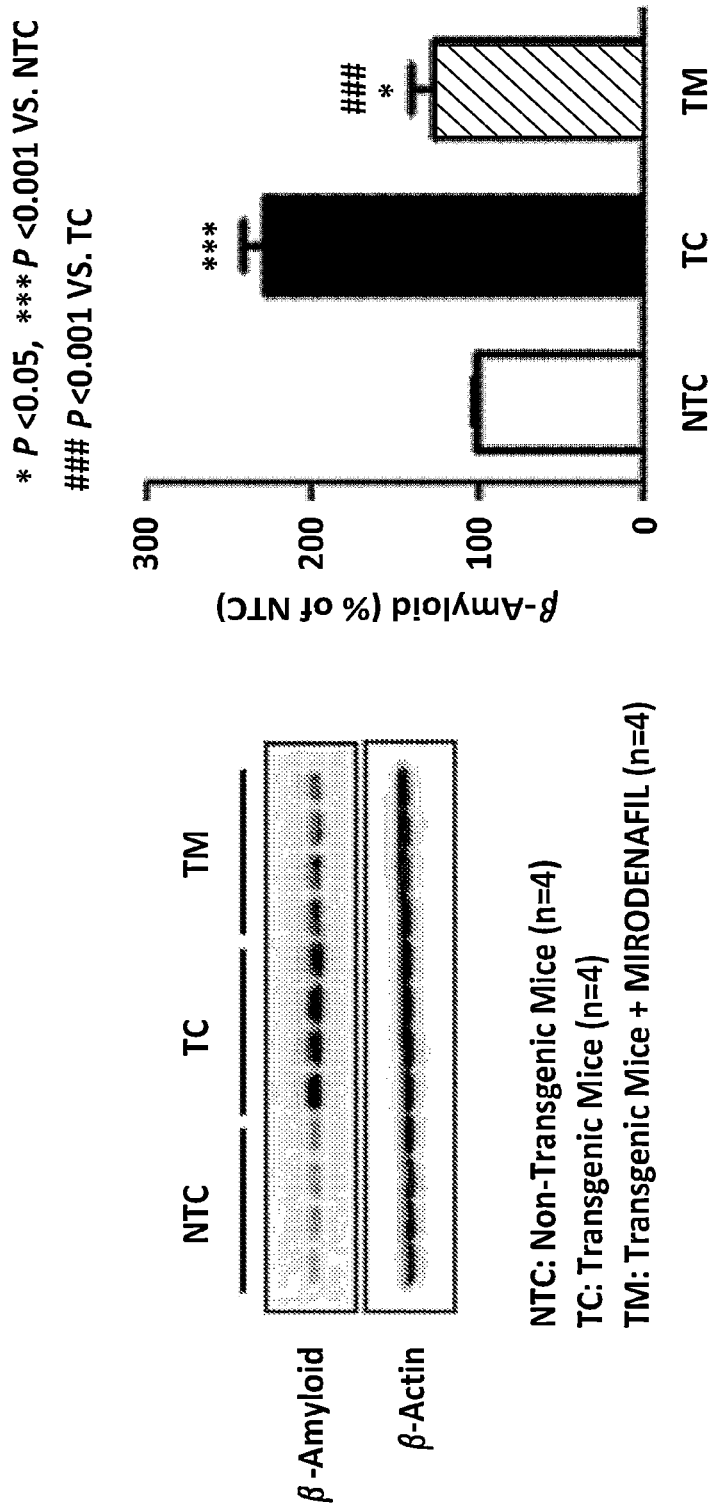

Inhibition of Aβ Fibril/Plaque Formation by Removal of Intracellular Toxic and Soluble Aβ Oligomer Through Activation of Autophagy FIG. 23 presents result of Western Blot Analysis showing that level of Aβ Protein increased in the hippocampus of Alzheimer's disease animal model (NSE-hAPP-C105) has been decreased by the treatment with the composition of the present invention.

Figure 24:
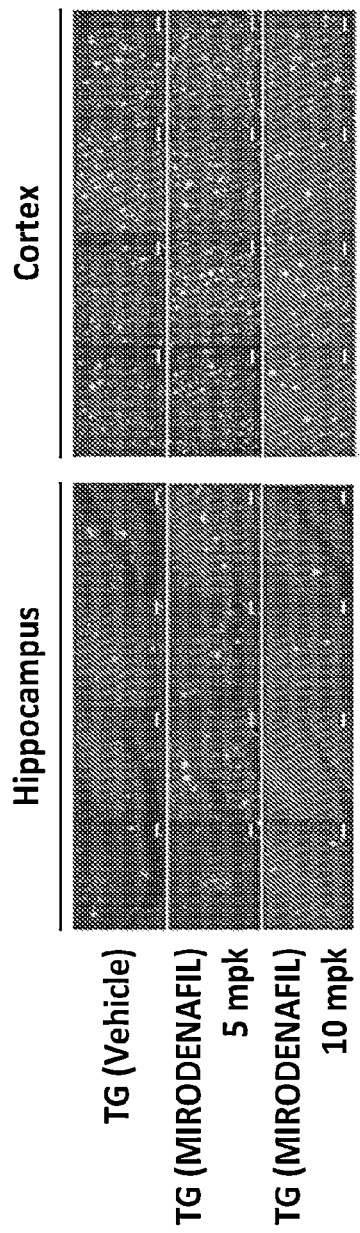
Figure 24:
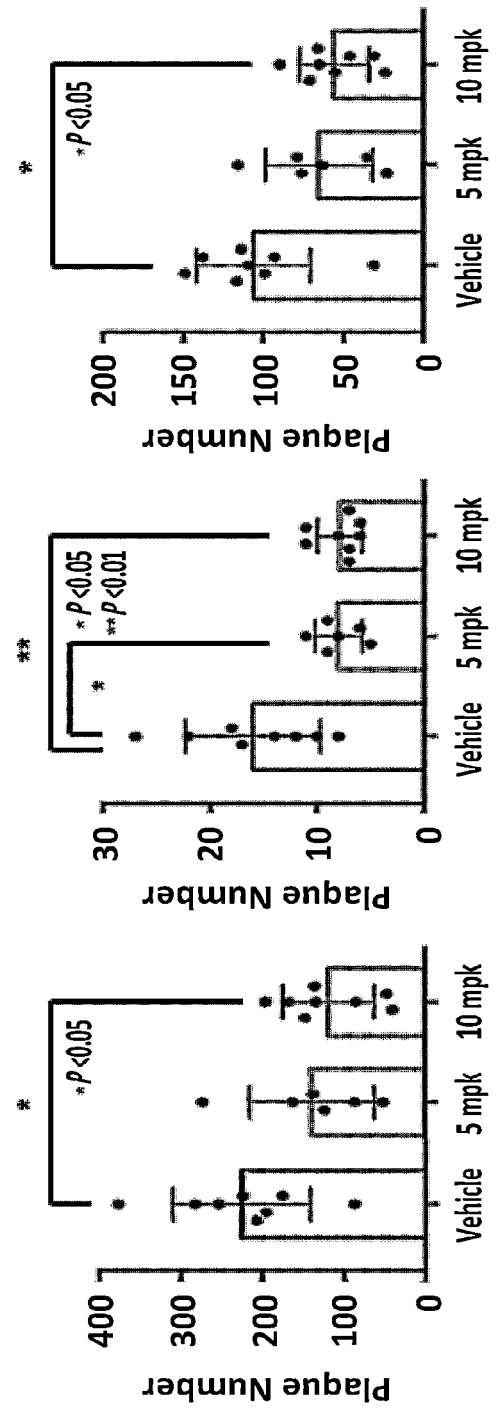

FIG. 24 presents result of Thioflavin S Staining/GFAP (Glial Fibrillary Acidic Protein) Immunohistochemistry showing that the number of Aβ Plaque in the hippocampus of Alzheimer's disease animal model (NSE-hAPP-C105) has been decreased by the treatment with the composition of the present invention. Number of Aβ Plaque was counted by counting the number of Aβ Plaque dyed by Thioflvain S (Green) and number of colocalized spot (yellow) of Astrocyte (Red) dyed by GFAP.

Figure 25:
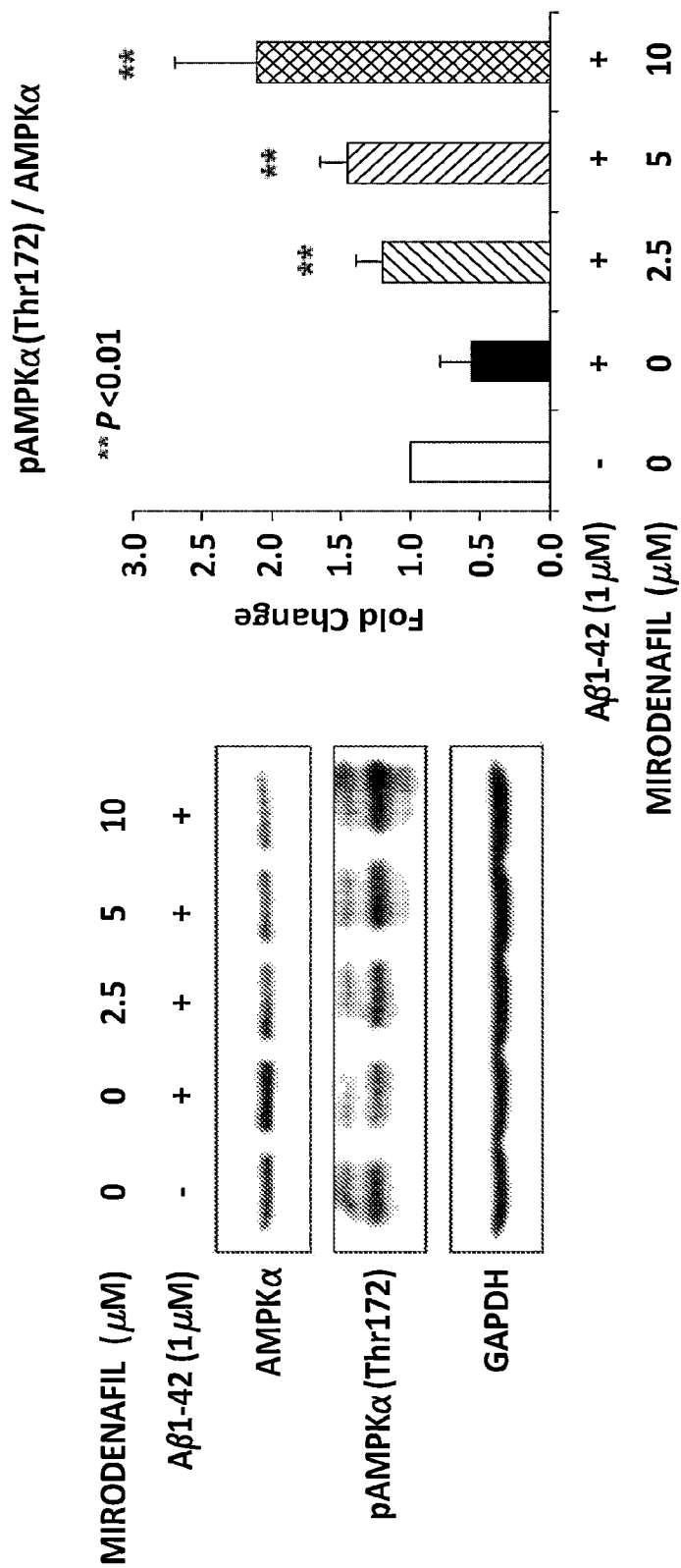

FIG. 25 presents result of Western Blot Analysis showing that level of Thr172 Phosphorylation of AMPK Catalytic Subunit a in retinoic acid differentiated SH-SY5Y Human Neuroblastoma Cell, which was decreased by the treatment of Aβ1-42 Oligomer, has been increased concentration-dependently by the treatment with the composition of the present invention.

Figure 26:
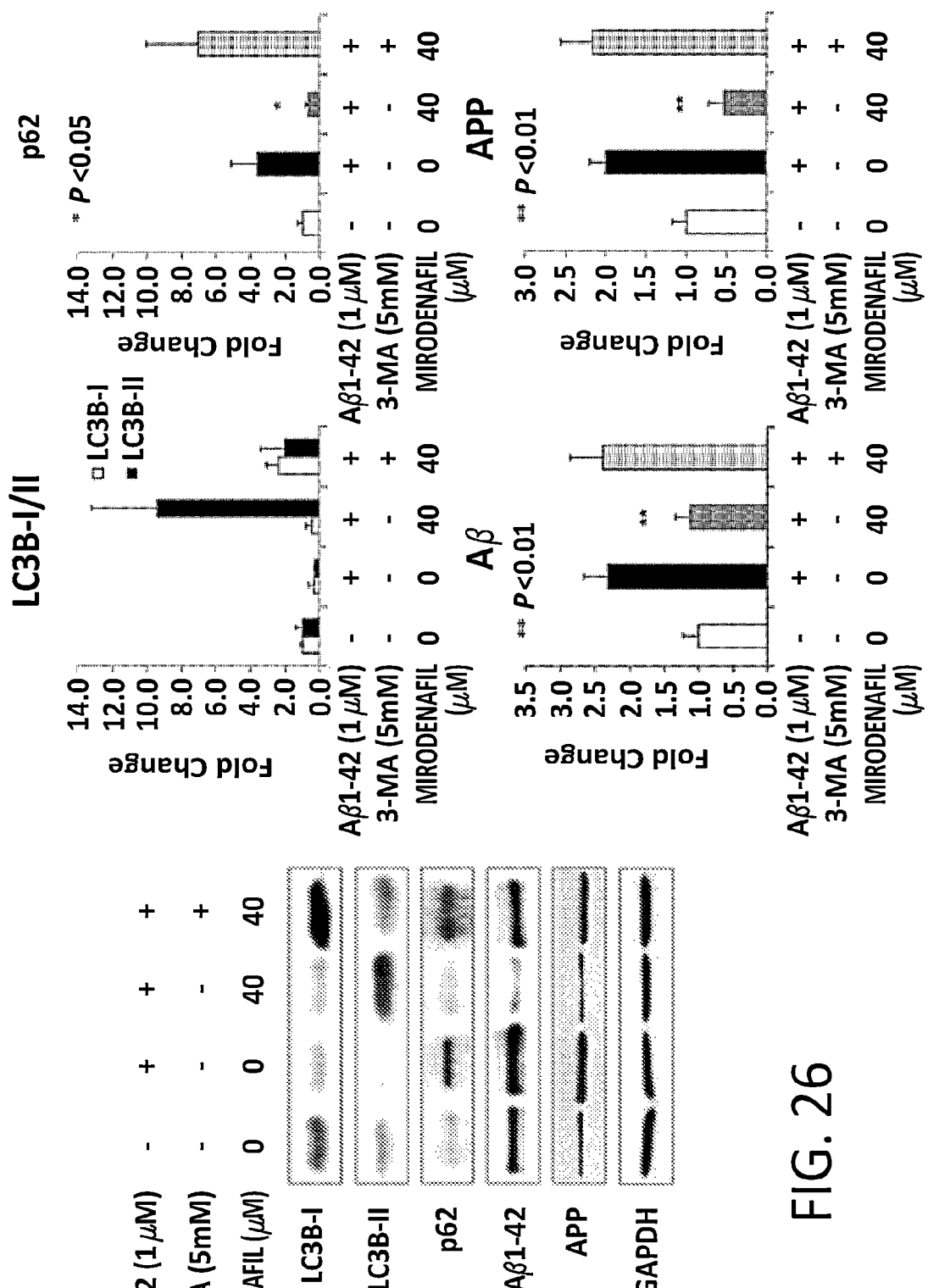

FIG. 26 presents the result of Western Blot Analysis showing that level of LC3B protein, an autophagy marker in retinoic acid differentiated SH-SY5Y Human Neuroblastoma Cell, which was decreased by the treatment of Aβ1-42 Oligomer, has been increased, at the same time, induced autophagic flux (conversion from LC3B-1 to LC3B-II) to increase LC3B-II/I Ratio, and also increased expression of Ubiquitin-Binding Protein p62 (SQS™, Sequestosome 1), an autophagosome Cargo Protein, which was reduced by the treatment of Aβ1-42 Oligomer. Furthermore, 3-MA (3-Methyladenine), an autophagy/PI3K inhibitor was used in combination of the composition of the present invention at the same time, level of autophagic flux (LC3B-II/I ratio) increased by the composition of the present invention was decreased and expression of p62 which was decreased by the composition of the present invention has increased. Furthermore, level of APP and Aβ1-42 Protein decreased by the composition of the present invention increased when 3-MA was used with the composition of the present invention and the results by Western Blot Analysis are shown in FIG. 26.

Figure 27:
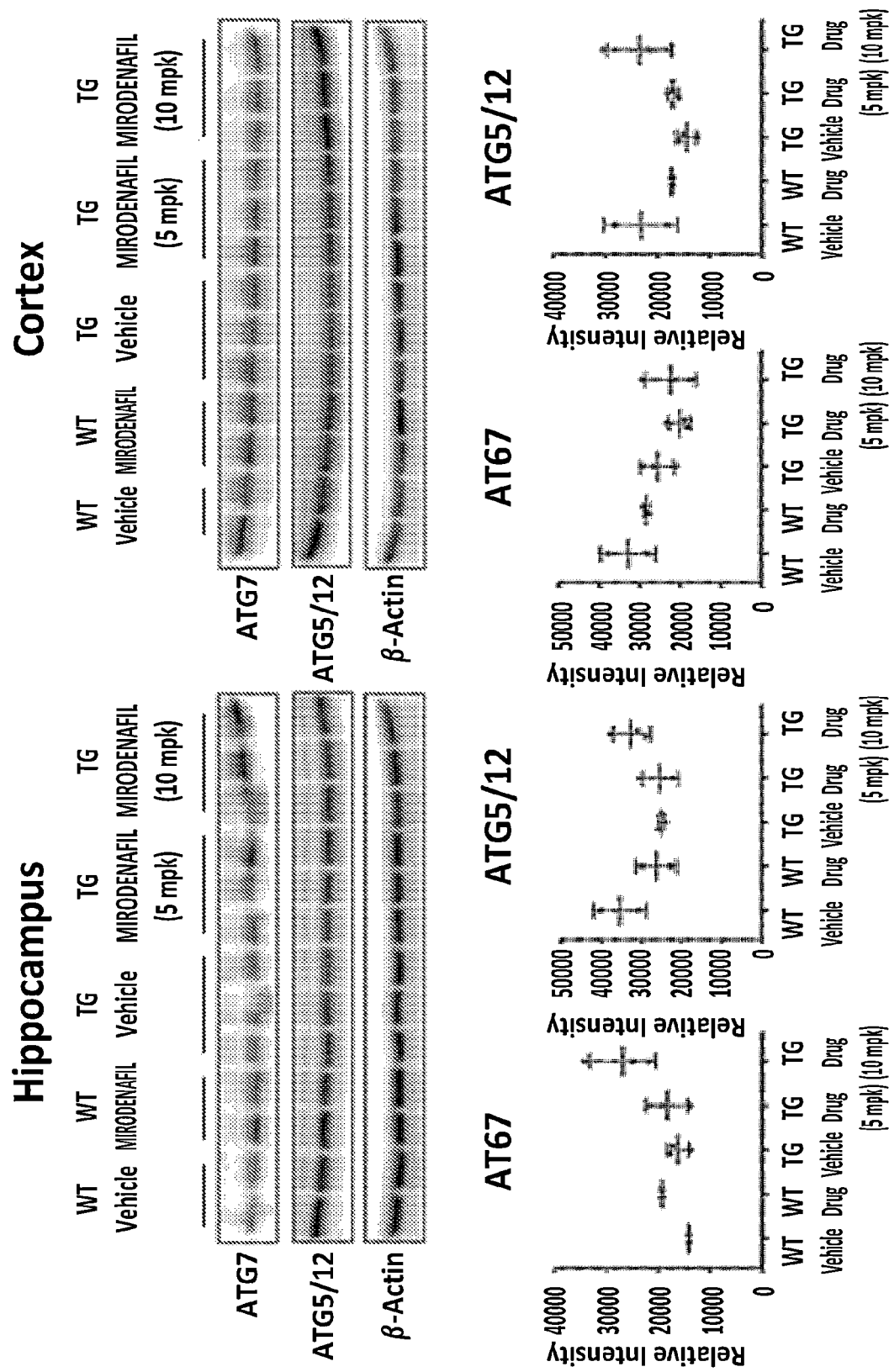

FIG. 27 presents result of Western Blot Analysis showing that level of ATG7 and ATG5/12 Protein, i.e., Autophagy Markers, increased in the hippocampus of Alzheimer's disease animal model (5XFAD Transgenic Mice) and ATG5/12 Protein Level in cortex increased by the treatment with the composition of the present invention.

Effect of Improving Cognitive Ability and Behavioral Learning Ability

Figure 28:
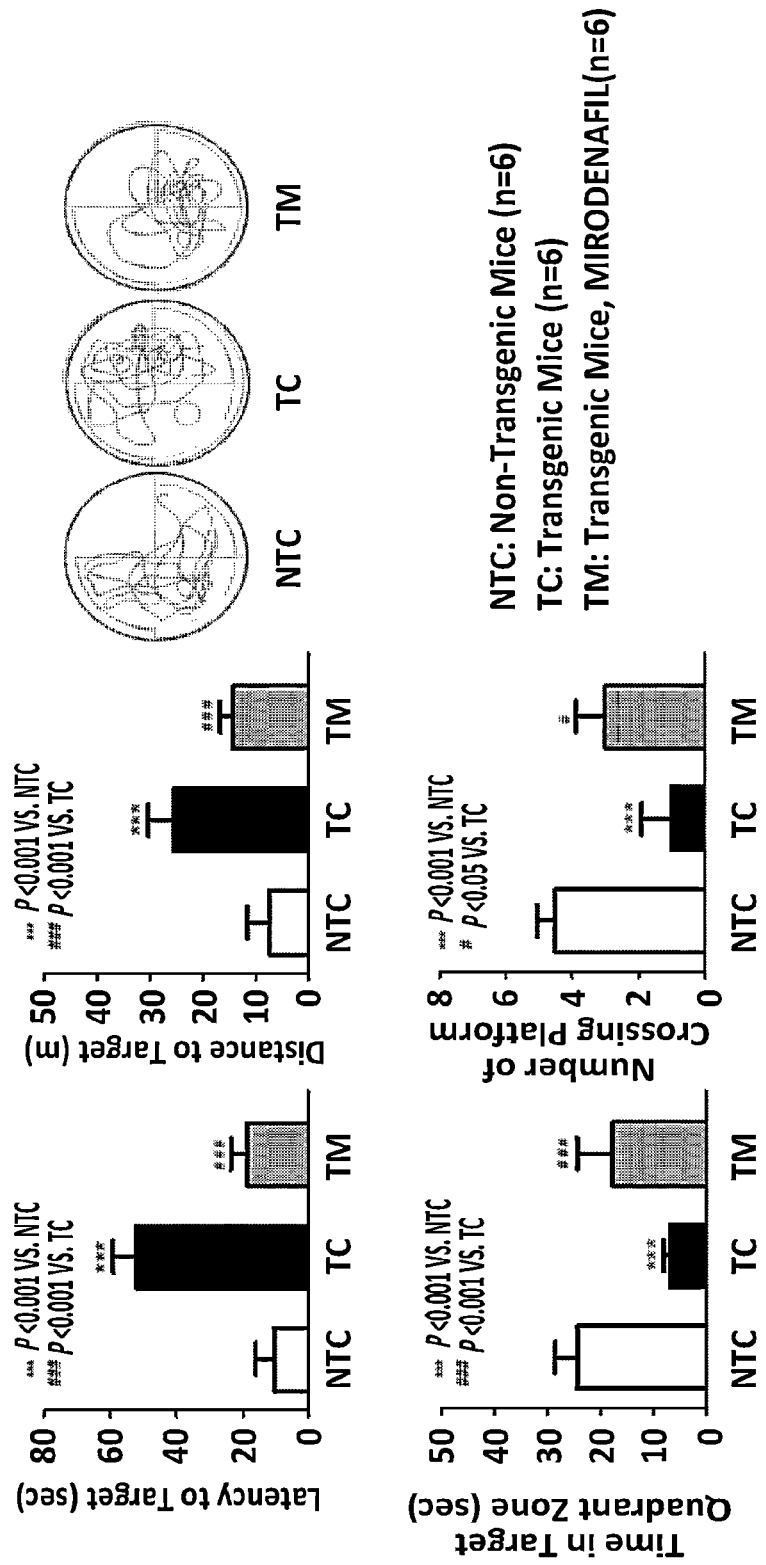

FIG. 28 presents result of Morris Water Maze Test showing that, in the evaluation of improvement of cognitive function level in Alzheimer's dementia animal model (NSE-hAPP-C105), group treated with the composition of the present invention achieved reduced latency to target and distance to target and increased time in target quadrant and number of cross platform compared to transgenic mouse control.

Figure 29:
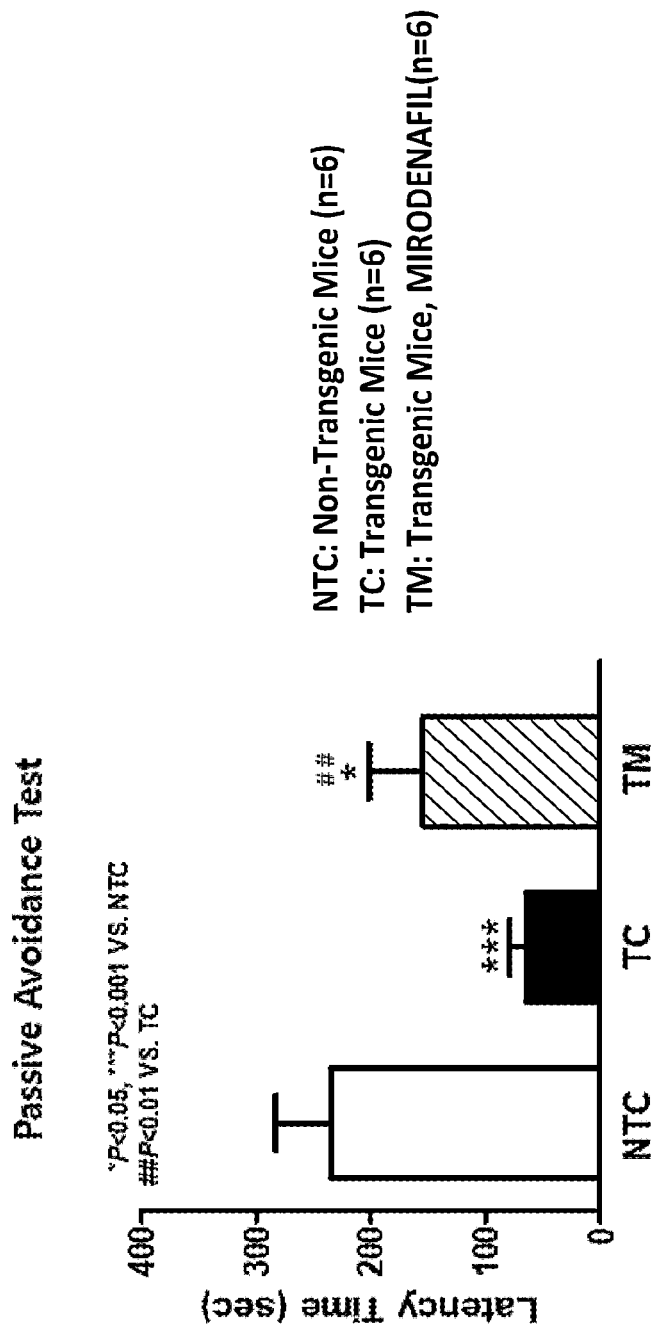

FIG. 29 presents result of Passive Avoidance Test showing that, in the evaluation of improvement of cognitive ability and behavioral learning ability in Alzheimer's dementia animal model (NSE-hAPP-C105), group treated with the composition of the present invention achieved reduced latency time compared to transgenic mouse control.

DETAILED DESCRIPTION OF THE INVENTION

One embodiment of the present invention provides a method for (1) inhibition of formation of Aβ Oligomer/Fibril by suppression of Aβ aggregation, (2) inhibition of β-Amyloidogenic Processing by reduction of BACE-1, (3) reduction of formation of extracellular Aβ monomers, oligomers, Aβ Fibril/plaque by cerebral blood flow increase (vasodilation), (4) inhibition of neuronal cell death and acceleration of neurogenesis, synaptonegenesis, and/or promotion of angiogenesis by activation of NO (Nitric Oxide)/cGMP (Cyclic Guanosine Monophosphate)/PKG (Protein Kinase G), CREB (Cyclic AMP (Adenosine Monophosphate) Response Element Binding Protein) Pathway, (5) restoration of synaptic plasticity (synaptic Plasticity) by activation of Wint Signaling by inhibition of DKK-1 (Dickkopf WNT Signaling Pathway Inhibitor 1), and inhibition of production of APP (Amyloid Precursor Protein) and reduction of Aβ accumulation by suppression of positive feedback loop for Aβ production, and (6) inhibition of formation of Aβ Fibril/plaque by removal of intracellular toxic and soluble Aβ oligomers by activation of autophage, by administering one of the compounds selected from Mirodenafil, Sildenafil, Vardenafil, Tadalafil, Udenafil, Dasantafil, and Avanafil; and a pharmaceutically acceptable salt, solvate, or hydrate thereof.

In another embodiment, the present invention provides a pharmaceutical composition comprising one compound selected from Mirodenafil, Sildenafil, Vardenafil, Tadalafil, Udenafil, Dasantafil, and Avanafil; and a pharmaceutically acceptable salt, solvate, and hydrate thereof as an active ingredient, for (1) inhibition of Aβ Oligomer/Fibril formation by reduction of Aβ aggregation, (2) inhibition of β-Amyloidogenic Processing decreased BACE-1, (3) reduction of extracellular Aβ monomers, oligomers & Aβ Fibril/Plaque by increase of the cerebral blood flow, (4) suppression of neuronal cell death Inhibition and promotion of neurogenesis, synaptogenesis and/or angiogenesis by activation of NO/cGMP/PKG/CREB Pathway, (5) restoration of synaptic plasticity (synaptic Plasticity) by activation of Wint Signaling by inhibition of DKK-1, and inhibition of production of APP and reduction of Aβ accumulation by suppression of positive feedback loop for Aβ production, and (6) inhibition of formation of Aβ Fibril/plaque by removal of intracellular toxic and soluble Aβ oligomers by activation of autophage.

The present invention has multi-mechanism distinguished from the previous or presently developed other Alzheimer therapeutics. The present invention provides significantly improved efficacy for treatment of Alzheimer's disease compared to the current drug in the market by adopting "one Drug, Multiple Targets/Mechanisms" strategy which excels the conventional discovery strategy based on "one Drug, One Target" paradigm to provide (1) inhibition of Aβ Oligomer/Fibril formation by reduction of Aβ aggregation, (2) inhibition of β-Amyloidogenic Processing decreased BACE-1, (3) reduction of extracellular Aβ monomers, oligomers & Aβ Fibril/Plaque by increase of the cerebral blood flow, (4) suppression of neuronal cell death Inhibition and promotion of neurogenesis, synaptogenesis and/or angiogenesis by activation of NO/cGMP/PKG/CREB Pathway, (5) restoration of synaptic plasticity (synaptic Plasticity) by activation of Wint Signaling by inhibition of DKK-1, and inhibition of production of APP and reduction of Aβ accumulation by suppression of positive feedback loop for Aβ production, and (6) inhibition of formation of Aβ Fibril/plaque by removal of intracellular toxic and soluble Aβ oligomers by activation of autophage.

Mechanism of Treatment for Alzheimer's Disease

1. Inhibition of Aβ Oligomer/Fibril formation by Inhibition of Aβ Aggregation

Common pathological feature in sporadic and familial Alzheimer's dementia is peptide known as Aβ accumulate to form extracellular senile plaque (J Alzheimers Dis 2018; 64 (s1): S567-S610.). Even though Aβ also produced in normal people, it degrade quickly enough not to accumulate in the body. On the other hand, in the case of Alzheimer's disease patient, Aβ is not only formed massively, but also does not degrade and accumulate in the tissues (Alzheimers Res Ther 2013 Nov. 29; 5 (6): 60.). These abnormal Aβ accumulation induce formation of extracellular senile plaque to disturb the signal transmission between neurons and also accumulation in Hippocampus, which plays an important role in the memory and learning ability and cortex to cause cellular inflammation and neuronal damage, and eventually damage neural networks required for normal function (EBioMedicine 2016 April; 6:42-49.). In addition, the accumulated Aβ Monomer is aggregate to form toxic Aβ Oligomer to increase production of ROS (Reactive Oxygen Species) and RNS (Reactive Nitrogen Species) to activate the signal network related to neuronal cell death to increase apoptosis (Mt Sinai J Med. 2010 January-February; 77 (1): 43-9.).

Figure 1:
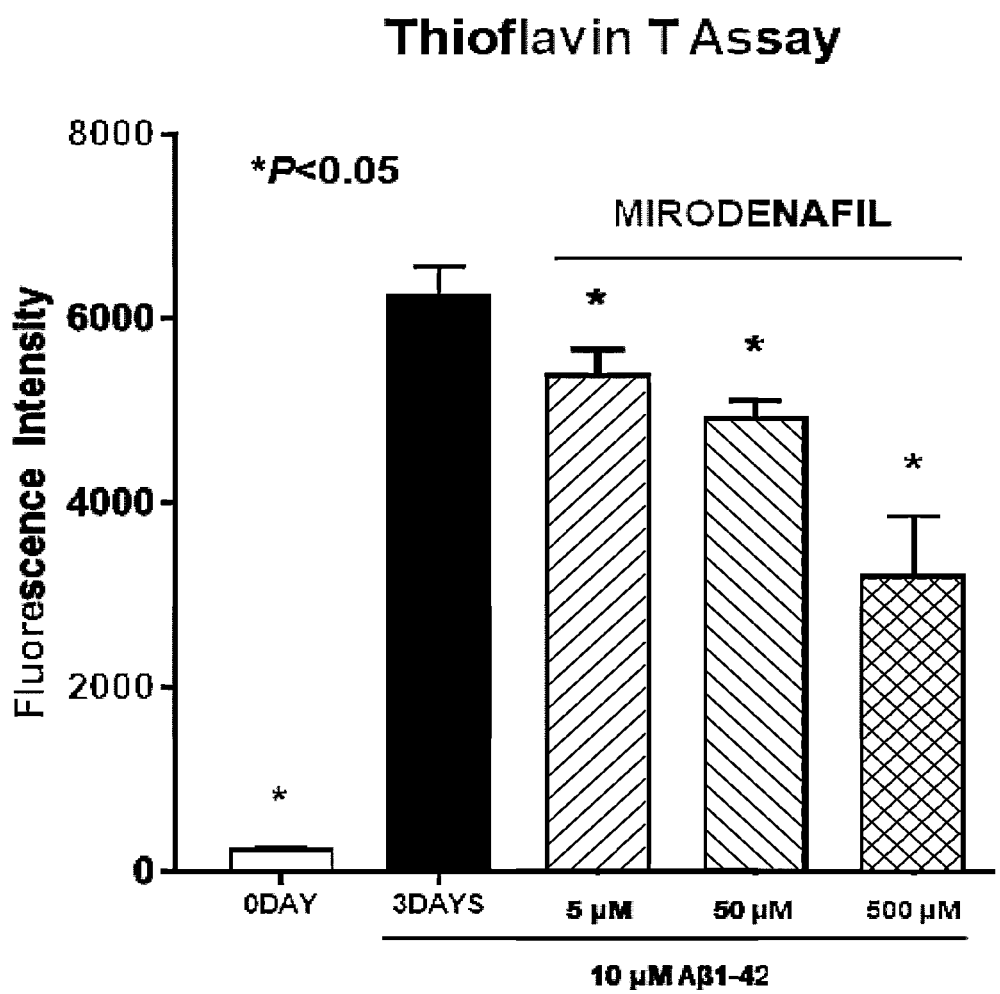
FIG. 1 presents the result of Thioflavin T Assay showing that there is a dose-dependent inhibition of Aβ Fibril Aggregation by the composition of the present invention.
Figure 2:
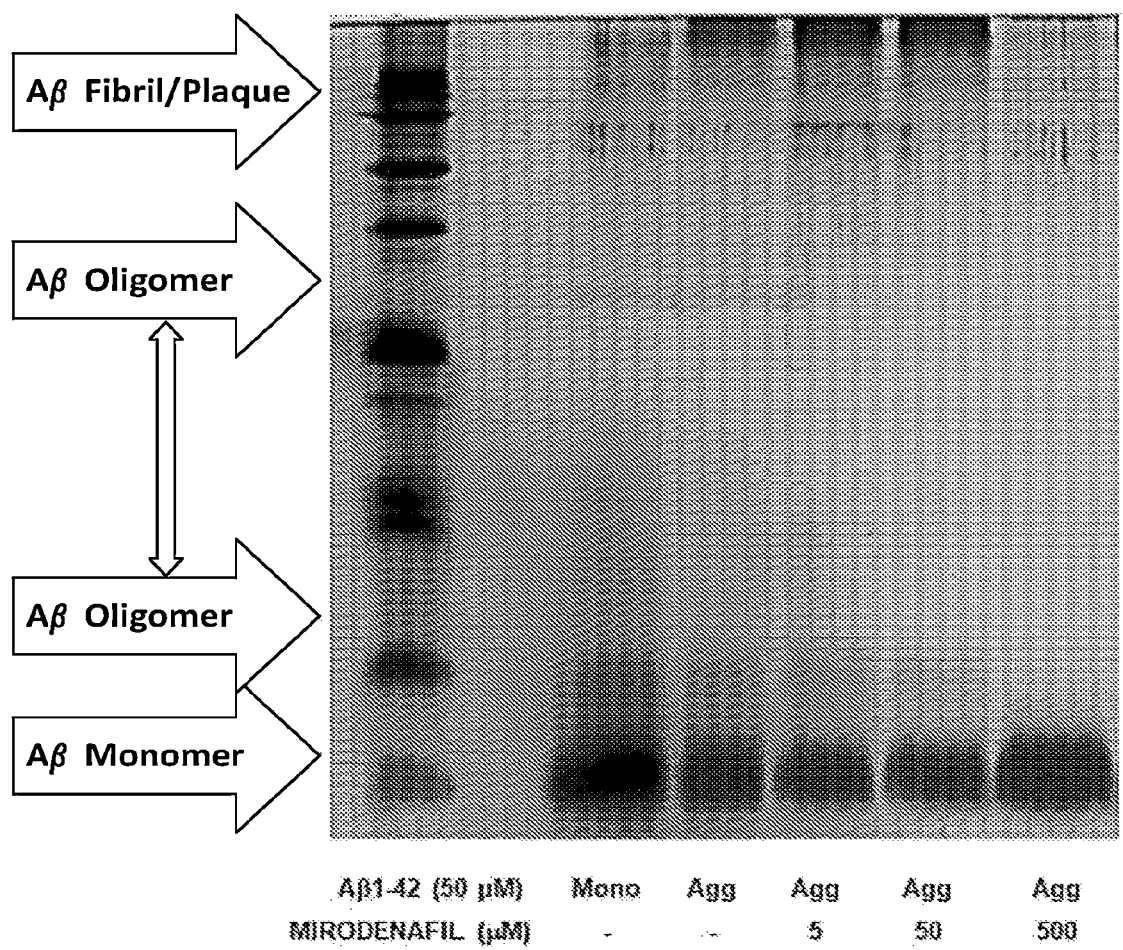
FIG. 2 present the result of PICUP (Photo-Induced Cross-Linking of Unmodified Proteins)/SDS-PAGE (Sodium Dodecyl Sulfate-Polyacrylamide Gel Electrophoresis) Analysis showing that the formation of Aβ oligomer aggregation has been reduced by the treatment with the composition of the present invention.

The inventive compositions suppressed Aβ Fibril Aggregation (FIG. 1) to inhibit Aβ Oligomer/Fibril formation was inhibited (FIG. 2).

Therefore, the composition of the present invention inhibits Aβ oligomer Aggregation Oligomer to inhibit Aβ Oligomer/Fibril formation.

2. Suppression of β-Amyloidogenic Processing Through BACE-1 Reduction

Aβ is produced from APP as various Secretase cut APP to generate Aβ with various numbers of amino acids. Among these, in the case of Alzheimer's patients, the ratio of Aβ with 42 or 43 amino acid formed by BACE-1 rapidly increase. Currently, nerve cell damage by Aβ1-42 or Aβ1-43 is know to be one of the important causes in the progress of Alzheimer's disease and Aβ25-35 is known to be the toxic fragment of Aβ1-42 or Aβ1-43 causing neuronal cell damage (J Amino Acids 2011; 2011:198430, PLOS One 2013; 8 (1): e53117, J Alzheimers Dis 2018; 62 (3): 1345-1367). In particular, it was reported recently that SILDENAFIL, a PDE-5 Inhibitor, suppressed BACE-1 and Cathepsin B expression to inhibit β-Amyloidogenic Processing of APP to reduce the production of Aβ1-42 or Aβ1-43, and it was expected that PDE-5 inhibitor can suppress expression of BACE-1 to reduce formation of Aβ1-42 or Aβ1-43, which cause neuronal cell damage, to have therapeutic effect on Alzheimer's disease (J Gerontol a Biol Sci Med Sci 2015 June; 70 (6): 675-85, J Urol. 2016 April; 195 (4 Pt 1): 1171.).

The compositions of the present invention suppressed the expression of BACE-1 which plays the key role in β-Amyloidogenic Processing (FIG. 3).

Therefore, the composition of the present invention inhibit β-Amyloidogenic Processing by APP to reduce the formation of Aβ1-42 or Aβ1-43 which causes damages on neuronal cells.

3. Reduction of βB Monomer, Oligomer & βB Fibril/Plaque Cerebral Blood Flow to Increase by Cells Other One of the first step in the onset of dementia is damage of cells composing blood vessels in the brain including endothelial cells, pericytes, and vascular smooth muscle cells by various genetic and environmental factors, followed by destruction on brain-blood barrier to allow the neuro toxic proteins such as Aβ proteins or cells invade the brain tissues to cause inflation in brain tissue or various degenerative changes. in the brain to the organization to infiltrate the brain tissue inflammation and various degenerative changes that cause to be known there (Nat Rev Neural 2018 March; 14 (3.): 133-150.).

In addition, it has been reported that as the blood-brain barrier collapses with progression of decrease of cognitive function caused by Alzheimer's dementia, decrease of the cerebral blood flow in the brain region responsible for memory and the region continues to expand (Alzheimers Dement 2017 May; 13 (5): 531-540.). Furthermore, recent studies showed that, in the Alzheimer's dementia patient's brain tissue, increased ROS by Aβ increases the concentration of calcium in pericyte to cause perivascular cells to shrink and thus, to reduce the amount of cerebral blood flow (Science. 2019 Jul. 19; 365 (6450)). Therefore, proper brain blood flow should be maintained not only to provide a lot of amount of oxygen and nutrition to brain, but also to effectively remove neurotoxins, including carbon dioxide and Aβ brain, or protein waste which is generated naturally through metabolism (Nat Rev Neurosci 2017 July; 18 (7): 419-434).

PDE5 Inhibitors are used for treatment of pulmonary hypertension or erectile dysfunction as it can inhibit activation of PDE5 to prevent conversion of cGMP to 5'-GMP and eventually increase the concentration of cGMP in the pericytes to induce dilation of blood vessel (Int J Impot Res. 2004 June; 16 Suppl 1: S4-7.). In particular, in a recent study, PDE5 Inhibitors showed Alzheimer patient's (J Cereb Blood Flow Metab 2018 February; 38 (2): 189-203.).

The composition of the present invention reduced intracellular calcium concentration in pericyte which was increased by $H_2O_2$ treatment to show that the composition can inhibit reduction of cerebral blood flow by inhibiting the contraction of the pericyte caused by the increased concentration of calcium (FIG. 4).

Therefore, the composition of the present inventive compositions of perivascular cells to shrink by suppressing the brain blood flow by increasing the brain tissue Aβ and the same neural toxicity of the protein to accumulate to inhibit the effects seem to be expected there.

4. Inhibition of Neuronal Cell Death Through Activation of NO/cGMP/PKG/CREB Pathway and Promotion of Neurogenesis, Synaptogenesis, Angiogenesis Aβ Monomer transfected into the cells by endocytosis aggregate to form toxic soluble Aβ oligomer. The aggregates can not only induce disorder of cellular functions related to neuro cell death, but also increase hydrophosphorylation of Tau protein, a microtubule-associated protein, to promote the formation of NFT (Neurofibrillary Tangle). As a result, ROS increased in the process cause mitochondrial damage and activate Caspase-3 to result in death of neuron cells. (Nat Rev Neurosci. 2007 July; 8 (7): 499-509., Neuron. 2008 Nov. 26; 60 (4): 534-42., Nat Rev Neurosci. 2011 February; 12 (2): 65-72.).

PDE5 (Phosphodiesterase 5) is expressed in the cerebral cortex and hippocampus which, among brain tissues, play an important role in cognitive function of (J Comp Neurol 2003 Dec. 22; 467 (4): 566-80.), and in particular, it has been reported that PDE5 expression is increased in the cerebral cortex among brain tissues of patients with Alzheimer's disease compared to normal people (Neuropathol Appl Neurobiol. 2015 June; 41 (4): 471-82.). Moreover, in the hippocampus of mouse, synaptic plasticity, which is important for the brain cognitive function reduced by Aβ, has been reported to be restored by the action of NO/cGMP/CREB Pathway (J Neurosci 2005 Jul. 20; 25 (29): 6887-97.).

It is reported that PDE5 Inhibitor can also inhibit neuronal apoptosis and it is because PED5 inhibitor can inhibit PED5 activity to prevent conversion of cGMP to 5'-GMP. As a result, cGMP accumulates in the brain to activate PKG (Mol Neurobiol. 2010 June; 41 (2-3): 129-37., ACS Chem Neurosci. 2012 Nov. 21; 3 (11): 832-44., Exp Neurol. 2014 November; 261:267-77.). The activated PKG suppresses Caspase-3 which is activated by toxic soluble Aβ oligomer to suppress neuronal apoptosis. (Neurobiol Aging 2014 March; 35 (3): 520-31, Neuroscience 2016 Jul. 22; 328:69-79, Front Pharmacol. 2017 Mar. 8; 8:106.). Also, phosphorylation of Ser133 of CREB protein, which is gene transcription factor, activates PKG that will increase expression of factors related to neurogenesis, synaptogenesis, angiogenesis (Behav Brain Res 2013 Aug. 1; 250:230-7, DNA Cell Biol. 2018 November; 37 (11): 861-865.).

The compositions of the present invention inhibit activation of PDE5 to prevent conversion of cGMP to 5'-GMP to increase the amount of cGMP in the cell (FIG. 5), suppressed activity of Caspase-3 (FIG. 6), restore mitochondrial membrane potential (FIG. 7) to reduce Aβ-induced neuronal death (FIG. 8).

The composition of the present invention increased expression of factors related to neurogenesis, synaptogenesis, and angiogenesis by increasing phosphorylation of Ser133 in CREB protein (FIG. 9).

The composition of the present invention increased the expression of NGF and BDNF mainly involved in the regulation of growth, maintenance, proliferation and survival of neuron (FIGS. 10 and 11).

Therefore, the present invention provides effect to stimulate neuronal cell apoptosis, neurogenesis, synaptogenesis, and angiogenesis in the brain of dementia patients by the activation of NO/cGMP/PKG/CREB pathway.

5. Restoration of Synaptic Plasticity by Activation of Wnt Signaling Via Suppression of DKK-1 and Reduced Production of APP and Inhibition of Aβ Accumulation by Suppression of Positive Feedback Loop Wnt/β-Catenin Pathway is an essential signal transmitting pathway controlling many cellular processes including cell survival. Especially, Wnt/β-Catenin Pathway in brain is not only important for the neuron survival and neuronal signal generation, but also plays an essential role in controlling synaptic plasticity, the blood-brain barrier integrity and controlling functions of the same (Biomed Res Int 2014; 2014:301575.). At the present time, it is known that expression of Wnt Antagonist DKK-1 is increased in the brain tissues of Alzheimer patients to suppress Wnt/β-Catenin Pathway and increase synaptic plasticity (J Neurosci 2004 Jun. 30; 24 (26): 6021-7., Front Cell Neurosci 2013 Nov. 5; 7:162). It is reported that expression of DKK-1 was increased by the accumulated Aβ in Hippocampal neuron to decrease synaptic plasticity (J Neurosci 2012 Mar. 7; 32 (10): 3492-8.). Moreover, DKK-1 is reported to play Positive Feedback Loop for Aβ production and this gives an expectation that instead of targeting Aβ as conventionally, it may be possible to slow down the progress of Alzheimer disease by inhibiting DKK-1 which is a essential controller of positive feedback loop for Aβ production to reduce Aβ production to reduce loss of synapse (J Mol Cell Biol. 2014 February; 6 (1): 75-80., Neuron. 2014 Oct. 1; 84 (1): 63-77., Cell Death Dis. 2014 Nov. 27; 5: e1544., Curr Biol. 2016 Oct. 10; 26 (19): 2551-2561, Front Neurosci. 2016 Oct. 19; 10:459., Transl Psychiatry. 2018 Sep. 20; 8 (1): 179.).

On the other hand, in several degenerative brain diseases including frontotemporal dementia, progressive supranuclear palsy, and Alzheimer, NFT formed by the aggregation of Tau protein by hyperphosphorylation is the main cause of the disease and these disorders are called collectively 'Tauopathy' (Front Mol Neurosci. 2011 Oct. 5; 4:24, Front Neurosci. 2019 Dec. 13; 13:1274.). Current Tauopathy is known to be caused as Wnt/β-Catenin Pathway is suppressed by various pathogenic mechanism in the brain (Mol Brain. 2019 Dec. 4; 12 (1): 104.), especially suppression of Wnt/β-Catenin Pathway by accumulation of Aβ in the brain reduces Ser9 phosphorylation in GSK3B protein and increase Tyr 216 phosphorylation to activate GSK3β and to enhance phosphorylation of Tau protein in mouse Hippocampus neuron. As a result, formation of NFT is enhanced to reduce neuron survival, generation of neuron, synaptic plasticity, blood-brain barrier integrity and functionality to enhance the progress of Tauopathy (Neurosci Res. 1998 August; 31 (4): 317-23, Annu Rev Pathol. 2019 Jan. 24; 14:239-261.).

In summary, increased expression of DKK-1 by the accumulation of Aβ in brain act as a Wnt antagonist to suppress Wbt/β-Catenin Pathway and to activate GSK3β to increase formation of NFT to reduce synaptic plasticity, and also act as a positive feedback loop for the production of Aβ to enhance production and accumulation of Aβ to promote progress of degenerative brain disorders. Thus, therapeutics targeting DKK-1 expression inhibition is expected to inhibit degenerative brain diseases including Alzheimer disease by restored synaptic plasticity by the activation of Wnt signaling and by reduced formation and accumulation of Aβ by suppression of positive feedback loop for Aβ production.

The composition of the present invention reduced the expression of DKK-1, a regulator of the positive feedback loop of Wnt Antagonist and Aβ production (FIG. 12, 13).

The composition of the present invention increased expression of Wnt3a (FIG. 14) and Wnt1 (FIG. 15), activity of Wnt/β-Catenin-related transcription factors (VAX2, c-Myc, NR5A2, Mitf, TCF/LEF, NFAT, CEBP, GLI-1, GBX2, AP-1) (FIG. 16), and increased the activity of Wnt/β-Catenin (FIG. 17).

The composition of the present invention increased Ser9 Phosphorylation of GSK3β Protein to inhibit the activity GSK3β activity (FIG. 18, 19).

The composition of the present invention reduced Ser199/202 Phosphorylation of Tau protein which is increased in of Alzheimer dementia animal model (NSE-hAPP-C105) (FIG. 20).

The composition of the present invention inhibits Aβ production Positive Feedback Loop and, as a result, reduced APP and Aβ Protein Level (FIG. 21, 22).

Therefore, the composition of the present invention is expected to restore synaptic plasticity by the activation of Wnt signaling from DKK-1 inhibition and to reduce formation of APP and accumulation of Aβ by suppression of positive feedback loop for Aβ production.

6. Activation of Autophagy to Inhibit Formation of Toxic Soluble Aβ Oligomer and Aβ Plaque While the brain consumes 20% or more the oxygen from the total oxygen human body consumes, the defense mechanism for removing reactive oxygen species (ROS) generated inevitably from the intracellular is weak and thus, it is weak against oxidative stress. The ROS accumulated intracellularly by the oxidative stress induces oxidation of proteins in the endoplasmic reticulum to inhibit protein folding and to accumulate misfolding protein and eventually endoplasmic reticulum stress (J Neurochem. 2006 June; 97 (6): 1634-58, Antioxid Redox Signal. 2007 December; 9 (12): 2277-93.). As a result, intracellular Aβ accumulation caused by endoplasmic reticulum stress further increase endoplasmic reticulum stress and endosomal and lysosomal leakage and mitochondrial dysfunction to enhance neuronal cell apoptosis (J Neurosci Res. 2011 July; 89 (7): 1031-42.). Furthermore, recent genome-wide association study with patients with dementia by Alzheimer showed mutation of genes involved with Aβ release or removal (SORL1, BIN1, CD2AP, PICALM), which confirms intracellular accumulation of Aβ is a main cause for the progress of dementia by Alzheimer (Trends Neurosci. 2017 October; 40 (10): 592-602., Nat Rev Mol Cell Biol. 2018 December; 19 (12): 755-773.).

Recently, autophagy drew attention as the main cause of neurodegenerative disease. Autophagy is one of the main cellular mechanisms and it has been known that autophagy function to decompose long-lived proteins and organelle (Nat Med. 2013 August; 19 (8): 983-97.). Dysfunction of autophagy causes intracellular accumulation of misfolded protein aggregates to induce various diseases, and especially closely related to the onset of the four main neurodegenerative diseases, i.e. Alzheimer disease, Huntington's disease, Parkinson's disease, and Amyotrophic Lateral Sclerosis (Mol Cells. 2015 May; 38 (5): 381-9, Nat Rev Drug Discov. 2018 September; 17 (9): 660-688.). Especially, dysfunctional autophagy in the brain of Alzheimer disease patients induces accumulation of two main onset factors for Alzheimer disease, i.e. Aβ and Tau protein (J Syst Integr Neurosci. 2017; 3 (4): 1-6.). As a result, the accumulated Aβ and Tau protein in the brain form senile plaque to cause necrosis or neuronal cells in hippocampus and cortex that are responsible for cognitive capacity and eventually to cause reduced cognitive function in Alzheimer disease patients (J Cell Biol. 2005 Oct. 10; 171 (1): 87-98., Front Aging Neurosci. 2018 Jan. 30; 10:04.).

AMPK (Adenosine Monophosphate-Activated Protein Kinase) is responsible for controlling several biological functions including insulin sensitivity, cell survival, proliferation and apoptosis, among which, especially, by activating autophagy by inhibiting mTOR (mammalian target of rapamycin) protein to maintain cellular homeostasis (Nat Rev Mal Cell Biol. 2018 February; 19 (2): 121-135., Mal Cell. 2017 Jun. 15; 66 (6): 789-800.). Currently, Thr 172 phosphorylation by AMPK catalytic subunit a is a main starting point for the signal transmitting route for activation of autophagy (Exp Mal Med. 2016 Aβ r. 1; 48: c224., Nat Rev Mal Cell Biol. 2018 February; 19 (2): 121-135., Nat Rev Drug Discov. 2019 July; 18 (7): 527-551.), and recently, in degenerative brain disease, it was reported that neuronal degeneration was inhibited by removing misfolded protein aggregates, related to degenerative brain disease, including Aβ and Tau that are main onset factors for Alzheimer disease by Autophagy activation from activated AMPK (Front Neurosci. 2018 May 22; 12:255., Nat Rev Drug Discov. 2018 September; 17 (9): 660-688. J Alzheimers Dis. 2019; 68 (1): 33-38). Considering that 30-40% of Alzheimer disease patients have mixed pathology with other pathological symptoms, removing misfolded protein aggregates, including Aβ and Tar aggregates, accumulated intracellularly by activation of autophagy from activated AMPK would be new target in the future development of therapeutics for degenerative brain disease including Alzheimer disease (Front Neurosci. 2018 May 22; 12:255., Nat Rev Drug Discov. 2018 September; 17 (9): 660-688. J Alzheimers Dis. 2019; 68 (1): 33-38.).

The compositions of the present invention reduced Aβ protein level in hippocampus of Alzheimer's dementia animal model (NSE-hAPP-C105) (FIG. 23).

The compositions of the present invention reduced Aβ Plaque number in hippocampus and cortex of Alzheimer's disease animal model (5XFAD Transgenic Mice) (FIG. 24).

The compositions of the present invention AMPK Catalytic Subunit a of Thr172 phosphorylation was increased (FIG. 25).

The inventive compositions induced autophagic flux (conversion from LC3B-I to LC3B-II) of autophagy marker LC3B to increase LC3B-II/I ratio and reduced an autophagosome cargo protein, ubiquitin-binding protein p62 (SQSTM, Sequestosome 1) (FIG. 26).

The compositions of the present invention enhanced expression of an autophagy marker, ATG7 and ATG5/12, and expression of ATG5/12 in cortex in the hippocampus of Alzheimer's disease animal model (5XFAD Transgenic Mice) (FIG. 26).

Therefore, the compositions of the present invention increased an Autophagy Marker LC3BII/I Ratio, reduced an autophagosome cargo protein Ubiquitin-Binding Protein p62, and increased expression of ATG7 and ATG5/12 to activate autophagic cascade.

7. Alzheimer's Dementia Animal Model (NSE-Happ-C105) for Cognitive and Behavioral Learning Skills Improvement To test the effect of the compositions of the present invention on gradual memory decreases and behavioral disorder that appears in the neurodegenerative disease Alzheimer's disease caused by formation and accumulation of Aβ42, the compositions of the present invention was intraperitoneally injected to 13 month old C57BL/6-Tg (NSE-hAPP-C105) Kor Transgenic Mice, at 4 mg/kg, once per day for 4 weeks before cognitive capacity and behavioral learning skills were tested by a passive Avoidance Test, Morris Water Maze Tese, to analyze any changes in cognitive capacity and behavioral learning skills.

It was confirmed that cognitive capacity and behavioral learning skills in the group treated with the compositions of the present invention was improved compared to transgenic cause control group in Alzheimer's dementia animal model (NSE-hAPP-C105) (FIG. 28, 29).

EXAMPLES

Example 1. Test for Selectivity of the Compositions of the Present Invention for PDE5 ($IC_{50}$, Inhibitory Concentration 50)

Example 1-1. Testing Method for PDE5 Selectivity

In order to test the selective inhibitory activity ($IC_{50}$, Inhibitory Concentration 50) of the compositions of the present invention against PDE5 (Phosphodiesterase 5), the test was conducted by MDS Pharma Services, an analysis agency CRO, and Scottish Biomedical. The result was measured using PDE SPA analysis kit (Amersham Pharmacia Biotech). MDS Pharma Services analyzed PDE1 (bovine heart); PDEs 2, 3, 5 (human platelet); PDE4 (human U937 cell); and PDE6 (bovine retinal rod) and Scottish Biomedical analyzed PDEs 5, 7-11 (recombinant human enzymes). Test samples (each 100 μL) were added to a mixture of PDE Family protein (10 μl), [$^3$H]-cGMP (5 Ci/ml), Bovine Serum Albumin (0.5 mg/ml) and $MgCl_2$ (5 mM) in Tris-HCl Buffer (15 mM, pH 7.5). The reaction began by the addition of PDE Family proteins. Each sample was stored in a 30° C. Water Bath for 30 minutes, and then SPA Bead (PerkinElmer) (50 μL) was added to terminate the reaction. The test tube was allowed to stand for 20 minutes, followed by measurement by Liquid Scintillation Counter (Tri-carb 1500, Packard). To determine degree of inhibition of PDE Family of protein activity, the composition of the present invention and testing samples are dissolved in DMSO (Dimethyl Sulfoxide) and the solution was then diluted with distilled water to make the final DMSO concentration at least 0.2% (v/v). All inhibition test was conducted in a condition where the rate of hydrolysis of cGMP (cyclic Guanosine Monophosphate) does not exceed 15%. The amount of GMP formation depended on time and PDE5 Family protein to increase dose dependently and proportionally.

Example 1-2. Result of PDE5 Selectivity Test for the Compositions of the Present Invention Based on the inhibitory activities of the compositions of the present invention against 11 species of PDE Family (MDS Pharma Services and Scottish Biomedical), $IC_{50}$ of the compositions of the present invention against PDE5 was 0.338 nM (MDS Pharma Services) and 30-376,471 fold higher selectivity compared to the remaining 10 species of PDE Family proteins (Table 1).

TABLE 1

Selectivity of the composition of the present invention within PDE Family

| | PDE5 | | | | | |
|---|---|---|---|---|---|---|
| | PDE1[a] | PDE2[a] | PDE3[a] | PDE4[a] | PDE5[a] | PDE6[a] |
| $IC_{50}$ (nM) | 16,400 | 128,000 | 86,500 | 4,070 | 0.338 | 10.2 |
| | PDE5 | | | | | |
| | PDE5[b] | PDE7A[b] | PDE8A[b] | PDE9A[b] | PDE10A[b] | PDE11A[b] |
| $IC_{50}$ (nM) | 2.6 | >100,000 | 21,880 | NI | 25,650 | 3,750 |

[a]MDS Pharma Services; PDE1 (Bovine Heart); PDEs 2, 3, 5 (Human Platelete); PDE4 (Human U937 Cell); PDE6 (Bovine Retinal Rod).
[b]Scottish Biomedical; PDEs 5, 7-11 (Recombinant Human Enzymes); NI = No Inhibition Observed.

Example 2. Test for Inhibition of βB Aggregation by the Compositions of the Present Invention

Example 2-1. Aβ Aggregation Inhibitory (AβAggregation Inhibition) Test Method

Example 2-1-1. Thioflavin T Assay

If Aβ1-42 Peptide, one of the Alzheimer's major biomarkers and causes, is incubated at 37° C. for 3 days, Aβ Fibril and Oligomers are generated. To test the activity of the composition of the present invention for inhibiting Aβ Fibril and Oligomer formation, Aβ1-42 (50 μM) was treated with the composition of the present invention in various concentrations (5, 50, 500 μM) before the mixture was incubated at 37° C. for 3 days followed by measuring the amount of Aβ1-42 fibril and Oligomer. Using Varioskan LUX Multimode Microplate Reader (Thermo Fisher Scientific, USA) fluorescence intensity from Thioflavin T at Excitation 450 nm/Emission 485 was measured. Thioflavin T Assay measures fluorescence response from β-Sheet formed as the peptide aggregates and showed higher value as there are more aggregates formed. Even though Thioflavin T Assay cannot distinguish between Aβ Oligomer and Fibril, it is an advantage that it can show the total amount of aggregated proteins quantitively.

Example 2-1-2. PICUP/SDS-PAGE Analysis

The production of Aβ Oligomer was observed by PICUP (Photo Induced Cross-linking of Unmodified Protein) analytical method. Using PICUP process, the generated Aβ Oligomer and Fibril/Plaque are immobilized followed by separated by size using SDS-PAGE (Sodium Dodecyl Sulfate-Polyacrylamide Gel Electrophoresis). Separate Aβ1-42 Peptide is observed using Silver Staining.

Example 2-2. Result of βB Aggregation Inhibition by the Composition of the Present Invention The result of Aβ-42 aggregation inhibition shows that the composition of the present invention, compared to the untreated control group, inhibits Aβ1-42 aggregation formation inhibitory effects discussed results dose-dependently, based on Thioflavin T Assay (FIG. 1), and also by PICUP/SDS-PAGE Analysis, the present invention inhibited Aβ1-42 Oligomer and Fibril/Plaque formation compared to the untreated control group (FIG. 2). Considering the result, the composition of the present invention is expected to inhibit Aβ Oligomer and with Fibril/Plaque formation.

Example 3. BACE-1 Expression Change in Retinoic Acid Differentiated SH-SY5Y Cell by the Composition of the Present Invention

Example 3-1. Cell Culture Method for SH-SY5Y Neurons

Example 3-1-1. Cell Subculture

A mixture of DMEM/F12 Complete Medium, DPBS, and Trypsin-EDTA was preheated in a 37° C. constant water bath for 30 minutes. The cell culture flask was removed from the incubator, to remove all medium and rinsed with DPBS once (T25:5 mℓ, T75: 10 mℓ and T175: 20 mℓ). After discarding all DPBS, trypsin-EDTA (T25: 2 mL, T75: 5 mL and T175: 10 mL) was added, and the mixture was left for 4 minutes in an incubator with 5% $CO_2$ at 37° C. In a 50 mℓ Conical Tube, the new Complete Medium (T25 mℓ, T75: 10 mℓ and: T175: 20 mℓ) and the cells were mixed and centrifuged at 1500 rpm for 4 minutes. Supernatant was all removed and 1 mℓ of Fresh DMEM/F12 Complete Medium was added to resuspend the cells by either tapping or pipetting. Cells and the medium was added to the cell culture flask to make T75: 20 mℓ and T175: 40 mℓ (before incubating the mixture in an incubator at 37° C. under 5% $CO_2$.

Example 3-1-2. SH-SY5Y Neuroblastoma Differentiation

A mixture of DMEM/F12 Complete Medium (Hyclone), DPBS (Hyclone) and Trypsin-EDTA (Hyclone) was preheated in a 37° C. constant water bath for 30 minutes. The cell culture flask was removed from the incubator, to remove all medium and rinsed with DPBS once (T75: 10 mℓ and T175: 20 mℓ). After discarding all DPBS, trypsin-EDTA (T75: 5 mL and T175: 10 mL) was added, and the mixture was left for 4 minutes in an incubator with 5% $CO_2$ at 37° C. In a 50 mℓ Conical Tube, the new Complete Medium (T75: 10 mℓ and T175: 20 mℓ) and the cells were mixed and centrifuged at 1500 rpm for 4 minutes. Supernatant was all removed and 1 mℓ of Fresh DMEM/F12 Complete Medium was added to resuspend the cells by either tapping or pipetting. Certain amount of DMEM/F12 Complete Medium was added and transferred $4 \times 10^4$ cells/$cm^2$ into Collagen Type I Coated 6-Well Plate or Collagen Type I Coated 60 mm, 100 mm Cell Culture Dish (Corning). After 24 hours, the medium was changed with DMEM/F12 differentiation medium [+1% FBS+1% Penicillin/Streptomycin (Hyclone)+10 μM Retinoic Acid (Sigma-Aldrich)]. On day 5, medium was changed again with new DMEM/F12 differentiation medium. On day 8, medium was changed again with new DMEM/F12 differentiation medium. On day 10, differentiation was completed.

Example 3-2. Aβ and Preparation and Treatment Method of the Present Invention DMEM/F12 (+1% FBS+1% Penicillin/Streptomycin) was prepared to have 1 μM human Aβ1-42 (Abcam). Aβ solution was let to stand for 3 hours at 37° C. to form Aβ Oligomer. The original cell culture medium was discarded and the newly prepared Aβ1-42 Oligomer (1 μM) solution was treated alone or with the composition of the present invention (maximum concentration of 40 μM) before being incubated at 37° C. for 72 hours under 5% $CO_2$ in an incubator. 72 hours later, the medium was removed and the cells were washed once with PBS and collected before continuing with the following experiments.

Example 3-3. qRT-PCR Method

Total RNA was prepared using Easy-Blue™ Total RNA extraction kit (Intron Biotechnology) and using PrimeScript™ II 1st strand cDNA Synthesis Kit (TAKARA), 1 μg RNA was reverse-transcribed. cDNA was provided as a template for EmeraldAmp® PCR Master Mix (TAKARA) and the next Primer for BACE-1 and β-Actin PCR: the Human BACE-1 (Forward 5'-CTGGTATACACC-CATCCGGC-3', Reverse 5'-CTTGGGCAAACGAAGGTTGG-3'); Human β-Actin (Forward 5'-CCAGGTCATCACCATTGG-3', Reverse 5'-CAGAGTACTTGCGCTCAG-3'). The conditions for PCR Cycle were as follows: Denaturation (45 seconds at 95°

C.); Annealing, Human BACE-1 (45 seconds at 60° C.), β-Actin (45 seconds at 56° C.); Extension (45 seconds at 72° C.); 40 Cycles. qRT-PCR was performed using QuantStudio™ 5 (Thermo Scientific).

Example 3-4. Result of Changes in BACE-1 Expression by the Composition of the Present Invention in Retinoic Acid Differentiated SH-SY5Y Cell The present invention dose-dependently reduced expression of BACE-1 mRNA which was increased by treating retinoic Acid Differentiated SH-SY5Y Cell with Aβ1-42 (FIG. 3). Considering the results, the present invention is expected to suppress formation of Aβ1-42 or Aβ1-43 that cause neuronal cell damage by suppressing expression of BACE-1, which plays major role in β-Amyloidogenic Processing of APP.

Example 4. Change of Calcium Concentration Within Pericyte by the Compositions of the Present Invention Example 4-1. Method for Culturing Pericytes Example 4-1-1. Cell Subculture Several T-75 $cm^2$ Cell Culture Flask (SPL, #70075) was coated using Attachment Factor™ (Cell Systems, #4Z0-210), an Extracellular Matrix (ECM), for 1 minute, followed by adding 15 mL of Complete Classic Medium with Serum and CultureBoost™ (Cell Systems, #4Z0-500) to the flask before stabilizing the mixture in an incubator at 37° C. under $CO_2$. The incubated Primary Human Brain Pericytes (Cell Systems, #ACBRI 498P) was washed twice with PBS buffer, followed by adding 3 mL of 0.25% Trypsin (Hyclone, #SH30042.02) and reacting the mixture at 37° C. in $CO_2$ incubator for 2 minutes. 7 mL of Complete Classic Medium with serum and CultureBoost™ was added and the clusters of cells were separated by repetitive pipetting, and the supernatant was removed by centrifugal separation (1,500 rpm, 4 minutes). The cell clusters were homogenized in 1 mL of Complete Classic Medium With Serum and CultureBoost™ before incubating the cells in stabilized T-75 $cm^2$ Cell Culture Flask under optimum $CO_2$.

Example 4-2. Method for Preparation of and Treatment with $H_2O_2$ and Measurement of changes of Intracellular Calcium Concentration After Treatment Flat-Bottom 96-Well Plate (SPL, #30096) was coated with Attachment Factor TM and Complete Classic Medium With Serum and CultureBoost™ (100 μL/well) was added to each well followed by stabilizing the plate at 37° C. in $CO_2$ incubator for 1 hour. Primary Human Brain Pericytes treated with 0.25% Trypsin was added to Attachment Facotr-Coated-96-Well Plate containing Complete Classic Medium With Serum and CultureBoost™ and the mixture was incubated in 37° C. $CO_2$ incubator for 16 hours (5×10$^3$ Cells/Well). The culture medium of the cultures cells was removed and the cells were washed with HEPES-Buffered Salinc (132 mM NaCl, 5.9 mM KCl, 1.2 mM $MgCl_2$, 1.5 mM $CaCl_2$, 11.5 mM Glucose, 11.5 mM HEPES, 1.2 mM $NaH_2PO_4$) once, transferred to 96-well containing Pericyte, wherein Ratiometric Intracellular $Ca^{2+}$ Dye, Fura-2 (Molecular Probes, #F1201), was diluted to 1 μM with HEPES-Buffered Saline before being incubated at room temperature for 30 minutes. The supernatant was removed from the 96-well plate, the cells were washed with HEPES-Buffered Saline three times, and treated the composition of the present invention diluted with HEPES-Buffered Saline and $H_2O_2$ before measuring the fluorescence to measure the changes of intracellular calcium concentration.

Example 4-4. Result of Changes of Calcium Concentration in Pericyte of Retinoic Acid Differentiated SH-SY5Y Cell by the Composition of the Present Invention The composition of the present invention reduced the intracellular calcium concentration in perivascular cells (Pericyte) which was increased by the treatment of $H_2O_2$ (FIG. 4). Based on the result, it is expected that the composition of the present invention can inhibit the reduction of cerebral blood flow caused by the contraction of pericytes which in turn was caused by the increased calcium concentration in pericyte by the excessive production of ROS.

Example 5. Change of Intracellular cGMP in Retinoic Acid Differentiated SH-SY5Y Cell by the Composition of the Present Invention Example 5-1. Cell Culture Method of SH-SY5Y Neuronal Cells Example 5-1-1. Cell Subculture Using the method described in Example 3-1-1, cells were subcultured.

Example 5-1-2. SH-SY5Y Neuroblastoma Differentiation

Using the method described in Example 3-1-2, SH-SY5Y neuronal differentiation was conducted.

Example 5-2. Aβ and the Preparation and Treatment Method of the Present Invention Using the method described in Example 3-2, the preparation and treatment were performed.

Example 5-3. Intracellular cGMP Measurement Method

The experiment was conducted according to the manual of the Cyclic GMP Complete ELISA Kit (Abcam, #ab133052, USA). Cell culture medium was removed and the cells were treated with 0.1 mL of 0.1M HCl before standing at room temperature for 10 minutes. The cells were recovered by 600 g centrifugation, and only the supernatant was collected. Where 0.1M HCl is included in the sample, 50 μl of Neutralizing Reagent was added for each well. Following the manual, 100 μl of each agent and the standard solution (0, 0.8, 4 20, 100, 500 pmol/mℓ) was added to each well of 96-well plate and 50 μℓ of Cyclic GMP Complete Alkaline Phosphatase Conjugate was also added to each well. After 50 μℓ of Cyclic GMP Complete antibody was added, reaction was conducted for 2 hours at room temperature. Once all reaction solution was removed, the well was washed with 400 μℓ of wash buffer three times. After the wash buffer was completely removed, 5 μℓ of Cyclic GMP Complete Alkaline Phosphatase Conjugate was added. After adding 200 µℓ of pNpp Substrate Solution was added to each well, the reaction was conducted at room temperature for 1 hour. 50 µℓ of Stop Solution was added and immediately absorption value was measured using Plate Reader at 405 nm. The result was calculated using the manual in the Kit.

Example 5-4 Result of Changes of Intracellular cGMP in Retinoic Acid Differentiated SH-SY5Y Cell by the Present Invention The composition of the present invention concentration-dependently increased the concentration of cGMP which was reduced by the treatment of Retinoic Acid Differentiated SH-SY5Y Cell with Aβ1-42 Oligomer (FIG. 5). Considering this result, it is expected that the present invention suppress the activity of PDE5 selectively (Table 1) to inhibit the conversion of cGMP to 5'-GMP and increase Intracellular cGMP, which suppress the activity of Caspase-3 (FIG. 6) and restore Mitochondrial membrane Potential to inhibit Neuronal Cell Death (FIG. 8). Also, Intracellular cGMP increased by the present invention increases the activity of CREB (FIG. 9) to promote Neurotrophin expression including NGF and BDNF (FIG. 10, 11) to improve the cognitive function.

Example 6. Changes in Expression of Aβ optosis Regulation Related Protein in Retinoic Acid Differentiated SH-SY5Y Cell by the Present Invention

Example 6-1. Cell Culture Method of SH-SY5Y Neuronal Cells

Example 6-1-1. Cell Subculture

Using the method described in Example 3-1-1 Cell Subculture was conducted.

Example 6-1-2. SSH-SY5Y Neuroblastoma Differentiation

Using the method described in Example 3-1-2, SH-SY5Y neuronal cells were differentiated.

Example 6-2. Methods for Preparation of Aβ and Treatment by the Present Invention Human Aβ1-42 (Abcam) was mixed with DMEM/F12 (+1% FBS+1% Penicillin/Streptomycin) to be 10 µM concentration. The Aβ solution was allowed to stand at 37° C. for 3 hours to form Aβ Oligomer. The culture medium was removed and the newly prepared Aβ1-42 Oligomer solution (1 µM) was incubated with or without the composition of the present invention (maximum concentration of 40 µM) at 37° C. for 72 hours in 5% CO$_2$ incubator. After 72 hours the culture medium was removed and the cells were washed with PBS once to collect the cells. Further experiments were carried out by the following procedures.

Example 6-5. Western Blot Analysis Method

To extract the proteins, the cells were treated with RIPA Lysis Buffer (Bio-Rad), homogenized, and centrifuged (14,000 rpm, 10 minutes, 4° C.) to obtain the supernatant. 5% Stacking Gel (DW, 30% Acrylamide: Bisacrylamide, 1M Tris pH 6.8, 10% SDS, TEMED, 10% Ammonium Persulfate) and 12% Separating Gel (DW, 30% Acrylamide: Bisacrylamide, 1.5M Tris pH 8.8, 10% SDS, TEMED, 10% Ammonium Persulfate) were used for SDS-PAGE. Supernatant obtained by centrifugation was mixed with 4× Lacmmli Buffer (Bio-Rad) in 3:1 ratio and boiled at 95° C. for 10 minutes to denature the proteins. The mixture was cooled in an ice bath for 10 minutes and span down. Protein Size Marker (Bio-Rad) and each sample were added to Stacking Gel Well prepared in Mini-Protein II Dual-Slab Apparatus (Bio-Rad) and electrophoresed at 150 volt till all are precipitated to the bottom. Polyvinylidene Difluoride (PVDF) Membrane was moistened with methanol to activate and washed with Transfer Buffer (190 mM Glycine, 50 mM Tris-Base, 0.05% SDS, 20% Methanol). Whatman 3M Paper moistened with Transfer Buffer was stacked in Mini Trans-Bolt Cell (Bio-Rad) and run electricity at 200 mA for 60 minutes to deposit the membrane. After the deposition, the membrane was blocked with 5% Skim milk solution (in TBS-T: 10 mM Tris-Base pH 8.0, 150 mM NaCl, 0.1% Tween-20) on a Platform Shaker for 60 minutes. The primary antibodies used for the current experiments are provided in Table 2. The primary antibodies were diluted in 5% Skim Milk in an optimum concentration for each, put on platform shaker at 4° C. for 16 hours. The primary antibodies were recovered, washed with TBS-T 3 times for 10 minutes each, the secondary antibodies (Goat Anti-Rabbit IgG H&L (HRP), Abcam; Goat Anti-Mouse IgG H&L (HRP), Abcam) were diluted with 5% Skim milk in 1:10,000 ratio, followed by put on a platform shaker at room temperature for 60 minutes and washed with TBS-T solution for 10 minutes, 3 times. Finally, Membrane was added to SuperSignal™ West Femto Maximum Sensitivity Substrate (Thermo Scientific™) and expressed the color properly before the membrane was scanned using image analysis system and the amount of protein was calculated using Image J Software (NIH, USA).

TABLE 2

List of Primary Antibodies

| Antibody | Dilution Ratio | Catalog No | Company |
| --- | --- | --- | --- |
| PARP (46D11) Rabbit mAb | 1:1,000 | 9532S | Cell Signaling |
| Cleaved PARP (Asp214) (D64E10) | 1:1,000 | 5625S | Cell Signaling |
| Caspase-3 Antibody | 1:1,000 | 9662S | Cell Signaling |
| Cleaved Caspase-3 (Asp175) Antibody | 1:1,000 | 9661S | Cell Signaling |
| GAPDH | 1:1,000 | 2118L | Cell Signaling |

Example 6-6 Change of Expression of Aβ optosis Regulation Related Protein in the Retinoic Acid Differentiated SH-SY5Y Cell by the Present Invention The present invention suppressed formation of Cleaved Capase-3 which was increased by treating Retinoic Acid Differentiated SH-SY5Y Cell with Aβ1-42 Oligomer. As a result, the amount of RARP cleaved by Cleaved Caspase-3 was reduced and thus reduced the amount of formation of Cleaved PARP (FIG. 6). Considering these results, the present invention suppresses apoptosis caused by Aβ1-42 Oligomerand to reduce Neuronal Cell Death to increase Neuronal Cell Survival.

Example 7. Change Of Mitochondrial Membrane Potential in Retinoic Acid Differentiated SH-SY5Y Cell by the Present Invention Example 7-1. Method for Culturing SH-SY5Y Neurons Example 7-1-1. Cell Subculture Using the method described in Example 3-1-1, Cell Subculture was conducted.

Example 7-1-2. SH-SY5Y Neuroblastoma Differentiation

Using the method described in Example 3-1-2, SH-SY5Y neuronal cells were differentiated.

Example 7-2. Method for Preparation of Aβ and Treatment with the Present Invention Using the method described in Example 3-2, preparation and treatment was conducted.

Example 7-3. Method for Measuring Mitochondrial Membrane Potential

After the cell culture medium was removed, the cells were washed with CPBS once. JC-1 solution of JC-1-Mitochondrial Membrane Potential Assay Kit (Abcam, USA) was mixed with medium without FBS and treated cells with the mixture. The cells were left in the 5% incubator at 37° C. for 15 minutes. The medium was removed and the cells were washed with DPBS once and clean medium was added. Using Varioskan LUX Multimode Microplate Reader (Thermo Fisher Scientific, USA), fluorescence of JC-1 Monomer at Excitation 475 nm/Emission 530 nm and JC-1 Dimer at Excitation 535 nm/Emission 590 nm.

Example 7-4. Change of Mitochondrial Membrane Potential in Retinoic Acid Differentiated SH-SY5Y Cell The present invention dose-dependently increased Mitochondrial Membrane Potential reduced by the treatment of Retinoic Acid Differentiated SH-SY5Y Cell with Aβ1-42 Oligomer (FIG. 7). Considering the results, the present invention reduced Mitochondrial Damage caused by excess ROS formed by Aβ1-42 Oligomer to increase Neuronal Cell Survival.

Example 8. Live-Cell Analysis by the Effect by Suppression of Neuronal Cell Death in Retinoic Acid Differentiated SH-SY5Y Cell by The Present Invention Example 8-1. Cell Culture Method of SH-SY5Y Neurons Example 8-1-1. Cell Subculture Using the method described in Example 3-1-1, cell subculture was conducted.

Example 8-1-2. SH-SY5Y Neuroblastoma Differentiation

Using the method described in Example 3-1-2, SH-SY5Y Neuroblastoma Cells were differentiated.

Example 8-2. Preparation of Aβ and Treatment with the Present Invention

Using the method described in Example 3-2, the preparation and treatment was conducted.

Example 8-3. IncuCyte S3 Live-Cell Analysis (Satorius, USA)

Cytotox Red Reagent (Essen Bioscience Cat #4632) was added in a concentration of 1:1,000 (v/v) and the cells were incubated in 5% $CO_2$, at 37° C. for 24 hours. To analyze the cytotoxicity, the final ratio of the microscopy was adjusted to ×200 and pictures were taken every 1.5 hours. Using the software provided by IncuCyte, the image was produced to be 1.5 fps and for the analysis of the cytotoxicity, Total Red Object Area read in the image was compared. The experiments were repeated three times and Student's T-Test was used for statistical analysis. All significance tests were performed at the $P<0.05$ level.

Example 8-4. Live-Cell Analysis Results by the Effect Of Suppression of Neuronal Cell Death in Retinoic Acid Differentiated SH-SY5Y Cell by the Present Invention The present invention reduced apoptosis cells dyed by Cytotox Red Reagent increased in Retinoic Acid Differentiated SH-SY5Y Cell by the treatment with Aβ1-42 Oligomer (FIG. 8). Considering this result, the present invention can increase Neuronal Cell Survival by suppressing Neuronal Cell Death induced by Aβ1-42 Oligomer.

Example 9. CREB Expression Change in Retinoic Acid Differentiated SH-SY5Y Cell By The Present Invention Example 9-1. Cell Culture Method of SH-SY5Y Neurons Example 9-1-1. Cell Subculture Using the method described in Example 3-1-1, cell subculture was conducted.

Example 9-1-2. SH-SY5Y Neuroblastoma Differentiation

Using the method described in Example 3-1-2, SY5Y Neuronal Cells were differentiated.

Example 9-2. Preparation and Treatment Method of βB and the Present Invention

Using the method described in Example 3-2, preparation and treatment was conducted.

Example 9-4. Western Blot Analysis Method

To extract the proteins, cells were treated with RIPA Lysis Buffer (Biorad), homogenized, and centrifuged (14,000 rpm, 10 minutes, 4° C.) to obtain supernatant. 5% Stacking Gel (DW, 30% Acrylamide: Bisacrylamide, 1M Tris pH 6.8, 10% SDS, TEMED, 10% Ammonium Persulfate) and 12% Separating Gel (DW, 30% Acrylamide: Bisacrylamide, 1.5M Tris pH 8.8, 10% SDS, TEMED, 10% Ammonium Persulfate) were used for SDS-PAGE. The supernatant obtained by centrifugation and 4× Laemmli Buffer (Bio-Rad) were mixed in 3:1 ratio and boiled at 95° C. for 10 minutes to denature the proteins. The mixture was cooled in an ice bath and span down. Protein Size Marker (Bio-Rad) and each sample was injected into Stacking Gel Well equipped in Mini-Protein II Dual-Slab Apparatus (Bio-Rad) and electrophoresed at 150 volt until all are settle at the bottom. Polyvinylidene Difluoride (PVDF) Membrane was moistened with methanol to activate and washed with Transfer Buffer (190 mM Glycine, 50 mM Tris-Base, 0.05% SDS, 20% Methanol). Whatman 3M Paper moistened with Transfer Buffer was stacked in Mini Trans-Bolt Cell (Bio-Rad) and run electricity at 200 mA for 60 minutes to deposit the membrane. After the deposition, the membrane was blocked with 3% BSA (Bovine Serum Albumin) solution (in TBS-T: 10 mM Tris-Base pH 8.0, 150 mM NaCl, 0.1% Tween-20) on a Platform Shaker for 60 minutes. The primary antibodies used for the current experiments are provided in Table 3. The primary antibodies were each diluted in 5% Skim Milk solution in an optimum concentration for each, put on platform shaker at 4° C. for 16 hours. The primary antibodies were recovered, washed with TBS-T 3 times for 10 minutes each, the secondary antibodies (Goat Anti-Rabbit IgG H&L (HRP), Abcam; Goat Anti-Mouse IgG H&L (HRP), Abcam) were diluted with 5% Skim milk in 1:10,000 ratio, followed by put on a platform shaker at room temperature for 60 minutes and washed with TBS-T solution for 10 minutes, 3 times. Finally, Membrane was added to SuperSignal™ West Femto Maximum Sensitivity Substrate (Thermo Scientific™) and expressed the color properly before the membrane was scanned using image analysis system and the amount of protein was calculated using Image J Software (NIH, USA).

TABLE 3

List of Primary Antibodies

| Antibody | Dilution Ratio | Catalog No | Company |
| --- | --- | --- | --- |
| Phospho-CREB (Ser133) (87G3) | 1:1,000 | 9198S | Cell Signaling |
| GAPDH | 1:1,000 | 2118L | Cell Signaling |

Example 9-5. CREB Expression Changes in the Retinoic Acid Differentiated SH-SY5Y Cell by the Present Invention The present invention concentration-dependently increased Ser133Phosphorylation of CREB Protein and decreased in Retinoic Acid Differentiated SH-SY5Y Cell by the treatment with Aβ1-42 Oligomer (FIG. 9). Considering this result, the present invention is expected to increase Ser133 Phosphorylation in CREB Protein reduced by Aβ1-42 Oligomer to restore the activities of CREB protein, a Cellular Transcription Factor, to induce expression of factors related to Neurogenesis, Synaptogenesis, and Angiogenesis to improve cognitive function.

Example 10. NGF and BDNF of Expression Change in Retinoic Acid Differentiated SH-SY5Y Cell by the Present Invention Example 10-1. Cell Culture Method of SH-SY5Y Neurons Example 10-1-1. Cell Subculture Using the method described in Example 3-1-1, cell subculture was conducted.

Example 10-1-2. SH-SY5Y Neuroblastoma Differentiation

Using the method described in Example 3-1-2, SH-SY5Y Neuroblastoma was differentiated.

Example 10-2. Preparation and Treatment Method Of Aβ and the Present Invention

Using the method described in Example 3-2, preparation and treatment was conducted.

Example 10-3. Western Blot Analysis Method

Using the method described in Example 6-5, Western Blot Analysis has been conducted and the primary antibodies and the conditions used for the current experiments are provided in Table 4.

TABLE 4

List of Primary Antibodies

| Antibody | Dilution Ratio | Catalog No | Company |
| --- | --- | --- | --- |
| Anti-NGF Antibody [EP1320Y] | 1:1,000 | ab52918 | Abcam |
| Anti-BDNF Antibody [EPR1292] | 1:1,000 | ab108319 | Abcam |
| GAPDH | 1:1,000 | 2118L | Cell Signaling |

Example 10-4. NGF Immunocytochemistry (ICC)

SH-SY5Y was incubated in Corning BioCoat Collagen I Culture Slides (Corning, #354630), 4.8×10$^4$ Cells/Well, for 7 days, was treated with Aβ1-42 Oligomer (72 hours) and the present invention (24 hours), and NGF Immunostaining experiment was conducted. Cells were fixed at 4% Paraformaldehyde (pH 7.4) for 10 minutes, and washed with Ice-Cold PBS Buffer three times. After Cell Permeabilization with 0.1% Triton X-100 in PBS, cells were washed with Ice-Cold PBS Buffer three times. Fixed cells were blocked using Blocking Solution (10% Normal Goat Serum in PBS) for 30 minutes. The primary antibodies used for the current experiment is Rabbit Anti-NGF Antibody (Abcam, #ab52918) from Table 4. Cells were incubated in Rabbit Anti-NGF Antibody (X300 Dilution) Solution at 4° C. for 16 hours, washed with PBS Buffer three times, incubated with Alexa 488 Anti-Rabbit IgG Secondary Antibody (X500 Dilution) at room temperature for 1 hour, washed with PBS once, react with DAPI Staining Solution (Abcam, #ab228549) for Nuclear Staining for 1 minute and washed with PBS Buffer 3 times. Cells were treated with Vector Shield Mounting Medium, and fluorescence image was obtained using Super Resolution Confocal Laser Microscopy (Carl Zeiss, #LSM800).

Example 10-5. NGF and BDNF of expression changes In Retinoic Acid Differentiated SH-SY5Y Cell By The Present Invention Upon reviewing the effect of increased expression of Neurotrophin by the present invention, Western Blot Analysis showed that the present invention concentration-dependently increased expression of NGF and BDNF decreased in Retinoic Acid Differentiated SH-SY5Y Cell by the treatment with Aβ1-42 Oligomer (FIG. 10), and Immunocytochemistry also showed that the present invention increased the expression of NGF in Retinoic Acid Differentiated SH-SY5Y Cell by the treatment with Aβ1-42 Oligomer (FIG. 11). Based on the results, the present invention is expected to increase the expression of neurotrophin including NGF and BDNF that play important role to induce neuron's survival, development and function to stimulate survival and differentiation of neuronal cells to improve the cognitive function.

Example 11. Effect on Expression Of DKK-1 in Retinoic Acid Differentiated SH-SY5Y Cell and Differentiated HT-22 Mouse Hippocampal Neuronal Cell by the Present Invention

Example 11-1. Cell Culture Method of SH-SY5Y Neurons

Example 11-1-1. Cell Subculture

Using the method described in Example 3-1-1, cell subculture was conducted.

Example 11-1-2. SH-SY5Y Neuroblastoma Differentiation

Using the method described in Example 3-1-2, SH-SY5Y cells were differentiated.

Example 11-2. Cell Culture Method of HT-22 Mouse Hippocampal Neuronal Cell Line

Example 11-2-1. Cell Subculture

DMEM/High Glucose Medium (10% FBS, 1% Penicillin-Streptomycin), DPBS and 0.25% Trypsin-EDTA were preheated in a 37° C. constant temperature bath for 30 minutes. Cell culture flask was taken out of the incubator, the existing medium was discarded and washed with DPBS once (T25: 5 mℓ, T75: 10 mℓ and T175: 20 mℓ). DPBS was all discarded, 0.25% Trypsin-EDTA (T25: 2 mℓ, T75: 5 mℓ and T175: 10 mℓ) was added and the mixture was left in an incubator under 5% $CO_2$, at 37° C. for 2 minutes. New Complete Medium (T25: 4 mℓ, T75: 10 mℓ and T175: 20 mℓ) and cells were mixed in 50 ml Conical Tube and centrifuged at 1500 rpm for 4 minutes. After removing all supernatant, Fresh DMEM/High Glucose was added and cells were resuspended either by Tapping or Pipetting. Cells and the medium was added to a Cell Culture Flask (T75-15 mℓ and T175-40 mℓ) and incubated under 5% $CO_2$, at 37° C.

Example 11-2-2. Neuronal Differentiation of HT-22 Cells

DMEM/High Glucose Medium (10% FBS, 1% Penicillin-Streptomycin), DPBS and 0.25% Trypsin-EDTA were preheated in a 37° C. constant temperature bath for 30 minutes. Cell culture flask was taken out of the incubator, the existing medium was discarded and washed with DPBS once (T25: 5 mℓ, T75: 10 mℓ and T175: 20 mℓ). DPBS was all discarded, 0.25% Trypsin-EDTA (T25: 2 mℓ, T75: 5 mℓ and T175: 10 mℓ) was added and the mixture was left in an incubator under 5% $CO_2$, at 37° C. for 2 minutes. New Complete Medium (T25: 4 mℓ, T75: 10 mℓ and T175: 20 mℓ and cells were mixed in 50 ml Conical Tube and centrifuged at 1500 rpm for 4 minutes. After removing all supernatant, 1 ml of Fresh DMEM/High Glucose was added and cells were resuspended either by Tapping or Pipetting. Optimum amount of DMEM/High Glucose Medium was further added and $2 \times 10^5$ cells/cm² were added to Collagen Type I Coated 6-Well Plate. After 24 hours, the medium was changed to differentiation medium [Neurobasal Plus medium (Gibco)+B-27supplement (Gibco)+1% Penicillin-streptomycin]. After 24 hours, medium was changed to new differentiation medium and treated with Aβ1-42 Oligomer and the present invention for 6 hours.

Example 11-3. Preparation and Treatment Of Aβ and the Present Invention

Using the method described in Example 3-2, preparation and treatment was conducted.

Example 11-4. qRT-PCR Method

Total RNA was prepared using Easy-Blue™ Total RNA extraction kit (Intron Biotechnology) and 1 μg RNA was reverse-transcribed using PrimeScript™ II 1st strand cDNA Synthesis Kit (TAKARA). cDNA was provided as a template using EmeraldAmp® PCR Master Mix (TAKARA) and next Primer for human DKK and β-Actin PCR: Human DKK1 (Forward 5'-ATTCCAACGCTATCAAGAACC-', Reverse 5'-CCAAGGTGCTATGATCATTACC-3'); Human β-Actin (Forward 5'-CCAGGTCATCACCATTGG-3', Reverse 5'-CAGAGTACTTGCGCTCAG-3'); Mouse DKK1 (Forward 5'-TCTGCTAGGAGCCAGTGCC-3', Reverse 5'-GATGGTGATCTTTCTGTATCC-3'); Mouse β-Actin (Forward 5'-CTGTCCCTGTATGCCTCTG-3', Reverse 5'-ATGTCACGCACGATTTCC-3'). The condition for PCR Cycle is as follows: Denaturation, 45 seconds at 95° C.; Annealing, 45 seconds at 56° C.; Extension, 45 seconds at 72° C.; 40 Cycles. qRT-PCR was carried out using QuantStudio™ 5 (Thermo Scientific).

Example 11-5. Western Blot Analysis Method

Using the method described in Example 6-5, Western Blot Analysis was carried out and the primary antibodies and the condition used for the current experiment is provided in Table 5.

TABLE 5

| List of Primary Antibodies | | | |
|---|---|---|---|
| Antibody | Dilution Ratio | Catalog No | Company |
| DKK-1 | 1:500 | ab61275 | Abcam |
| GAPDH | 1:1,000 | 2118L | Cell Signaling |

Example 11-6. Change in DKK-1 Expression in Retinoic Acid Differentiated SH-SY5Y Cell and Differentiated HT-22 Mouse Hippocampal Neuronal Cell by the Present Invention The present invention decreased expression of DKK-1 in mRNA (FIG. 12) and in Protein Level (FIG. 13) in Retinoic Acid Differentiated SH-SY5Y Cell and Differentiated HT-22 Mouse Hippocampal Neuronal Cell increased by treatment with Aβ1-42 Oligomer. Considering the result, the present invention is expected to decreased DKK-1 expression increased by Aβ1-42 Oligomer, restore Synaptic Plasticity by activation of Wnt Signaling (FIGS. 14-20) and reduction of APP formation and Aβ accumulation by the suppression of Positive Feedback Loop of Aβ production (FIG. 21, 22).

Example 12. Wnt Gene Expression Changes in Differentiated HT-22 Mouse Hippocampal Neuronal Cell by the Present Invention

Example 12-1. Cell Culture Method Of HT-22 Mouse Hippocampal Neuronal Cell Line

Example 12-1-1. Cell Subculture

Using the method described in Example 11-2-1, Cell Subculture was carried out.

Example 12-1-2. Neuronal Differentiation of HT-22 Cells

Using the method described in Example 11-2-2, Cell Subculture was carried out.

Example 12-3. Preparation and Treatment Method Of Aβ and the Present Invention Prepared a 10 μM solution of human Aβ1-42 (Abcam) in DMEM/F12 (+1% FBS+1% Penicillin/Streptomycin). Solution of Aβ was left at 37° C. for 3 hours to form Aβ Oligomer. The existing medium was discarded and the cells were treated with newly prepared Aβ1-42 Oligomer (10 μM) solution with or without the present invention (maximum concentration 5 μM), and incubated under 5% $CO_2$ at 37° C. for 72 hours. After 72 hours, the medium was removed and the cells were washed with PBS once and recovered. Using the following procedure, further experiments were carried out.

Example 12-3. qRT-PCR Method

Total RNA was prepared using Easy-Blue™ Total RNA extraction kit (Intron Biotechnology), 1 μg RNA was reverse-transcribed using PrimeScript™ II 1st strand cDNA Synthesis Kit (TAKARA). cDNA was provided as a template for Wnt and β-Actin PCR using EmeraldAmp® PCR Master Mix (TAKARA) and the following Primer: Mouse Wnt1 (Forward 5'-CTCTTTGGCCGAGAGTTCGTGG-3', Reverse 5'-CCTCGGTTGCCGTAAAGGACGC-3'); Mouse Wnt3a (Forward 5'-CTCGCATGGCATAGATGGGTGC-3', Reverse 5'-GCAGGTGTGCACGTCATAGAC-3'); Mouse Wnt5a (Forward 5'-CATGGAGTGTCTGGCTCCTG-3', Reverse 5'-GTCCATCCCCTCTGAGGTCTTG-3'); Mouse β-Actin (Forward 5'-GCCTAGCTCTCGGAACTGTGGC-3'); Mouse β-Actin (Forward 5'-CTGTCCCTGTATGCCTCTG-3', Reverse 5'-ATGT-CACGCACGATTTCC-3'). The condition for PCR Cycle was as following: Denaturation (45 seconds at 95° C.); Annealing, Wnt 1, Wnt3a, Wnt 5a (45 seconds at 60° C.); Wnt7a (45 seconds at 57° C.); β-Actin (45 seconds at 56° C.); Extension (45 seconds at 72° C.); 40 Cycles. qRT-PCR was conducted using QuantStudio™ 5 (Thermo Scientific).

Example 12-4. Wnt Gene Expression Changes in Differentiated HT-22 Mouse Hippocampal Neuronal Cell by the Present Invention The present invention increased the Wnt3a gene expression in Differentiated HT-22 Mouse Hippocampal Neuronal Cell on treatment with Aβ1-42 Oligomer compared to control group (FIG. 14). Considering the result, the present invention is expected to increase the Wnt3a expression which is known to increase synaptic activities that is important for cognitive function, and activate Canonical Wnt Signaling to restore synaptic plasticity.

Example 13. Wnt Expression Change In Alzheimer's Disease Animal Model (5XFAD Transgenic Mice) by the Present Invention

Example 13-1 Alzheimer's Disease Animal Model (5XFAD Transgenic Mice)

Internationally widely used Alzheimer's transgenic mice model 5XFAD (C57BL/6×SJL) was used. This model's features is that the progress of Alzheimer's disease is significantly faster than other mouse model via 5 different genetic transformation (APP KM670/671NL (Swedish), APP I716V (Florida), APP V717I (London), PSEN1 M146L (A>C), PSEN1 L286V). In other words, any composition therapeutically effective in this model is expected to be effective in other APP model relatively slow in progress. Analysis was conducted using brain tissues in Cortex and Hippocampus area which are related to cognitive function.

Example 13-2. Dosage of the Present Invention

Mice at active age with progressed Alzheimer's disease pathology and cognitive function deteriorated (6 months, male) were administered daily for 4 weeks via intraperitoneal injection 5 mg/kg/day or 10 mg/kg/day.

Example 13-3. Preparation of Tissues

The present invention was administered daily for 4 weeks by Intraperitoneal Injection, animals were anesthetized in animal chambers using $CO_2$ gas, the brain was excised to measure the amount of protein expression, and hippocampus and cerebral cortex were separated and stored in a Deep Freezer at −80° C. till analysis of protein expression.

Example 13-5. Western Blot Analysis Method

Using the method described in Example 6-5, Western Blot Analysis was carried out and the primary antibodies and the condition used for the current experiment is provided in Table 6.

TABLE 6

List of Primary Antibodies

| Antibody | Dilution Ratio | Catalog No | Company |
|---|---|---|---|
| Wnt1 | 1:500 | ab15251 | Abcam |
| β-Actin (13E5) Rabbit mAb | 1:2,000 | 4970 | Cell Signaling |

Example 13-6. Wnt1 Expression Changes In Alzheimer's Disease Animal Model (5XFAD Transgenic Mice) By The Present Invention The present invention increased reduced Wnt1 expression in hippocampus of Alzheimer's Disease Animal Model (5XFAD Transgenic Mice) (FIG. 15). Considering the result, the present invention is expected to increase the expression of Wnt1 providing important function for Synpatogenesis between the neurons to restore synaptic plasticity.

Example 14. Confirmation of Activation of Factors Related to Wnt/β-Catenin Related Factors in Differentiated HT-22 Mouse Hippocampal Neuronal Cell by the Present Invention Using Wnt/β-Catenin TF Activation Profiling Plate Array

Example 14-1. Cell Culture Method of HT-22 Mouse Hippocampal Neuronal Cell Line

Example 14-1-1. Cell Subculture

Using the method described in Example 11-2-1, Cell Subculture was carried out.

Example 14-1-2. Neuronal Differentiation of HT-22 Cells

Using the method described in Example 11-2-2, Cell Subculture was carried out.

Example 14-2. Method Of Preparation of Aβ and Treatment With the Present Invention Prepared a 10 µM solution of human Aβ1-42 (Abcam) in DMEM/F12 (+1% FBS+1% Penicillin/Streptomycin). Solution of Aβ was left at 37° C. for 3 hours to form Aβ Oligomer. The existing medium was discarded and the cells were treated with newly prepared Aβ1-42 Oligomer (1 µM) solution with or without the present invention (maximum concentration 5 µM), and incubated under 5% $CO_2$ at 37° C. for 6 hours. After 6 hours, the medium was removed and the cells were washed with PBS once and recovered. Using the following procedure, further experiments were carried out.

Example 14-3. Wnt/β-Catenin TF Activation Profiling Plate Array Method

Nuclear Extract was extracted from the cells and Wnt/β-Catenin TF Activation Profiling Plate Array (Signosis, #FA-1007) was carried out following the procedure provided by the vendor. Relative Light Unit was measured using Varioskan LUX Multimode Microplate Reader (Thermo Fisher Scientific, USA).

Example 14-4. Activation of Wnt/β-Catenin-Related Transcription Related Factors Measured by Transcription Factor Array The present invention increased the activities of Wnt/β-Catenin related transcription factors including VAX2, c-Myc, NR5A2, Mitf, TCF/LEF, NFAT, CEBP, GLI-1, GBX2, and AP-1 in Differentiated HT-22 Mouse Hippocampal Neuronal Cell treated with Aβ1-42 Oligomer more than twice (FIG. 16). Considering the result, the present invention is expected to increase activity of Wnt/β-Catenin related transcription factors to stimulate Wnt Signaling activation to recover synaptic plasticity.

Example 15. Measurement of Changes in Wnt/β-Catenin Activity in Differentiated HT-22 Mouse Hippocampal Neuronal Cell by the Present Invention using TOPFLASH Reporter Gene Assay

Example 15-1. Cell Culture Method of HT-22 Mouse Hippocampal Neuronal Cell Line

Example 15-1-1. Cell Subculture

Using the method described in Example 11-2-1, Cell subculture was carried out.

Example 15-1-2. Neuronal Differentiation of HT-22 Cells

Using the method described in Example 11-2-2, Cell Subculture was carried out.

Example 15-2-3. Transfection of TOPFLASH Reporter Plasmid DNA

In a 6-Well Plate, Fugene HD Transfection Reagent (Promega, #E2311) and TOPFLASH Reporter Plasmid DNAs (pcDNA-β-Galactosidase, TOPFLASH) were added to HT-22 cells differentiated in $2\times10^5$ Cells/Well, and the cells were incubated at 37° C. under 5% $CO_2$ for 24 hours.

Example 15-2-3. Method for Preparation and Treatment of Aβ and the Present Invention Prepared 1 µM solution of Human Aβ1-42 (Abcam) in DMEM/F12 (+1% FBS+1% Penicillin/Streptomycin). The solution of Aβ1-42 was left at 37 C. for 3 hours to form Aβ Oligomer. After transfecting for 24 hours, the existing cell medium was discarded and the cells were treated with newly prepared Aβ1-42 Oligomer (1 µM) solution with or without the present invention (max. concentration 5 µM) and incubated under 5% $CO_2$ at 37° C. for 6 hours. After 6 hours, the medium was removed and the cells were washed with PBS once and recovered. Further experiments were conducted by the following procedures.

Example 15-3. TOPFLASH Reporter Gene Assay Method

HT-22 cells were washed with PBS buffer twice, Cell Lysate was prepared (100 µl/Well) with Lysis Buffer (0.1% Triton X-100, 200 mM Tris-Cl (pH 8.0), Complete Mini Protease Inhibitor Cocktail (Roche), and Pierce Phosphatase Inhibitor Mini-Tablet) proteins were quantified. Using part of Cell Lysate, β-Galactosidase Assay was carried out and light absorption was measured at 420 nm. Using the rest of Cell Lysate, Luciferase Assay was carried out to measure Luminescence. The obtained Luminescence value was normalized with the protein concentration using β-Galactosidase Activity (Absorbance at 420 nm) to obtain Relative Luciferase Activity value.

Example 15-4. Result of Wnt/β-Catenin Activity by the Present Invention in Differentiated HT-22 Mouse Hippocampal Neuronal Cell Measured by TOPFLASH Reporter Gene Assay The present invention concentration-dependently increased Wnt/β-Catenin Activity in Differentiated HT-22 Mouse Hippocampal Neuronal Cell reduced by treatment with Aβ1-42 Oligomer (FIG. 17). Considering the result, the present invention is expected to increase Wnt expression (FIGS. 14 and 15) and activities of Wnt/β-Catenin related transcription factors (FIG. 16), to promote activation of Wnt Signaling to recover synaptic plasticity.

Example 16. Change of GSK3 β Expression in Retinoic Acid Differentiated SH-SY5Y Human Neuroblastoma Cell and Differentiated HT-22 Mouse Hippocampal Neuronal Cell by the Present Invention

Example 16-1. Cell Culture Method of SH-SY5Y Neurons

Example 16-1-1. Cell Subculture

Using the method described in Example 3-1-1, Cell Subculture was carried out.

Example 16-1-2. SH-SY5Y Neuroblastoma Differentiation

Using the method described in Example 3-1-2, SH-SY5Y cells were differentiated.

Example 16-2. Cell Culture Method of HT-22 Mouse Hippocampal Neuronal Cell Line

Example 16-2-1. Cell Subculture

Using the method described in 11-2-1, Cell Subculture was carried out.

Example 16-2-2. Neuronal Differentiation of HT-22 Cells

Using the method described in 11-2-2, Cell Subculture was carried out.

Example 16-3. Method For Preparation Of Aβ and the Treatment With the Present Invention Using the method described in Example 3-2. The preparation and treatment was carried out.

Example 16-4. Western Blot Analysis Method

Using the method described in Example 9-4, Western Blot Analysis was carried out and the primary antibodies and it's conditions are provided in Table 7.

TABLE 7

List of Primary Antibodies

| Antibody | Dilution Ratio | Catalog No | Company |
|---|---|---|---|
| pSer9-GSK3β (Ser9) (D3A4) | 1:2,000 | 9322 | Cell Signaling |
| GAPDH | 1:1,000 | 2118L | Cell Signaling |
| β-Actin | 1:2,000 | 4970 | Cell Signaling |

Example 16-5. PathScan® Phospho-GSK-3b (Ser9) Sandwich ELISA

HT-22 cells ($1.5 \times 10^5$ Cells/Well) were incubated in 6-Well Plate (SPL, #30006). The medium was changed with Neurobal Plus Media with β-27 Supplement and, after 24 hours, cells were treated with Aβ1-42 Oligomer (1 μM) and the present invention (1, 2, 5 μM) for 6 hours. Cell Culture Media was removed and cells were washed with PBS Buffer three times, and Cell Lysis Buffer (Cell Signaling, #9803) was added to each well (100 μl/Well). The cells were left on top of ice for 5 minutes and Cell Lysate was scrapped to move to 1.5 ml and Cell Lysate was homogenized using Sonication using Bioruptor equipment. Homogenized Cell Lysate was centrifuged (14,000 rpm, 10 minutes) and the supernatant was analyzed to quantify the amount of protein using Pierce™ BCA Protein Assay Kit. GSK-3β Mouse mAb Coated Microwell included in PathScan Phospho-GSK-3B (Ser9) Sandwich ELISA Kit (Cell Signaling, #7311C) was stabilized at room temperature for 30 minutes and same amount of protein (30 μg/well) diluted with ELISA Sample Diluent was added to each Microwell and the mixture was reacted at 4° C. for 16 hours. Each Microwells was washed with ELISA Wash Buffer four times, ELISA experiment was performed using Phospho-GSK-3B (Ser9) Rabbit Detection mAb and Anti-Rabbit IgG, HRP-Linked Antibody (ELISA Formulated). TMB Substrate Solution was used as ELISA Substrate to measure absorption at 450 nm, to determine relative amount of Phospho-GSK-3β (Ser9).

Example 16-6. GSK3 β Expression Changes by the Present Invention in Retinoic Acid Differentiated SH-SY5Y Human Neuroblastoma Cell and Differentiated HT-22 Mouse Hippocampal Neuronal Cell Reviewing the effect by the present invention on the phosphorylation of GSK3B protein, as shown in Western Blot Analysis, the present invention increased Ser9 Phosphorylation of protein in Retinoic Acid Differentiated SH-SY5Y Cell which was reduced by Aβ1-42 Oligomer (FIG. 18), and Phospho-GSK-3b (Ser9) Sandwich ELISA shows that the present invention increased Ser9 Phosphorylation of protein in Differentiated HT-22 Mouse Hippocampal Neuronal Cell which was reduced by Aβ1-42 Oligomer (FIG. 19). Considering the results, the present invention is expected to increase Ser9 Phosphorylation of protein to deactivate GSK3, to reduce phosphorylation of Tau protein to reduce Tau pathology.

Example 17. Change in Tau Expression by the Present Invention in Alzheimer's Dementia Animal Model (NSE-Happ-C105)

Example 17-1. Experimental Animals

The animals for experiments were C57BL/6-Tg (NSE-hAPP-C105) Kor Transgenic Mice (13 Months) in which dementia by Alzheimer was induced by overexpressing mutated APP gene expressing APP C Terminal 105 amino acids only in brain tissues. The animals were housed in the condition controlled as temperature 20±2° C., humidity 50%, light-on for 08:00-20:00 and light-off for 20: 00-08:00. Groups were identified as Control/no treatment group [Non-tg Control, NTC (n=6), Alzheimer disease group [tg-Control, TC (n=6)], Alzheimer disease group treated with the present invention [tg-Present Invention, TM (n=6)] and food and water were supplied without limitation during the experiment.

Example 17-2. Method Of Administration of the Present Invention

After one time base test for Alzheimer's disease model including mouse memory test, behavioral tests by maze in water motor function test, and passive avoidance test, human's daily dose of the present invention, based on Reagan-Shaw, etc. (2008), was administered to 13 month old Alzheimer's disease model mouse by Intraperitoneal Injection at 4 mg/kg once daily for 4 weeks. The controlled group (NTC) and Alzheimer's disease group (TC) were administered with the same amount of physiological saline.

Example 17-3. Tissue Preparation

The present invention was administered daily for 4 weeks by Intraperitoneal Injection, animals were anesthetized in animal chambers using $CO_2$ gas, the brain was excised to measure the amount of protein expression, and hippocampus and cerebral cortex were separated and stored in a Deep Freezer at −80° C. till analysis of protein expression.

Example 17-4. Western Blot Analysis Method

Using the method described in Example 9-4, Western Blot Analysis was carried out and the primary antibodies and it's conditions are provided in Table 8.

TABLE 8

List of Primary Antibodies

| Antibody | Dilution Ratio | Catalog No | Company |
| --- | --- | --- | --- |
| Total Tau | 1:500 | sc-32274 | Santa Cruz |
| Phospho-Tau (pSer199/202) | 1:1,000 | T6819 | Sigma Aldrich |
| β-Actin | 1:500 | sc-47778 | Santa Cruz |

Example 17-5. Tau Expression Change by the Present Invention in Alzheimer's Dementia Animal Model (NSE-Happ-C105)

The present invention reduced Ser199/202 Phosphorylation in Tau Protein increased in hippocampus of the Alzheimer dementia animal model (NSE-hAPP-C105) (FIG. 20). Considering this result, the present invention is expected to reduce Ser199/202 Phosphorylation in Tau Protein to suppress aggregation of Tau Protein, to reduce the formation of NFT and to reduce Tau pathology.

Example 18. Change in APP Formation and βB Accumulation by the Present Invention in Retinoic Acid Differentiated SH-SY5Y Human Neuroblastoma Cell

Example 18-1. Cell Culture Method of SH-SY5Y Neurons

Example 18-1-1. Cell Subculture

Using the method described in Example 5-1-1, Cell Subculture was carried out.

Example 18-1-2. SH-SY5Y Neuroblastoma Differentiation

Using the method described in Example 5-1-2, SH-SY5Y neuronal cells were differentiated.

Example 18-2. Method for Preparation Of Aβ and Treatment With the Present Invention

Example 18-2-1. Method for Preparation of Aβ and Treatment With the Present Invention Using the method described in Example 5-2, the preparation and treatment were performed.

Example 18-2-2. Method for Preparation of $H_2O_2$ and Treatment With the Present Invention DMEM/F12 (+1% FBS+1% Penicillin/Streptomycin) containing 100 μM $H_2O_2$ was added to the differentiated SH-SY5Y Cells every 24 hours and refreshed three times, the present invention was added in various concentration (10, 20, 40 μM) for 24 hours.

Example 18-3. Western Blot Analysis Method

Using the method described in Example 6-5, Western Blot Analysis was carried out and the primary antibodies and its conditions are provided in Table 9.

TABLE 9

List of Primary Antibodies

| Antibody | Dilution Ratio | Catalog No | Company |
| --- | --- | --- | --- |
| APP (Y188) | 1:1,000 | Ab32136 | Abcam |
| β-Amyloid (1-42) (Aβ (1-42)) | 1:1,000 | ab2539 | Abcam |
| GAPDH | 1:1,000 | 2118L | Cell Signaling |

Example 18-4. Change in APP Formation Aβ Accumulation by the Present Invention in Retinoic Acid Differentiated SH-SY5Y Human Neuroblastoma Cell The present invention reduced APP formation and Aβ1-42 accumulation increased by treatment with Aβ1-42 Oligomer (FIG. 21) and $H_2O_2$ (FIG. 22) in Retinoic Acid Differentiated SH-SY5Y Cell. Considering the result, the present invention is expected to reduce APP formation and Aβ accumulation by suppressing Positive Feedback Loop of Aβ production.

Example 19. Change in βB Expression by the Present Invention in Alzheimer's Dementia Animal Model (NSE-Happ-C105)

Example 19-1. Experimental Animals

The same type of animal model described in Example 17-1 was used.

Example 19-2. Method Of Administration of the Present Invention

The present invention was administered using the same method described in Example 17-2.

Example 19-3. Preparation of Tissue

Using the method described in Example 17-3, tissue samples were prepared and stored.

Example 19-4. Western Blot Analysis Method

Using the method described in Example 6-5, Western Blot Analysis was carried out and the primary antibodies and it's conditions are provided in Table 10.

TABLE 10

List of Primary Antibodies

| Antibody | Dilution Ratio | Catalog No | Company |
|---|---|---|---|
| β-Amyloid | 1:500 | sc-28365 | Santa Cruz |
| β-Actin | 1:500 | sc-47778 | Santa Cruz |

Example 19-5. Results of βExpression Change in Alzheimer's Dementia Animal Model (NSE-hAPP-C105)

The present invention effectively reduced expression of Aβ in hippocampus in Alzheimer's dementia animal model (NSE-hAPP-C105) (FIG. 23). Based on this result, the present invention is expected to effectively suppress formation and accumulation of βB.

Example 20. Aβ Plaque Change by the Present Invention in Alzheimer's Disease Animal Model (5XFAD Transgenic Mice)

Example 20-1 Alzheimer's Disease Animal Model (5XFAD Transgenic Mice)

The animal model described in Example 13-1 was used.

Example 20-2. Administration of the Present Invention Composition

Using the method described in Example 13-2, the composition of the present invention was administered.

Example 20-3. Preparation and Fixation of Tissue Samples

The present invention was administered by Intraperitoneal Injection for 4 weeks daily, and the animal was anesthetized in an animal chamber using $CO_2$ gas before opening the chest to administer 50 mM PBS (Phosphate Buffer Saline) to the left ventricle for 3 minutes, and perfused a fixation solution in which 4% PFA (Paraformaldehyde) was dissolved in 0. μM phosphate buffer for 10 minutes. After perfusion and fixation, the brain was excised and added to 4% PFA fixation solution at 4° C. for 12 hours to fix, followed by precipitating the tissues in 30% Sucrose solution for 5 days, and sliced through Continuous tubular intercept in 40 μm thickness using Freezing Microtome (Leica) for storage.

Example 20-4. Aβ Plaque Staining Methods Using Thioflavin S Staining G and GFAP (Glial Fibrillary Acidic Protein) Immunohistochemistry (IHC) Method After fixation of the mouse brain tissues in 4% Paraformaldehyde (pH 7.4) solution for 24 hours, the tissues were dehydrated using 30% Sucrose, and cryosections were prepared. The primary antibodies and the conditions are provided in Table 11. After Antigen retrieval using 1% SDS was performed on the Cryosections of the train tissues, the samples were reacted with Glial Fibrillary Acidic Protein (GFAP) Antibody at 4° C. for 16 hours. The samples were treated with 500 μM Thioflavin S in 50% Ethanol for 7 minutes for Thioflavin S Staining. Alexa Fluor® 594 Goat Anti-Rabbit (IgG) Secondary Antibody was reacted with GFAP Antibody/Thioflavin S treated brain tissue cryosections, and Hoechst 33342 (Sigma-Aldrich) was used for Nuclear Staining.

TABLE 11

List of Primary Antibodies

| Antibody | Dilution Ratio | Catalog No | Company |
|---|---|---|---|
| GFAP (Glial Fibrillary Acidic Protein) | 1:200 | ab7260 | Abcam |
| Alexa Fluor® 594 Goat Anti-Rabbit (IgG) Secondary Antibody | 1:10,000 | ab150080 | Abcam |

Example 20-5. Change of Aβ Plaque by the Present Invention in Alzheimer's Disease Animal Model (5XFAD Transgenic Mice) 7260

The present invention reduced number of Aβ Plaque in hippocampus and cerebral cortex of Alzheimer's disease animal model (5XFAD Transgenic Mice) (FIG. 24), which was determined by counting number of Aβ Plaque (Green) dyed by Thioflavin S and Colocalized Spot (Yellow) of Astrocyte (Red) dyed with GFAP. Considering this result, the present invention is expected to suppress Aβ production and Aβ accumulation to reduce extracellular Aβ Plaque formation.

Example 21. AMPK Expression Change by the Present Invention in Retinoic Acid Differentiated SH-SY5Y Human Neuroblastoma Cell

Example 21-1. Cell Culture Method of SH-SY5Y Neurons

Example 21-1-1. Cell Subculture

Using the method described in Example 3-1-1, Cell Subculture was conducted.

Example 21-1-2. SH-SY5Y Neuroblastoma Differentiation

Using the method described in Example 3-1-2, SH-SY5Y neuronal cells were differentiated.

Example 21-2. Method for Preparation of Aβ and Treatment With the Present Invention Prepared a 1 μM solution of human Aβ 1-42 (Abcam) in DMEM/F12 (+1% FBS+1% Penicillin/Streptomycin). Solution of Aβ was left at 37° C. for 3 hours to form Aβ Oligomer. The existing medium was discarded and the cells were treated with newly prepared Aβ1-42 Oligomer (1 μM) solution with or without the present invention (maximum concentration 10 μM), and incubated under 5% $CO_2$ at 37° C. for 72 hours. After 72 hours, the medium was removed and the cells were washed with PBS once and recovered. Using the following procedure, further experiments were carried out.

Example 21-3. Western Blot Analysis Method

Using the method described in Example 9-4, Western Blot Analysis was carried out and the primary antibodies and it's conditions are provided in Table 12.

TABLE 12

List of Primary Antibodies

| Antibody | Dilution Ratio | Catalog No | Company |
|---|---|---|---|
| pAMPKα (Thr172) | 1:1,000 | 2531 | Cell Signaling |
| GAPDH | 1:1,000 | 2118L | Cell Signaling |

Example 21-4. AMPK Expression Changes by the Present Invention in Retinoic Acid Differentiated SH-SY5Y Human Neuroblastoma Cell The present invention concentration-dependently increased phosphorylation of Thr172 of AMPK Catalytic Subunit a in Retinoic Acid Differentiated SH-SY5Y Human Neuroblastoma Cell reduced by Aβ1-42 Oligomer treatment (FIG. 25). Considering this result, the present invention is expected to increase phosphorylation of Thr172 in AMPK Catalytic Subunit a reduced by Aβ to recover AMPK activity to activate Autophagy to remove misfolded Protein Aggregates related to degenerative brain diseases and to inhibit neuronal degeneration.

Example 22. Changes in Expression of Autophagy Markers, Including LC3B And P62, by the Present Invention in Retinoic Acid Differentiated SH-SY5Y Human Neuroblastoma Cell

Example 22-1. Cell Culture Method of SH-SY5Y Neurons

Example 22-1-1. Cell Subculture

Using the method described in Example 2-1-1, cell subculture was conducted.

Example 22-1-2. SH-SY5Y Neuroblastoma Differentiation

Using the method described in Example 2-1-2, SH-SY5Y neuronal cells were differentiated.

Example 22-2. Method for Preparation of Aβ and Treatment With the Present Invention Prepared a 1 μM solution of human Aβ1-42 (Abcam) in DMEM/F12 (+1% FBS+1% Penicillin/Streptomycin). Solution of Aβ was left at 37° C. for 3 hours to form Aβ Oligomer. The existing medium was discarded and the cells were treated with newly prepared Aβ1-42 Oligomer (1 μM) solution with or without the present invention (maximum concentration 40 μM) and 3-MA (3-Methyladenine, Sigma-Aldrich) (5 mM), Autophagy/PI3K (Phosphoinositide 3-Kinase) Inhibitor, and incubated under 5% $CO_2$ at 37° C. for 72 hours. After 72 hours, the medium was removed and the cells were washed with PBS once and recovered. Using the following procedure, further experiments were carried out.

Example 22-3. Western Blot Analysis Method

Using the method described in Example 6-5, Western Blot Analysis was carried out and the primary antibodies and it's conditions are provided in Table 13.

TABLE 13

List of Primary Antibodies

| Antibody | Dilution Ratio | Catalog No | Company |
|---|---|---|---|
| APP (Y188) | 1:1,000 | ab32136 | Abcam |
| β-Amyloid (1-42) (Aβ (1-42)) | 1:1,000 | ab2539 | Abcam |
| Anit-LC3B Antibody | 1:1,000 | ab51520 | Abcam |
| p62 | 1:1,000 | 8025S | Cell Signaling |
| GAPDH | 1:1,000 | 2118L | Cell Signaling |

Example 22-4. Changes in Expression of Autophagy Marker Including LC3B And P62 Resulting by the Present Invention in Retinoic Acid Differentiated SH-SY5Y Human Neuroblastoma Cell The present invention not only increase expression of LC3B, an Autophagy Marker, reduced by Aβ1-42 Oligomer in Retinoic Acid Differentiated SH-SY5Y Human Neuroblastoma Cell, but also induce Autophagic Flux (Conversion of LC3B-I to LC3B-II) to increase the LC3B-II/I Ratio at the same time, and reduced expression of Ubiquitin-Binding Protein p62 (SQSTM, Sequestosome 1), an Autophagosome Cargo Protein, increased by Aβ1-42 Oligomer. Also, 3-MA, an Autophagy/PI3K Inhibitor, was used together with the present invention, Autophagic Flux (LC3B-II/I Ratio) increased by the present invention was reduced and expression of p62 reduced by the present invention increased. Furthermore, APP formation and Aβ1-42 accumulation increased when the cells treated with the present invention and 3-MA together (FIG. 26). Considering this result, the present invention is expected to suppress APP formation and Aβ1-42 accumulation by activating Autophagy.

Example 23. Change of Expression of Autophagy Markers Including ATG7 and ATG5/12 by the Present Invention in Alzheimer's Disease Animal Model (5XFAD Transgenic Mice)

Example 23-1 Alzheimer's Disease Animal Model (5XFAD Transgenic Mice)

The animal model described in Example 13-1 was used.

Example 23-2. Administration of the Composition of the Present Invention

The composition was administered using the same method described in Example 13-2.

Example 23-3. Preparation of Tissue Sample

Using the method described in Example 13-3, tissue samples were prepared and stored.

Example 23-4. Western Blot Analysis Method

Using the method described in Example 6-5, Western Blot Analysis was carried out and the primary antibodies and it's conditions are provided in Table 14.

TABLE 14

List of Primary Antibodies

| Antibody | Dilution Ratio | Catalog No | Company |
| --- | --- | --- | --- |
| ATG7 | 1:1,000 | ab133528 | Abcam |
| ATG5/12 | 1:1,000 | AAM79 | Bio-Rad |
| β-Actin | 1:2,000 | 4970 | Cell Signaling |

Example 23-5. Changes in Expression of Autophagy Markers including ATG7 and ATG5/12 by the Present Invention in Alzheimer's Disease Animal Model (5XFAD Transgenic Mice)

The present invention increased expression of Autophagy Markers including ATG7 and ATG5/12 in hippocampus of Alzheimer's disease animal model (5XFAD Transgenic Mice) and increased the expression of ATG5/12 in cerebral cortex (FIG. 27). Considering the result, the present invention is expected to increase Autophagic Flux (LC3BII/I Ratio), an Autophagy Marker, reduce p62 (FIG. 26), and increase expression of ATG7 and ATG5/12 to activate Autophagic Cascade.

Example 24. Effect of Improving Cognitive and Behavioral Learning Abilities in the Alzheimer'S Dementia Animal Model (NSE-Happ-C105) for the Present Invention

Example 23-1. Experimental Animals

The animal model described in Example 17-1 was used.

Example 23-2. Method of Administration of the Present Invention

The composition was administered using the same method described in Example 17-2.

Example 23-3. Test Method for Cognitive Ability and Behavioral Learning Ability

Example 23-3-1. Morris Water Maze Test

The present invention was administered by Intraperitoneal Injection once a day for 4 weeks at 4 mg/kg before measuring the change in cognitive ability using water maze test. The test was performed in 22-25° C. water in circular water bath (diameter 1 m×height 40 cm) wherein a target (Target: diameter 12 cm) was set up about 3 cm lower than the surface of the water. Dry milk power was added to the water to make the target invisible SMART 3.0 program (Panlab) was installed on the ceiling above the water bath to monitor the test animals' time to reach the target (Latency to Target), swimming distance (Distance to Target) and pattern of swimming (Swimming Pattern) before the experiment and 4 weeks later. Test subject was trained for the first 5 days twice a day to begin from the starting point and to end at the target. Mice that did not find the target both times were made to recognize the position of target. Each test was performed with 5 minutes interval and the target was removed on day 6 to perform the test for 1 minute to begin from the starting point and the result was used as the experimental data.

Example 23-3-2. Passive Avoidance Test

The present invention was administered by Intraperitoneal Injection at 4 mg/kg dose once a day for 4 weeks before passive Avoidance Test was performed to evaluate memory. The Passive Avoidance Test is comprised of a front room that was bright room in white color (18×18×25 cm), the back room was a dark room in black color (18×18×25 cm), strong metal stainless was installed on the floor of the dark room and the walls of the front and back rooms have holes with 4 cm diameter, which open and close in guillotine type. Each testing animal was isolated in each cage for 1 minute, moved to the front room for 10 seconds to adjust while the guillotine type doors were opened to allow the test animals to move between the rooms freely. Once all four foots of the test animals are in the back room, the door was closed quickly and recorded the time for the test animal to move from the front room to back room (Initial Latency Time) and electrified (0.5 mA) for 2 seconds. After 5 seconds, the test animal was moved to its residential cage. After 72 hours, same test was performed to measure the Latency to Enter Dark, time to move from the front to back room till maximum 300 seconds.

Example 23-3-3. Data Processing Method

The collected data was process using SPSS 20.0 statistical program to calculate statistical error (Mean±SD), validation of variables among species and groups was performed by one way variance analysis (One-Way ANOVA). In the event if there is a significant different between the groups, post-verification was performed using Bonferroni method. For the purpose, hypothetical acceptance is set as $\alpha=0.05$.

Example 23-4. Improvement in Cognitive and Behavioral Learning Skills by the Present Invention in Alzheimer's Dementia Animal Model (NSE-hAPP-C105)

Example 23-4-1. Result of Cognitive Function Improvement by the Present Invention in Alzheimer's Dementia Animal Model (NSE-hAPP-C105): Water Maze Test (Morris Water Maze Test)

Morris Water Maze Test was performed for C57BL/6-Tg (NSE-hAPP-C105) Kor Transgenic Mice to measure the effect of the present invention on cognitive function after 4 weeks of treatment. First, analysis of time to reach the target shows that it statistically increased in TC group than NTC group (P=0.001) and statistically reduced in TM group (P=0.001) than TC group. Second, analyzing the distance of swimming to reach the target, it was statistically increased in TC group (P=0.001) than NTC group, and statistically reduced in TM group (P=0.001) than TC group. Third, analysis of the swimming time from target in the quadrant shows that it statistically reduced in TC group (P=0.001) than NTC group and statistically increased in TM group (P=0.001) than in TC group. Fourth, analysis of the times passing through the target shows that it statistically decreased in TC group (P=0.001) than NTC group and statistically increased in TM group (P=0.037) than TC group (FIG. 28).

Example 23-4-2. Result of Improvement in Action Learning and Cognitive Abilities by the Present Invention in Alzheimer's Dementia Animal Model (NSE-hAPP-C105): Passive Avoidance Test Passive Avoidance Test was conducted with C57BL/6-Tg (NSE-hAPP-C105) Kor Transgenic Mice to evaluate the effect of the 4 weeks of treatment with the present invention on action learning and cognitive abilities (FIGS. 6A and 6B). The result shows that it statistically decreased in TC group (P=0.001) than NTC group, and statistically increased in TM group (P=0.004) than TC group (FIG. 29).

The invention claimed is:

1. A method for treating Alzheimer's Disease (AD) in a subject in need, the method comprising:
   administering to the subject a composition comprising a therapeutically effective dose of mirodenafil or a pharmaceutical acceptable salt, solvate, and hydrate thereof, wherein the therapeutically effective dose treats the subject's Alzheimer's Disease,
   wherein the therapeutically effective dose restores Synaptic plasticity by Wnt Signaling activation through DKK-1 inhibition or wherein the therapeutically effective dose suppresses DKK-1 by inhibiting Positive Feedback Loop of Aβ production to inhibit formation of APP and Aβ accumulation.

2. The method of claim 1, wherein the therapeutically effective dose is sufficient to induce a change overtime in at least one of a test for evaluating for cognitive ability, a test for evaluating behavioral learning ability, a passive avoidance test, or a test evaluating data processing.

3. The method of claim 1, wherein the therapeutically effective dose inhibits formation of Aβ aggregation inhibition by reducing formation of Aβ Oligomer or Fibril.

4. The method of claim 1, wherein the therapeutically effective dose inhibits β-Amyloidogenic Processing through BACE-1 reduction.

5. The method of claim 1, wherein the therapeutically effective dose reduces extracellular formation and accumulation of amyloid beta monomer, oligomer, and/or amyloid beta fibril and plaque.

6. The method of claim 1, wherein the therapeutically effective dose reduces neuronal cell death and enhances neurogenesis, synaptogenesis, or angiogenesis by activating NO (Nitric Oxide)/cGMP (Cyclic Guanosine Monophosphate)/PKG (Protein Kinase G), CREB (Cyclic AMP (Adenosine Monophosphate) Response Element Binding Protein) Pathway.

7. The method of claim 1, wherein the therapeutically effective dose activates Autophagy to remove intracellular Toxic Soluble Aβ Oligomer to suppress formation and accumulation of Aβ Fibril/Plaque.

\* \* \* \* \*